US012746702B2

(12) United States Patent
Williams et al.

(10) Patent No.: US 12,746,702 B2
(45) Date of Patent: Sep. 29, 2026

(54) MATERIAL COMPRESSION AND PORTIONING

(71) Applicant: Altria Client Services LLC, Richmond, VA (US)

(72) Inventors: Dwight David Williams, Powhatan, VA (US); James David Evans, Chesterfield, VA (US); Patrick Sean Mcelhinney, Chesterfield, VA (US); Jarrod Wayne Chalkley, Mechanicsville, VA (US); Christopher R. Newcomb, Powhatan, VA (US); Robert V. Powell, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 496 days.

(21) Appl. No.: 18/309,414

(22) Filed: Apr. 28, 2023

(65) Prior Publication Data

US 2023/0264377 A1 Aug. 24, 2023

Related U.S. Application Data

(60) Continuation of application No. 17/542,849, filed on Dec. 6, 2021, now Pat. No. 11,691,309, which is a (Continued)

(51) Int. Cl.

| | |
|---|---|
| ***B26D 7/08*** | (2006.01) |
| ***B26D 5/00*** | (2006.01) |
| ***B26D 7/18*** | (2006.01) |

(52) U.S. Cl.

CPC ............ *B26D 7/08* (2013.01); *B26D 7/1854* (2013.01); *B26D 5/00* (2013.01)

(58) Field of Classification Search

CPC .......... B26D 7/08; B26D 7/1854; B26D 5/00; A24C 5/1835; A24C 5/478; A24B 7/12;

(Continued)

(56) References Cited

U.S. PATENT DOCUMENTS

| | | | |
|---|---|---|---|
| 1,351,903 | A | 9/1920 | Hara |
| 1,913,291 | A | 6/1933 | Rountree |

(Continued)

FOREIGN PATENT DOCUMENTS

| | | | |
|---|---|---|---|
| DE | 2655036 | A1 | 6/1978 |
| EP | 3147224 | A1 | 3/2017 |

OTHER PUBLICATIONS

U.S. Non-Final Rejection dated Apr. 29, 2021 for U.S. Appl. No. 15/975,087.

(Continued)

*Primary Examiner* — Boyer D Ashley
*Assistant Examiner* — Fernando A Ayala
(74) *Attorney, Agent, or Firm* — HARNESS, DICKEY & PIERCE, P.L.C.

(57) ABSTRACT

An apparatus includes channel assemblies in a rotatable section, a cutting assembly, a discharge assembly, and a cleanout assembly. The channel assembly holds a bulk instance of compressible material extending through upper and lower channels of a continuous channel. The cutting assembly moves in relation to the channel assembly to isolate the upper and lower channels, severing upper and lower material portions of the bulk instance. The discharge assembly directs gas into the lower channel of a channel assembly to discharge the lower material portion from the lower channel, based on radial alignment of a conduit assembly of the channel assembly with a conduit assembly of the discharge assembly. The cleanout assembly supplies a fluid through the conduit assembly of the channel assem- (Continued)

bly, based on radially alignment of the conduit assembly of the channel assembly with a conduit assembly of the clean-out assembly.

20 Claims, 45 Drawing Sheets

Related U.S. Application Data division of application No. 16/275,927, filed on Feb. 14, 2019, now Pat. No. 11,213,967, which is a continuation-in-part of application No. 15/975,087, filed on May 9, 2018, now Pat. No. 11,192,668.

(58) Field of Classification Search
CPC ..... A24B 7/06; Y10T 83/793; Y10T 83/4734; Y10T 83/798; Y10T 83/219
USPC .................................. 83/100, 391, 310, 509
See application file for complete search history.

(56) References Cited

U.S. PATENT DOCUMENTS 2,255,438 A * 9/1941 Robinson ............... B65G 53/22 239/533.13
2,414,152 A 1/1947 Jackson
3,478,632 A 11/1969 Alfred
3,530,915 A 9/1970 Sadanobu
3,552,454 A * 1/1971 Deming, Sr. ............. B65B 1/24 141/237
3,798,456 A 3/1974 Marek et al.
3,978,987 A 9/1976 Neville et al.
4,168,599 A * 9/1979 King ..................... B65B 7/2807 53/529
4,457,125 A 7/1984 Fishburne
4,538,492 A 9/1985 Van Lue et al.
4,640,322 A 2/1987 Ballester
4,644,838 A 2/1987 Samson et al.
4,976,296 A 12/1990 Pope
5,041,297 A * 8/1991 Dowaliby ................. B65B 1/36 53/529
5,234,037 A 8/1993 Derby
5,244,019 A 9/1993 Derby
5,337,795 A * 8/1994 Mihail .................. B65B 25/061 141/81
5,401,156 A * 3/1995 Anderson .............. A23B 4/064 425/149
5,404,919 A 4/1995 Felts et al.
5,458,055 A 10/1995 Fitch, Jr.
5,841,851 A * 11/1998 Recht .................... H04M 1/733 379/377
6,280,793 B1 * 8/2001 Atwell ................ C23C 16/4486 392/394
7,210,507 B2 5/2007 Facchini
8,602,068 B2 12/2013 Williams
10,000,301 B2 6/2018 Williams
10,399,712 B2 9/2019 Longest, Jr. et al.
10,888,108 B2 1/2021 Longest et al.
11,534,933 B2 12/2022 Saccone, Jr.
11,691,309 B2 * 7/2023 Williams ................. B26D 7/08 83/268
12,232,665 B2 * 2/2025 Zhao ........................ A47K 5/09
2007/0131707 A1 6/2007 Poole et al.
2008/0202532 A1 * 8/2008 Wygal ..................... B65B 63/02 131/111
2008/0236701 A1 10/2008 Monti et al.
2009/0229705 A1 9/2009 Ansaloni
2010/0071711 A1 3/2010 Boldrini
2010/0263510 A1 10/2010 Klockow et al.
2011/0277878 A1 11/2011 Williams
2012/0055493 A1 3/2012 Novak, III et al.
2012/0060446 A1 * 3/2012 Merz ....................... B65B 37/20 53/167
2012/0217288 A1 * 8/2012 Bertrand ................ B23K 1/008 228/212
2012/0279178 A1 11/2012 Griscik et al.
2012/0297944 A1 * 11/2012 Maddaleni ............... B26D 5/00 83/13
2015/0183532 A1 7/2015 Longest, Jr. et al.
2016/0023788 A1 * 1/2016 Bruck ..................... B65B 51/10 53/547
2016/0104339 A1 4/2016 Saccone, Jr.
2017/0015446 A1 * 1/2017 Frabetti ..................... B65B 1/32
2017/0029142 A1 2/2017 Evans
2020/0233002 A1 7/2020 Las Navas Garcia
2021/0129369 A1 5/2021 Saccone, Jr.
2022/0088816 A1 3/2022 Williams et al.
2022/0240698 A1 * 8/2022 Mapp ...................... A47J 43/14

OTHER PUBLICATIONS

U.S. Notice of Allowance for U.S. Appl. No. 16/275,927, dated Jul. 23, 2021.
U.S. Notice of Allowance for U.S. Appl. No. 15/975,087, dated Aug. 20, 2021.
U.S. Non-Final Rejection dated Jan. 6, 2023 for U.S. Appl. No. 17/533,735.
U.S. Notice of Allowance for U.S. Appl. No. 17/542,849, dated Feb. 1, 2023.
U.S. Notice of Allowance for U.S. Appl. No. 18/446,020, dated Dec. 16, 2024.
U.S. Notice of Allowance for U.S. Appl. No. 17/533,735, dated May 11, 2023.
Corrected U.S. Notice of Allowance for U.S. Appl. No. 17/533,735, dated May 24, 2023.
U.S. Notice of Allowance for U.S. Appl. No. 19/073,620, dated Mar. 9, 2026.

* cited by examiner

MATERIAL COMPRESSION AND PORTIONING

CROSS REFERENCE TO RELATED APPLICATIONS

This application is a continuation application of U.S. application Ser. No. 17/542,849, filed on Dec. 6, 2021, which is a divisional application of U.S. application Ser. No. 16/275,927, filed on Feb. 14, 2019, which is a Continuation-In-Part of U.S. application Ser. No. 15/975,087, filed on May 9, 2018, the contents of each of which are incorporated by reference in their entirety.

BACKGROUND

Field

The present disclosure relates to portioning of compressible materials.

Description of Related Art

Some products, including some consumer goods, include packaged portions ("portioned instances") of a compressible material (also referred to herein as simply a "material"). In some cases, such portioned instances may be produced ("provided," "manufactured," etc.) based on portioning ("segmenting," "cutting," "severing," etc.) a relatively large ("bulk") instance of the material into multiple smaller portioned instances and packaging the portioned instances.

SUMMARY

According to some example embodiments, an apparatus configured to provide a portioned instance of a compressible material may include a rotatable section, a cutting assembly, a discharge assembly, and a cleanout assembly. The rotatable section may be configured to rotate around a central longitudinal axis. The rotatable section may include a plurality of channel assemblies. The plurality of channel assemblies may be spaced apart around a circumference of the rotatable section. Each channel assembly of the plurality of channel assemblies may include an upper assembly and a lower assembly. The upper assembly may include an upper inner surface defining an upper channel. The lower assembly may include a lower inner surface defining a lower channel. The upper inner surface and the lower inner surface may collectively at least partially define a continuous channel including the upper and lower channels. The upper assembly may define a top opening of the continuous channel. The lower assembly may define a bottom opening of the continuous channel. The channel assembly may be configured to hold a bulk instance of the compressible material extending continuously through both the upper channel and the lower channel. The cutting assembly may be configured to be fixed in place in relation to the rotatable section. The cutting assembly may be configured to extend transversely through a gap space between an upper assembly and a lower assembly of at least one channel assembly of the plurality of channel assemblies based on rotation of the rotatable section to at least partially align the at least one channel assembly with a cutting edge of the cutting assembly, such that a lower portion of the bulk instance of the compressible material in the at least one channel assembly is severed from an upper portion of the bulk instance of the compressible material in the at least one channel assembly to produce the portioned instance, and the cutting assembly isolates the lower channel of the at least one channel assembly from the upper channel of the at least one channel assembly. The discharge assembly may be fixed in relation to the rotatable section. The discharge assembly may be configured to supply a gas into the lower channel of the at least one channel assembly via a conduit assembly of the at least one channel assembly to discharge the portioned instance through the bottom opening of the at least one channel assembly, based on rotation of the rotatable section to at least partially radially align the conduit assembly of the at least one channel assembly with a conduit assembly of the discharge assembly. The cleanout assembly may be fixed in relation to the rotatable section. The cleanout assembly may be configured to supply at least one fluid through the conduit assembly of the at least one channel assembly via a conduit assembly of the cleanout assembly, based on rotation of the rotatable section to radially mis-align the conduit assembly of the at least one channel assembly with the conduit assembly of the discharge assembly, and at least partially radially align the conduit assembly of the at least one channel assembly with the conduit assembly of the cleanout assembly.

The cleanout assembly may include a first conduit assembly configured to supply a first fluid through the conduit assembly of at the least one channel assembly of the plurality of channel assemblies, based on the rotatable section rotating to at least partially radially align the conduit assembly of the at least one channel assembly with the first conduit assembly. The cleanout assembly may include a second conduit assembly configured to supply a second fluid through the conduit assembly of the at least one channel assembly, based on the rotatable section rotating to radially mis-align the conduit assembly of the at least one channel assembly with the first conduit assembly and to at least partially radially align the conduit assembly of the at least one channel assembly with the second conduit assembly. The first fluid and the second fluid may be different fluids.

The first fluid may be a liquid. The second fluid may be a gas.

The conduit assembly of the at least one channel assembly may include an annular conduit assembly defining an annular conduit surrounding the lower channel of the at least one channel assembly. The conduit assembly of the at least one channel assembly may be configured to direct the gas from the discharge assembly into the annular conduit. The conduit assembly of the at least one channel assembly may include one or more bridging conduit assemblies defining one or more bridging conduits extending between the annular conduit assembly and a top end of the lower inner surface of the at least one channel assembly. The one or more bridging conduit assemblies may be configured to direct the gas from the annular conduit to a top portion of the lower channel of the at least one channel assembly.

The one or more bridging conduit assemblies may include a plurality of bridging conduit assemblies between the annular conduit assembly and the top end of the lower inner surface of the at least one channel assembly. The plurality of bridging conduit assemblies may be spaced apart equidistantly around a circumference of the lower inner surface of the at least one channel assembly.

The at least one channel assembly may include a cleanout port extending from the annular conduit assembly of the lower assembly of the at least one channel assembly to an exterior of the rotatable section. The apparatus may further include an outlet conduit that is configured to expose only the bottom opening of the at least one channel assembly, such that the cleanout port of the at least one channel assembly remains isolated from an exterior of the apparatus, based on the rotatable section rotating to at least partially align the conduit assembly of the at least one channel assembly with the conduit assembly of the discharge assembly. The apparatus may further include a cleanout conduit that is configured to expose both the bottom opening and the cleanout port of the at least one channel assembly based on the rotatable section rotating to at least partially align the conduit assembly of the at least one channel assembly with the cleanout assembly.

The cleanout assembly may be configured to supply the fluid to a plurality of lower assemblies simultaneously, based on simultaneous radial alignment of the conduit assemblies of the plurality of lower assemblies with the conduit assembly of the cleanout assembly.

The apparatus may further include an air knife assembly that is fixed in relation to the rotatable section and oriented towards the rotatable section. The air knife assembly may be configured to emit a stream of air in a field of view. The apparatus may further include a cleanout conduit that is radially aligned with the air knife assembly and is between the air knife assembly and the longitudinal axis of the rotatable section, such that the air knife assembly is configured to emit a stream of air radially towards the cleanout conduit to entrain and remove residue from a portion of the rotatable section that is between the air knife assembly and the cleanout conduit in the field of view of the air knife assembly, and the cleanout conduit is configured to further direct the residue entrained in the air stream out of the apparatus.

The discharge assembly may be configured to supply the gas into the lower channel to discharge the portioned instance through the bottom opening based on directing the gas through the conduit assembly of the at least one channel assembly to impinge on a lower face of the cutting assembly in the lower channel.

According to some example embodiments, an apparatus configured to provide a portioned instance of a compressible material may include a rotatable section and a cutting assembly. The rotatable section may be configured to rotate around a central longitudinal axis. The rotatable section may include a plurality of channel assemblies. The plurality of channel assemblies may be spaced apart around a circumference of the rotatable section. Each channel assembly of the plurality of channel assemblies may include an upper assembly and a lower assembly. The upper assembly may include an upper inner surface defining an upper channel. The lower assembly may include a lower inner surface defining a lower channel. The upper inner surface and the lower inner surface may collectively at least partially define a continuous channel including the upper and lower channels. The upper assembly may define a top opening of the continuous channel. The lower assembly may define a bottom opening of the continuous channel. The channel assembly may be configured to hold a bulk instance of the compressible material extending continuously through both the upper channel and the lower channel. The cutting assembly may be configured to be fixed in place in relation to the rotatable section, the cutting assembly configured to extend transversely through a gap space between an upper assembly and a lower assembly of at least one channel assembly of the plurality of channel assemblies based on rotation of the rotatable section to at least partially align the at least one channel assembly with a cutting edge of the cutting assembly, such that a lower portion of the bulk instance of the compressible material in the at least one channel assembly is severed from an upper portion of the bulk instance of the compressible material in the at least one channel assembly to produce the portioned instance, and the cutting assembly isolates the lower channel of the at least one channel assembly from the upper channel of the at least one channel assembly. A cutting edge of the cutting assembly may be configured to extend around a circumference of the rotatable section and includes at least a first portion extending in an arc from a first radial distance from the longitudinal axis at a first angular position to a second radial distance from the longitudinal axis at a second angular position, the first and second radial distances being beyond proximate and distal radial distances of the channel assembly from the longitudinal axis, such that the cutting edge moves transversely in a radial direction through the gap space of the at least one channel assembly based on the rotatable section rotating the at least one channel assembly around the longitudinal axis between the first and second angular positions.

The plurality of channel assemblies may include a radially-aligned set of channel assemblies that are aligned on a same radial line extending radially from the longitudinal axis. The radially-aligned set of channel assemblies may be configured to be rotated around the longitudinal axis at a same angular rate based on rotation of the rotatable section around the longitudinal axis. The cutting edge of the cutting assembly may include opposing first and second portions that are configured to progressively extend in opposite radial directions between the first and second angular positions, such that the opposing first and second portions move transversely in opposite radial directions through separate, respective gap spaces of separate, respective channel assemblies of the radially-aligned set of channel assemblies based on the rotatable section rotating the radially-aligned set of channel assemblies around the longitudinal axis between the first and second angular positions.

The opposing first and second portions of the cutting assembly may be configured to move transversely through the separate, respective gap spaces of the separate, respective channel assemblies of the radially-aligned set of channel assemblies at a same rate based on the rotatable section rotating the radially-aligned set of channel assemblies around the longitudinal axis between the first and second angular positions.

An angular displacement between the first and second angular positions may be 108 degrees.

According to some example embodiments, an apparatus configured to provide a portioned instance of a compressible material may include a rotatable section and first and second enclosure structures. The rotatable section may be configured to rotate around a central longitudinal axis. The rotatable section may include a plurality of channel assemblies. The plurality of channel assemblies may be spaced apart around a circumference of the rotatable section. Each channel assembly of the plurality of channel assemblies may include an upper assembly and a lower assembly. The upper assembly may include an upper inner surface defining an upper channel. The lower assembly may include a lower inner surface defining a lower channel. The upper inner surface and the lower inner surface may collectively at least partially define a continuous channel including the upper and lower channels. The upper assembly may define a top opening of the continuous channel. The lower assembly may define a bottom opening of the continuous channel. The channel assembly may be configured to hold a bulk instance of the compressible material extending continuously through both the upper channel and the lower channel. The first and second enclosure structures may be fixed in place on opposite sides of the rotatable section. The first and second enclosure structures may define separate, respective enclosures. Each enclosure may be configured to be open to at least one channel assembly of the plurality of channel assemblies that are at least partially vertically aligned with the enclosure. The apparatus may be configured to rotate the rotatable section to cause the at least one channel assembly to be sequentially vertically aligned with at least one enclosure of each enclosure structure of the first and second enclosure structures, such that gas is supplied through a top opening of the at least one channel assembly via the at least one enclosure of each enclosure structure.

The apparatus may further include a cutting assembly configured to be fixed in place in relation to the rotatable section. The cutting assembly may be configured to extend transversely through a gap space between an upper assembly and a lower assembly of the at least one channel assembly based on rotation of the rotatable section to at least partially align the at least one channel assembly with a cutting edge of the cutting assembly, such that a lower portion of the bulk instance of the compressible material in the at least one channel assembly is severed from an upper portion of the bulk instance of the compressible material in the at least one channel assembly to produce the portioned instance, and the cutting assembly isolates the lower channel of the at least one channel assembly from the upper channel of the at least one channel assembly. The cutting assembly may be configured to isolate the lower channel of the at least one channel assembly from the upper channel of the at least one channel assembly based on the rotatable section rotating the at least one channel assembly to be at least partially vertically aligned with the first enclosure structure, such that the apparatus is configured to push compressible material into a bottom of the upper channel that is isolated from the lower channel of the at least one channel assembly based on supplying gas through the top opening of the at least one channel assembly via at least one enclosure of the first enclosure structure. The cutting assembly may be configured to expose the lower channel of the at least one channel assembly to the upper channel of the at least one channel assembly based on the rotatable section rotating the at least one channel assembly to be at least partially vertically aligned with the second enclosure structure, such that the apparatus is configured to push the compressible material into a bottom of the lower channel that is exposed to the upper channel of the at least one channel assembly based on supplying gas through the top opening of the at least one channel assembly via at least one enclosure of the second enclosure structure.

The apparatus may be configured to supply a first gas to an enclosure of the first enclosure structure to pressurize the enclosure of the first enclosure structure to a first pressure. The apparatus may be further configured to supply a second gas to an enclosure of the second enclosure structure to pressurize the enclosure of the second enclosure structure to a second pressure. The second pressure may be greater than the first pressure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1A:
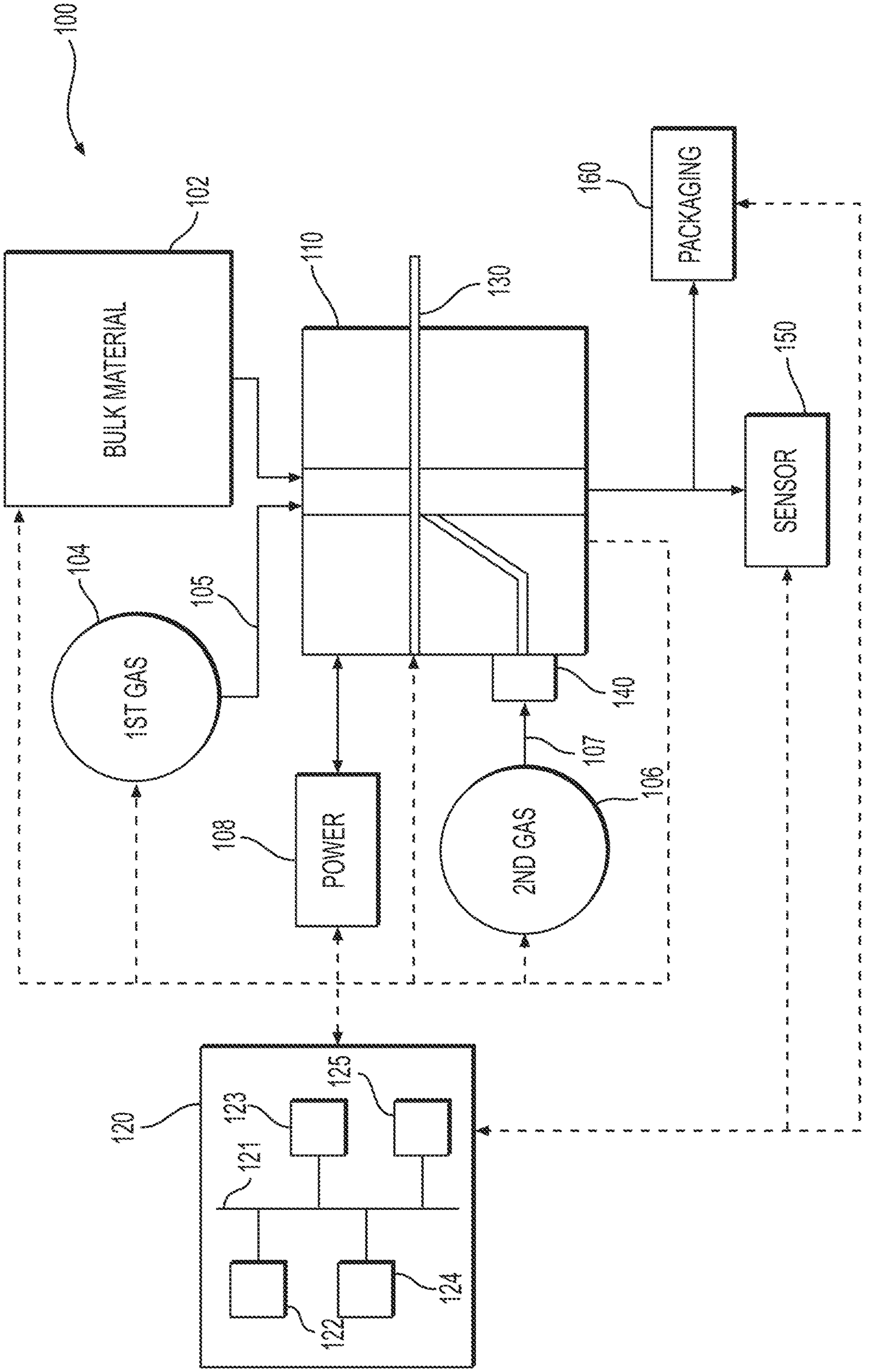
FIG. 1A is a schematic diagram view of an apparatus that includes a channel assembly, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although channels and/or conduits described herein may be illustrated and/or described as being cylindrical, other channel and/or conduit cross-sectional forms are contemplated, such as square, rectangular, oval, triangular and others.

Figure 1B:
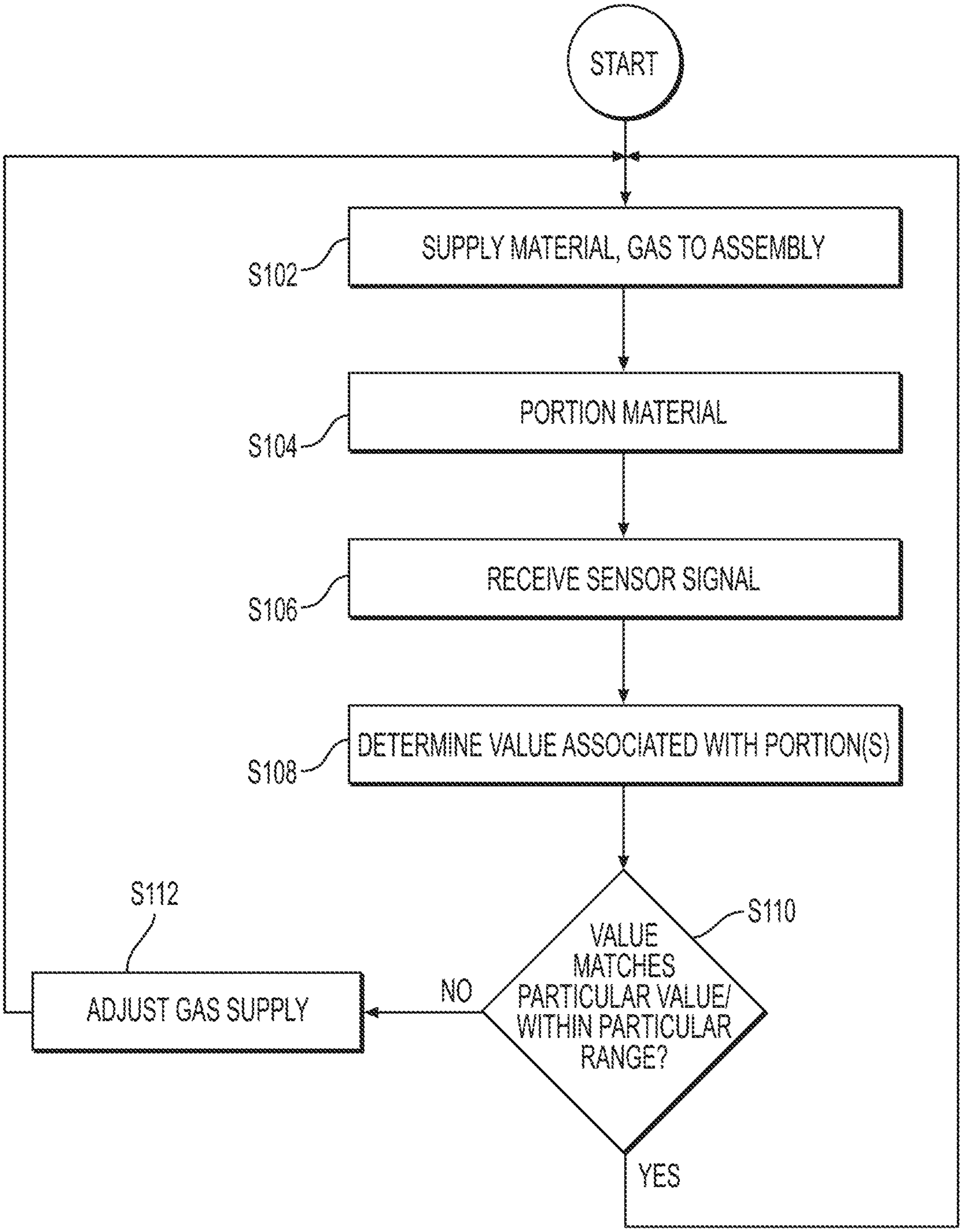
FIG. 1B is a flowchart illustrating operations that may be performed with regard to an apparatus, according to some example embodiments.

FIG. 1A is a schematic diagram view of an apparatus 100 that includes a channel assembly 110, according to some example embodiments. FIG. 1B is a flowchart illustrating operations that may be performed with regard to an apparatus, according to some example embodiments. The operations shown in FIG. 1B may be implemented with regard to the apparatus 100 shown in FIG. 1A, in some example embodiments. One or more of the operations shown in FIG. 1B may be implemented by one or more elements of apparatus 100 shown in FIG. 1A, including some or all of control device 120 and/or one or more elements based on control signals received from control device 120.

In some example embodiments, including the example embodiments shown in FIG. 1A, an apparatus 100 includes a material supply source 102, a gas source 104 (also referred to herein interchangeably as a "first gas source"), a power supply 108, a gas source 106 (also referred to herein interchangeably as a "second gas source"), a channel assembly 110, a control device 120, a cutting assembly 130, a discharge assembly 140, a sensor device 150, and a packaging assembly 160. In some example embodiments, gas source 106 is absent from apparatus 100.

The apparatus 100 may be configured to provide ("produce," "manufacture," "fabricate," etc.) portioned instances of a compressible material that is initially held in the material supply source 102 based on controlling the channel assembly 110 and the cutting assembly 130 to implement segmenting ("portioning," "severing," etc.) of a bulk instance of the compressible material, supplied into the channel assembly 110 from the material supply source 102, into one or more portioned instances of the compressible material. The apparatus 100 may provide said portioned instances to the packaging assembly 160 to be packaged, individually or in groups, to be provided as an end product.

As described further herein, the channel assembly 110 may include upper and lower assemblies that collectively define a continuous channel extending through the channel assembly 110, and the compressible material may be supplied from the material supply source 102 into the continuous channel of the channel assembly 110. As described herein, compressible material supplied ("inserted") into the channel assembly 110 may be referred to as a "bulk instance" of the compressible material.

The gas source 104 may supply a first gas 105 (e.g., via a first flow conduit as represented by the line representation of the first gas 105 in FIG. 1A) to the channel assembly 110 to compress the bulk instance in the channel assembly 110. The first gas 105 may be supplied at a pressure ("positive pressure") that exceeds the ambient pressure of the ambient environment surrounding the apparatus 100. For example, the gas source 104 may be configured to supply the first gas 105 to the channel assembly 110 at a pressure of about 10 psig. The first gas 105 may be supplied through an upper portion of the upper assembly of the channel assembly 110 and thus may compress the bulk instance of compressible material in the channel assembly 110 to cause the bulk instance to have a new density. The gas source 104 may control the flow ("flow rate," "flow velocity," some combination thereof, or the like) of the first gas 105. For example, the gas source 104 may include a gas flow control valve that is configured to be controlled (e.g., by control device 120) to adjust, inhibit, initiate, etc. the flow of the first gas 105 supplied by the gas source 104.

The channel assembly 110 may segment the bulk instance of compressible material into one or more portioned instances. The gas source 106 may supply ("provide") a second gas 107 to the channel assembly 110 (e.g., via a second flow conduit as represented by the line representation of the second gas 107 in FIG. 1A) via discharge assembly 140 to cause the one or more portioned instances to be discharged from the channel assembly 110. Thus, the gas source 106 may be understood to be configured to supply the second gas 107 to the channel assembly 110 via discharge assembly 140 to discharge the one or more portions instances from the channel assembly 110. The gas source 106 may control the flow ("flow rate," "flow velocity," some combination thereof, or the like) of the second gas 107. For example, the gas source 106 may include a gas flow control valve that is configured to be controlled (e.g., by control device 120) to adjust, inhibit, initiate, etc. the flow of the second gas 107 supplied by the gas source 104. The discharge assembly 140 may include an interface configured to couple with the gas source 106 (e.g., via a flow conduit) and may include an interface configured to couple with an inlet of the channel assembly 110. It will be understood that the discharge assembly 140 as shown in FIG. 1A may include any of the discharge assemblies described herein, including any embodiments of the discharge assembly 240 illustrated and described with reference to at least FIGS. 2-3 and 5A-5D and the discharge assembly 740 illustrated and described with reference to at least FIGS. 7-14.

In some example embodiments, the gas sources 104 and 106 (sometimes referred to as "first" and "second" gas sources, respectively) are the same gas source (a common gas source) configured to supply a common gas, via separate flow conduits (e.g., the aforementioned first and second flow conduits) and/or separate gas flow control valves, to compress the bulk instance and to discharge the one or more portioned instances, respectively. The first and second gases may be supplied, by a common gas source and/or different gas sources, to the channel assembly 110 at a common pressure or at different pressures. The first and second gases, as described herein, may be any gas, including air. In some example embodiments, including example embodiments where the gas source 104 and the gas source 106 are different gas sources, the first and second gasses may be different gases.

The power supply 108 may be a device configured to supply electrical and/or mechanical power to one or more portions of the apparatus 100, including one or more portions of the channel assembly 110, to cause the apparatus 100 to function. For example, the power supply 108 may supply power to control the supply of first and second gases to the channel assembly 110, control movement of one or more portions of the channel assembly 110, control movement of the cutting assembly 130, some combination thereof, or the like. In some example embodiments, the power supply 108 may be an electrical motor (e.g., an AC electrical motor).

In some example embodiments, one or more characteristics of the portioned instances to be packaged may be controlled in order to provide a packaged product having one or more relatively consistent characteristics. For example, in some example embodiments, at least a portion of the apparatus 100 (e.g., the control device 120) may be configured to control the density, weight, and/or volume of portioned and packaged instances of a material in order to ensure that each package of portioned material includes an approximately common mass, volume, density, and/or shape of material, thereby providing a relatively consistent end product to consumers.

In some example embodiments, based on the material to be portioned for packaging of the individual portioned instances thereof being a compressible material, at least the density and/or weight of the individual portioned instances of the material may be at least partially controlled (e.g., by at least a portion of apparatus 100, including control device 120) based on compressing a bulk instance of the material within the channel assembly 110 to achieve a particular density of the bulk instance and then segmenting the compressed bulk instance into multiple portions, such that each portioned instance may have a relatively common density that is at least approximately the particular density.

The control device 120 may be communicatively coupled to some or all of the elements of the apparatus 100, as shown in FIG. 1A. The control device 120 may be configured to control some or all of the elements of the apparatus 100 to control the production and provision of portioned instances by the channel assembly 110.

As shown in FIG. 1A, the control device 120 may include a processor 122, a memory 123, a control interface 124, and a communication interface 125, electrically coupled via a common bus 121. The memory 123 may be a non-transitory computer-readable storage medium. The memory 123 may store one or more programs of instruction, and the processor 122 may execute the one or more programs of instruction to implement one or more functions, including controlling one or more portions of the apparatus 100 and/or causing the apparatus 100 to perform one or more operations. Referring now to methods described herein, particularly with regard to one or more flowchart drawings described further herein, one or more operations of said methods may be implemented by the control device 120 based at least on the processor 122 executing one or more programs of instruction stored in the memory 123. The processor 122 may generate one or more control signals to control one or more elements of apparatus 100 based on executing the one or more programs of instruction.

The control interface 124 may be configured to receive control commands, including commands provided by an operator based on manual interaction with the control interface. The control interface 124 may be a manual interface, including a touchscreen display interface, a button interface, a mouse interface, a keyboard interface, some combination thereof, or the like. Control commands received at the control interface 124 may be forwarded to processor 122 via the bus 121, and the processor 122 may execute one or more programs of instruction, for example to adjust operation of one or more portions of the apparatus 100, based on the control commands.

The communication interface 125 is communicatively coupled to one or more of the elements of apparatus 100, for example as shown by the dashed-line elements in FIG. 1A. The communication interface 125 may be communicatively coupled to an element via one or more of a wired electrical connection (e.g., a communication wire and/or circuitry), a wireless network connection, some combination thereof, or the like. The communication interface 125 may receive data generated by one or more of the elements and forward said data to the processor 122, via bus 121, for processing. The communication interface 125 may transmit control signals to one or more of the elements of apparatus 100, based on operation of the processor 122, to cause the one or more elements to operate as controlled by the processor 122.

Sensor device 150 is configured to generate data signals (also referred to herein as simply "sensor data") based on monitoring one or more aspects of a portioned instance of the compressible material that is discharged by the channel assembly 110. In some example embodiments, the sensor device 150 is a weight scale device that is configured to generate data signals associated with a weight of a portioned instance based on the portioned instance interacting with a sensing element of the sensor device 150. The data signals may be communicated to control device 120 via communication interface 125, and the processor 122 may process the data signals to determine a weight of the portioned instance.

In some example embodiments, the control device 120 (e.g., the processor executing a program of instructions) may be configured to determine one or more characteristics of a portioned instances based on an instance of sensor data received from the sensor device 150. For example, the memory 123 may store information indicating a volume of portioned instances, and the processor 122 may be configured to determine a density of a portioned instance based on the stored volume and further based on processing sensor data received from sensor device 150 to determine a weight and/or mass of the portioned instance.

Referring now to FIG. 1B, in some example embodiments, the control device 120 may monitor one or more aspects ("characteristics," "properties," etc.) of one or more portioned instances discharged by the channel assembly 110 and may responsively adjust one or more elements of the apparatus 100 to control the one or more aspects to be within a particular range of values or to match a particular value.

At S102, the control device 120 may control the material supply source 102 (e.g., based on generating control signals that, when received at the material supply source 102, cause a supply valve, pump, conveyer device, etc., to actuate to control a flow of compressible material from the material supply source 102) to cause the material supply source 102 to supply compressible material to the channel assembly 110.

At S104, the control device 120 may control one or more elements of the apparatus 100 (e.g., the gas source 104, the power supply 108, the cutting assembly 130, the gas source 106, some combination thereof, or the like) to cause one or more portioned instances of the compressible material to be produced at the channel assembly 110. Such an operation is described further below with reference to FIGS. 4 and FIGS. 5A-5D.

At S106, the control device 120 may receive sensor data ("data signals") from the sensor device 150 based on the produced one or more portioned instances interacting with a sensing element of the sensor device 150 and the sensor device 150 responsively generating one or more data signals that are communicated to the control device 120. In some example embodiments, the sensor device 150 may be a weight sensor (e.g., a weight scale) configured to generate data signals associated with the weight of a portioned instance interacting with a sensing element of the weight sensor.

At S108, the control device 120 may process the received sensor data to determine a value associated with one or more particular aspects ("characteristics," "properties," etc.) of the produced one or more portioned instances. For example, where the sensor device 150 generating the sensor data is a weight sensor, the control device 120 may process the received sensor data to determine a weight ("mass") value associated with the produced one or more portioned instances. In another example, for example where the control device 120 stores data indicating a predicted volume of produced portioned instances, the control device 120 may process the received sensor data (associated with weight values) to determine a density value associated with the produced one or more portioned instances.

A value determined based on processing sensor data received from sensor device 150 may be an arithmetic value (e.g., a mean value, a median value, or the like) associated with one or more particular aspects associated with a set or range of discharged portioned instances (e.g., the last 10 produced portioned instances, the portioned instances produces within the last 30 minutes, etc.) For example, the control device 120 may maintain and continuously update a running mean weight of the last 20 portioned instances produced by channel assembly 110. The control device 120 may update the running mean weight based on processing received sensor data from sensor device 150 to determine a weight of a most recently-produced portioned instance and updating the running mean weight value based on the determined weight.

At S110, the control device 120 may compare the value determined at S108 (e.g., an arithmetic value) to a particular (or, alternatively, predetermined) value or range of values to determine whether the arithmetic value matches the particular value or is within the range of values. The particular value or range of values may be stored at the control device 120 (e.g., in memory 123). If so, the process as shown in FIG. 1B may repeat. If not, as shown at S112, the control device 120 may control one or more elements of the apparatus 100 to cause the one or more aspects of subsequently-produced portioned instances to match the particular value or be within the range of values. For example, based on the control device 120 determining that the mean weight of the ten most recently-produced portioned instances is less than the values in a particular range of weight values, the control device 120 may determine that the density of the portioned instances is too low and thus may control the gas source 104 to increase the pressure of the first gas 105 supplied to the channel assembly 110, thereby increasing the compression of the bulk instance held in the channel assembly 110 and thus causing the density of the bulk instance and the portioned instances to increase as well.

As a result, the apparatus 100 may be configured to rapidly adjust one or more elements thereof (e.g., the supply of first gas 105) to rapidly adjust one or more characteristics (e.g., density) of produced portioned instances without requiring complicated adjustments to the apparatus 100. Furthermore, because the operations shown in FIG. 1B may be performed without taking apparatus 100 offline, the adjustments may be performed without slowing or stopping the production of portioned instances. Thus, the apparatus 100 may be configured to produce portioned instances of compressible material that have one or more desired aspects with improved efficiency and with reduced costs.

Figure 2:
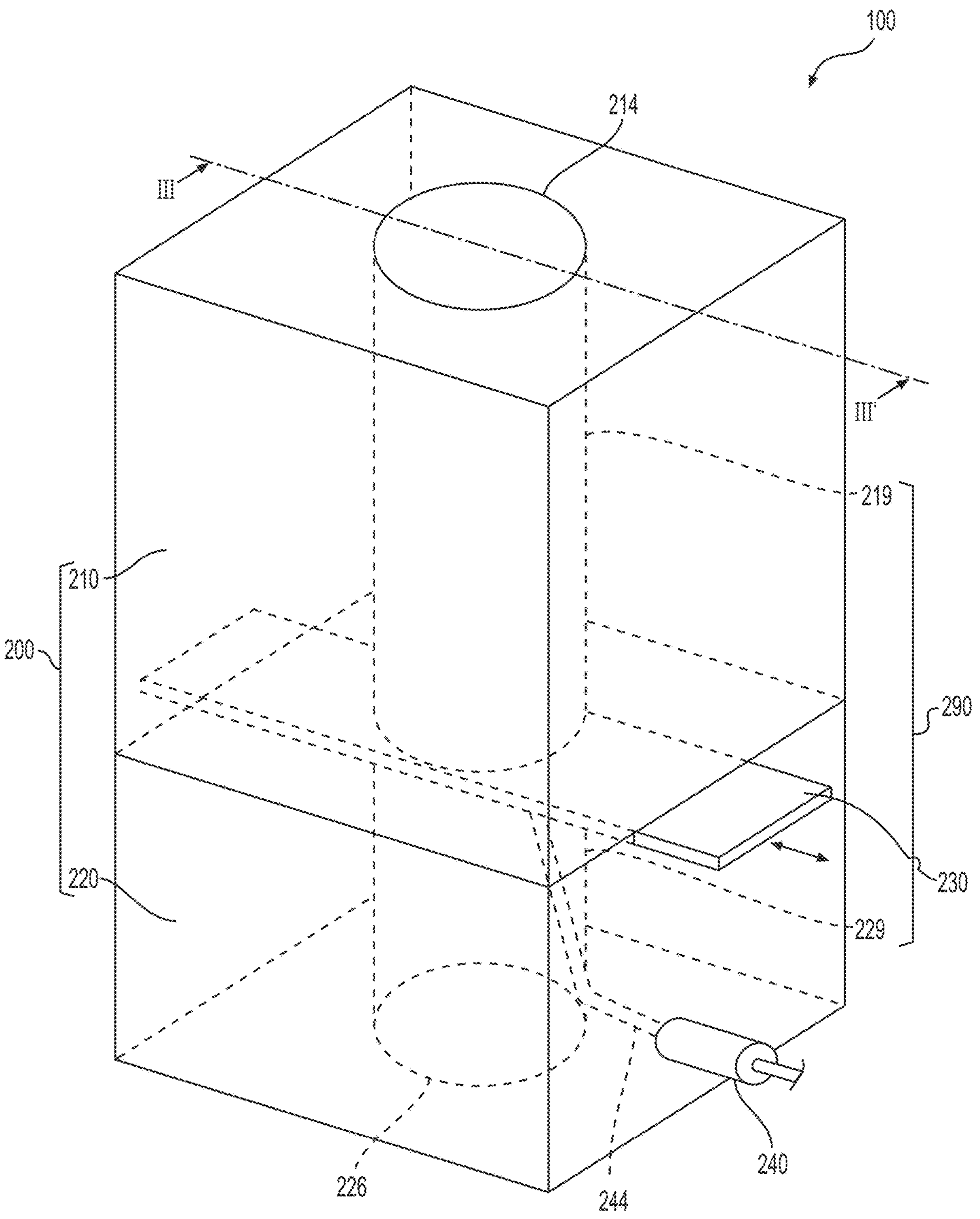
FIG. 2 is a perspective view of an apparatus that includes a channel assembly and a cutting assembly, according to some example embodiments.
Figure 3:
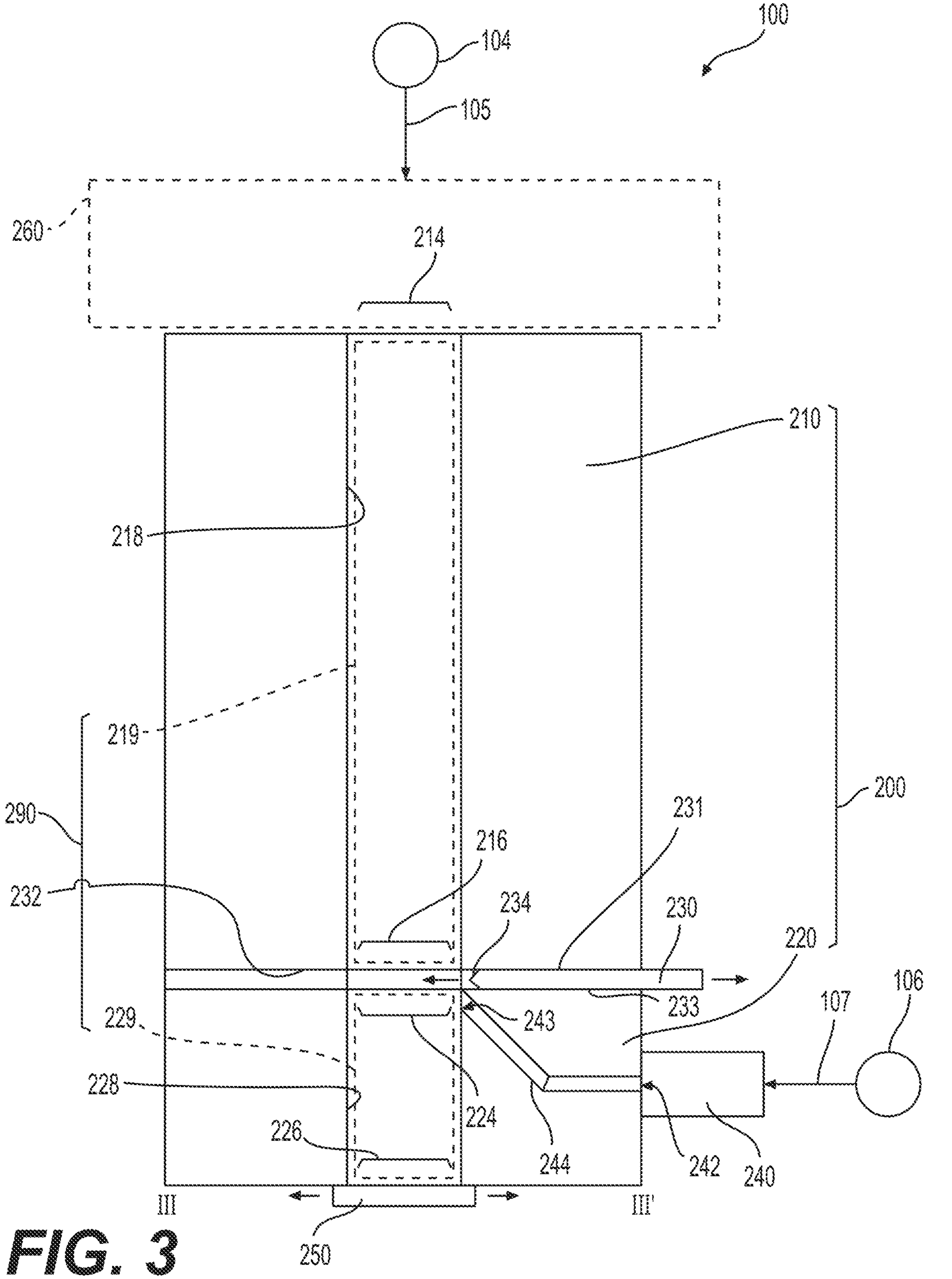
FIG. 3 is a side cross-sectional view along line III-III' of the channel assembly and cutting assembly of FIG. 2.

FIG. 2 is a perspective view of an apparatus 100 including a channel assembly 200 and cutting assembly 230, according to some example embodiments. FIG. 3 is a side cross-sectional view along line III-III' of the channel assembly 200 of FIG. 2. The channel assembly 200 may be included in, and/or may be, the channel assembly 110 of apparatus 100 as shown in FIG. 1A. The cutting assembly 230 may be included in, and/or may be, the cutting assembly 130 of apparatus 100 as shown in FIG. 1A.

In some example embodiments, an apparatus 100 includes a channel assembly that includes an upper assembly and a lower assembly, where the upper assembly includes an upper inner surface defining an upper channel, the lower assembly includes a lower inner surface defining a lower channel, the upper inner surface and the lower inner surface collectively at least partially define a continuous channel including the upper and lower channels, the upper assembly defines a top opening of the continuous channel, and the lower assembly defines a bottom opening of the continuous channel. For example, as shown in FIGS. 2-3, channel assembly 200 includes an upper assembly 210 and a lower assembly 220. Upper assembly 210 includes an upper inner surface 218 defining an upper channel 219, and lower assembly 220 includes a lower inner surface 228 defining a lower channel 229. As shown in FIGS. 2-3, the upper inner surface 218 and the lower inner surface 228 collectively at least partially define a continuous channel 290 that includes the upper channel 219 and the lower channel 229.

As further shown in FIGS. 2-3, the upper assembly 210 defines a top opening 214 and a bottom opening 216 of the upper channel 219, and the lower assembly 220 defines a top opening 224 and a bottom opening 226 of the lower channel 229. The bottom opening 216 and top opening 224 are proximate to and in fluid communication with each other, such that the upper channel 219 and the lower channel 229 are in continuous fluid communication with each other and thus collectively at least partially define a continuous channel 290. The top opening 214 defines a top opening of the continuous channel 290, and thus the upper assembly 210 defines top opening 214 as the top opening of the continuous channel 290. The bottom opening 226 defines a bottom opening of the continuous channel 290, and thus the lower assembly 220 defines a bottom opening of the continuous channel 290.

In some example embodiments, including the example embodiments shown in FIGS. 2-3, and as further shown in FIGS. 5A-5D, described further below, a channel assembly may be configured to hold a bulk instance of a compressible material extending continuously through both the upper channel and the lower channel. For example, as shown in at least FIGS. 5A-5D, the channel assembly 200 may hold a bulk instance of a compressible material that extends continuously through the continuous channel 290 to thus extend continuously through both the upper channel 219 and the lower channel 229.

Referring back to FIGS. 2-3, in some example embodiments, a gas source may be configured to supply a first gas through the top opening of a continuous channel to compress a bulk instance held within the continuous channel, such that the bulk instance includes an upper material portion in the upper channel and a lower material portion in the lower channel. For example, as shown in FIGS. 2-3, and with reference to FIG. 1A, apparatus 100 may include a gas source 104 that may be configured to supply a first gas 105 through the top opening 214 of the continuous channel 290 to compress a bulk instance held within the continuous channel 290. A portion of the compressed bulk instance held in the lower channel 229 may be referred to as a lower material portion, and a portion of the compressed bulk instance held in the upper channel 219 may be referred to as an upper material portion.

As shown in FIGS. 2-3, an apparatus 100 may include an enclosure 260 that is in fluid communication with both the top opening 214 and the gas source 104. The enclosure may be at least partially defined by one or more surfaces, including a top surface of the upper assembly 210 as shown in at least FIG. 3. The gas source 104 may supply the first gas 105 into the enclosure 260 to pressurize the enclosure 260 with the first gas 105. As a result, the first gas 105 may be supplied relatively uniformly into the continuous channel 290 of the channel assembly 200 from the enclosure 260 through the top opening 214. The first gas 105 may be supplied at a sufficient amount and pressure so as to cause the pressure of first gas 105 in at least the enclosure 260 and the upper channel 219, and thus applied to an upper surface of the bulk instance of compressible material held in the continuous channel 290, to exceed an ambient pressure of an ambient environment as described herein. Based on providing a relatively uniform flow of pressurized first gas 105 through the top opening 214 and downwards through at least the upper channel 219, the apparatus 100 may compress a bulk instance of compressible material held in the continuous channel 290 through the application of pressurized first gas 105.

Still referring to FIGS. 2-3, an apparatus 100 may include a cutting assembly. The cutting assembly may be configured to move in relation to a channel assembly to extend transversely through the continuous channel between the upper channel and the lower channel of the channel assembly, such that the lower material portion is severed from the upper material portion to establish the lower material portion as the portioned instance, and the cutting assembly isolates the lower channel from the upper channel. The severing of the lower material portion from the upper material portion may also be referred to herein as "producing" the portioned instance of the compressible material.

As shown in FIGS. 2-3, a bottom surface of the upper assembly 210 and a top surface of the lower assembly 220 collectively define a transverse conduit 232 extending transversely, in relation to the continuous channel 290, between the upper assembly 210 and the lower assembly 220. As referred to herein, extending transversely ("transverse") to a channel includes extending transversely to a longitudinal axis of the channel. In the example embodiments shown in FIGS. 2-3, for example, the upper surface of the lower assembly 220 includes a recess that establishes the transverse conduit 232 between the recessed portion of the upper surface of the lower assembly 220 and a non-recessed lower surface of the upper assembly 210. It will be understood, however, that the transverse conduit 232 may be at least partially defined by a recessed portion of the lower surface of the upper assembly 210, in addition to or in alternative to a recessed portion of the upper surface of the lower assembly 220.

As further shown in FIGS. 2-3, apparatus 100 may include a cutting assembly 230. As further shown in FIGS. 2-3, the cutting assembly 230 is configured to adjustably extend through the transverse conduit 232 to move transversely in relation to (e.g., perpendicularly to) the longitudinal axis of the continuous channel 290. As shown in FIGS. 2-3, the cutting assembly 230 may extend ("move") transversely through the continuous channel 290, between the upper channel 219 and the lower channel 229. The cutting assembly 230 may further include an edge portion 234 that is configured to cut through any material that is located within the portion of the transverse conduit 232 that at least partially defines a portion of the continuous channel 290 between the upper channel 219 and the lower channel 229. It will be understood that the portion of the transverse conduit 232 that at least partially defines a portion of the continuous channel 290 may be considered to be a portion of a bottom end of the upper channel 219 and/or a portion of a top end of the lower channel 229.

In some example embodiments, including the example embodiments shown in FIGS. 2-3, as a result of the cutting assembly 230 extending transversely to the continuous channel 290, the cutting assembly 230 may isolate the lower channel 229 from the upper channel 219, such that an upper surface 231 of the cutting assembly 230 is in fluid communication with, and defines a bottom boundary of, the upper channel 219, and a lower surface 233 of the cutting assembly 230 is in fluid communication with, and defines a top boundary of, the lower channel 229.

In addition, where a bulk instance of compressed material extends through the upper channel 219 and the lower channel 229, and as a result of the cutting assembly 230 extending transversely to the continuous channel 290, the cutting assembly 230 may sever the lower material portion of the bulk instance (held in the lower channel 229) from the upper material portion of the bulk instance (held in the upper channel 219). For example, as noted above, the cutting assembly 230 may include an edge portion 234 that is configured to cut through the bulk instance of the compressed material based on the cutting assembly 230 moving transversely through the channel assembly 200 between the upper channel 219 and the lower channel 229.

The severed lower material portion may be referred to herein as a portioned instance of the compressible material. As a result, severing the lower material portion from the upper material portion may be referred to herein as producing the portioned instance of the compressible material, where the severed material portion is the portioned instance.

In some example embodiments, the apparatus 100 includes a discharge assembly configured to supply a second gas into the lower channel to discharge the portioned instance through the bottom opening based on directing the second gas through a conduit assembly of the lower assembly to impinge on a lower face of the cutting assembly in the lower channel.

For example, as shown in FIGS. 2-3, apparatus 100 may include a discharge assembly 240 and a conduit assembly 244. The conduit assembly 244 extends through an interior of the lower assembly 220 and thus may be considered to be a part of the lower assembly 220. Thus, the conduit assembly 244 may be referred to herein as a conduit assembly 244 of the lower assembly 220. The discharge assembly 240 is configured to receive a second gas 107 from the gas source 106 of the apparatus 100. As noted above with reference to FIG. 1A, in some example embodiments, the gas source 104 and the gas source 106 are a common gas source, such that the first gas 105 and the second gas 107 are both a common type of gas that is supplied, independently of each other in independent flow conduits, from a common source.

Still referring to FIGS. 2-3, the conduit assembly 244 extends from an opening ("inlet 242") in an outer surface of the lower assembly 220 and through the interior of the lower assembly 220 to an opening ("outlet 243") in the lower inner surface 228 at a location, at a top end of the lower inner surface 228, that is proximate to the top opening 224 of the lower channel 229. Thus, as the portion of the lower channel 229 that is proximate to the top opening 224 will be understood herein to be a top portion of the lower channel 229, it will further be understood that the conduit assembly 244 extends through the interior of the lower assembly 220 such that the outlet 243 of the conduit assembly 244, which is shown in FIGS. 2-3 to be in a top end of the lower inner surface 228, is in fluid communication with the top portion of the lower channel 229. As a result, the discharge assembly 240, shown in FIGS. 2-3 to be in fluid communication with inlet 242 of the conduit assembly 244, is configured to direct the second gas 107 received from the gas source 106 through the conduit assembly 244 and into the top portion of the lower channel 229.

As further shown in FIGS. 2-3, the conduit assembly 244 is oriented such that the outlet 243 of the conduit assembly 244 is directed towards the top opening 224 of the lower channel 229. Based on the cutting assembly 230 being in an extended position, such that the lower surface 233 of the cutting assembly 230 defines a top boundary of the lower channel 229 and isolates the lower channel 229 from the upper channel 219, the conduit assembly 244 is configured to direct the second gas 107 through the outlet 243 to impinge directly on to the lower surface 233 of the extended cutting assembly 230. Such an impinging flow of the second gas 107 on the lower surface 233 may be redirected by the lower surface 233 throughout the top portion of the lower channel 229, as described further below with reference to FIG. 5D. The increased pressure in the top portion of the lower channel 229 that is caused by the second gas 107 directed into the top portion of the lower channel 229 may induce a relatively uniform downwards pressure on a top portion of the portioned instance of compressible material held in the lower channel 229, thereby pushing the portioned instance downwards and through the bottom opening 226 to be discharged from the channel assembly 200.

Still referring to FIGS. 2-3, the apparatus 100 may include a sealing plate 250 that is configured to move to reversibly seal or expose the bottom opening 226 of the channel assembly 200. The sealing plate 250 may be connected to the channel assembly 200 (e.g., slidably as shown in FIG. 3, hingedly via a hinge, or the like). The sealing plate 250 may not be directly connected to the channel assembly 200 and may be configured (e.g., based on control by the control device 120 shown in FIG. 1A) to move in relation to the channel assembly 200 to reversibly seal or expose the bottom opening 226 of the channel assembly 200.

Based on the sealing plate 250 sealing the bottom opening 226, the sealing plate 250 may restrict any compressible material held in at least the lower channel 229 of the channel assembly 200 to remain within the channel assembly 200. For example, the sealing plate 250 may be in a closed position ("configuration"), as shown in at least FIG. 3, in order to preclude compressible material from being forced through the bottom opening 226 by the first gas 105 in response to first gas 105 being supplied through the top opening 214 to compress the bulk instance of compressible material within the continuous channel 290 of the channel assembly 200. In another example, the sealing plate 250 may be in an open position while second gas 107 is directed through the conduit assembly 244 of the discharge assembly 240 to discharge the portioned instance of the compressible material out of the channel assembly through the bottom opening 226.

The sealing plate 250 position ("configuration") may be at least partially controlled by a control device, including the control device 120 shown in FIG. 1A. In some example embodiments, including example embodiments described below in relation to at least FIGS. 7-14, the position of the sealing plate 250 in relation to the channel assembly 200 may be controlled based on controlling a position of the channel assembly in relation to the sealing plate 250.

Figure 4:
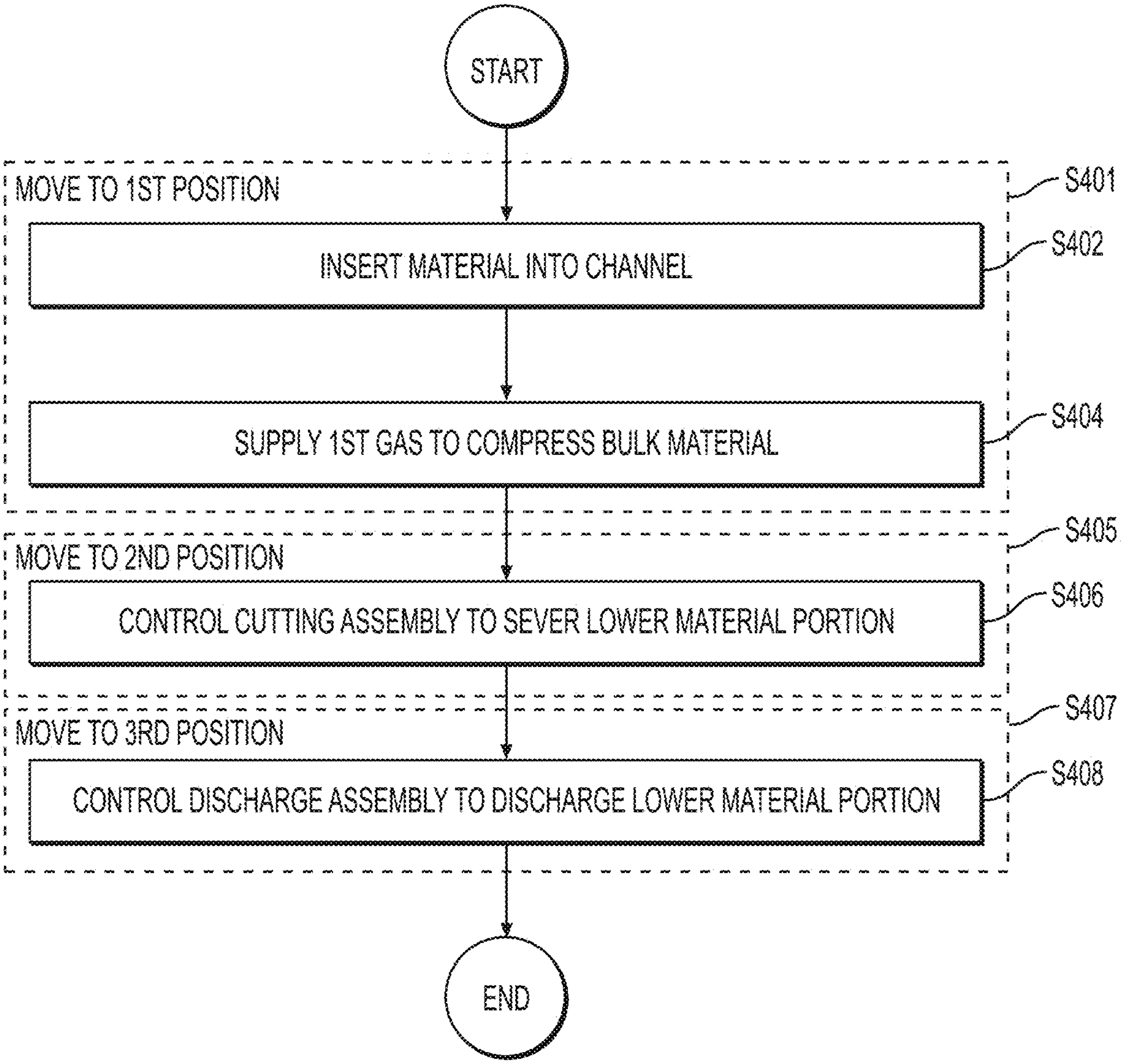
FIG. 4 is a flowchart illustrating operations that may be performed with regard to an apparatus that includes a channel assembly, according to some example embodiments.

FIG. 4 is a flowchart illustrating operations that may be performed with regard to an apparatus that includes a channel assembly, according to some example embodiments. FIGS. 5A, 5B, 5C, and 5D are side cross-sectional views along line III-III' of the apparatus of FIG. 2 that illustrate operations shown in the flowchart of FIG. 4, according to some example embodiments. One or more of the operations shown in FIG. 4 may be implemented by one or more elements of apparatus 100 shown in FIG. 1A, including some or all of control device 120 and/or one or more elements of apparatus 100 operating based on one or more control signals received from control device 120.

Figure 5A:
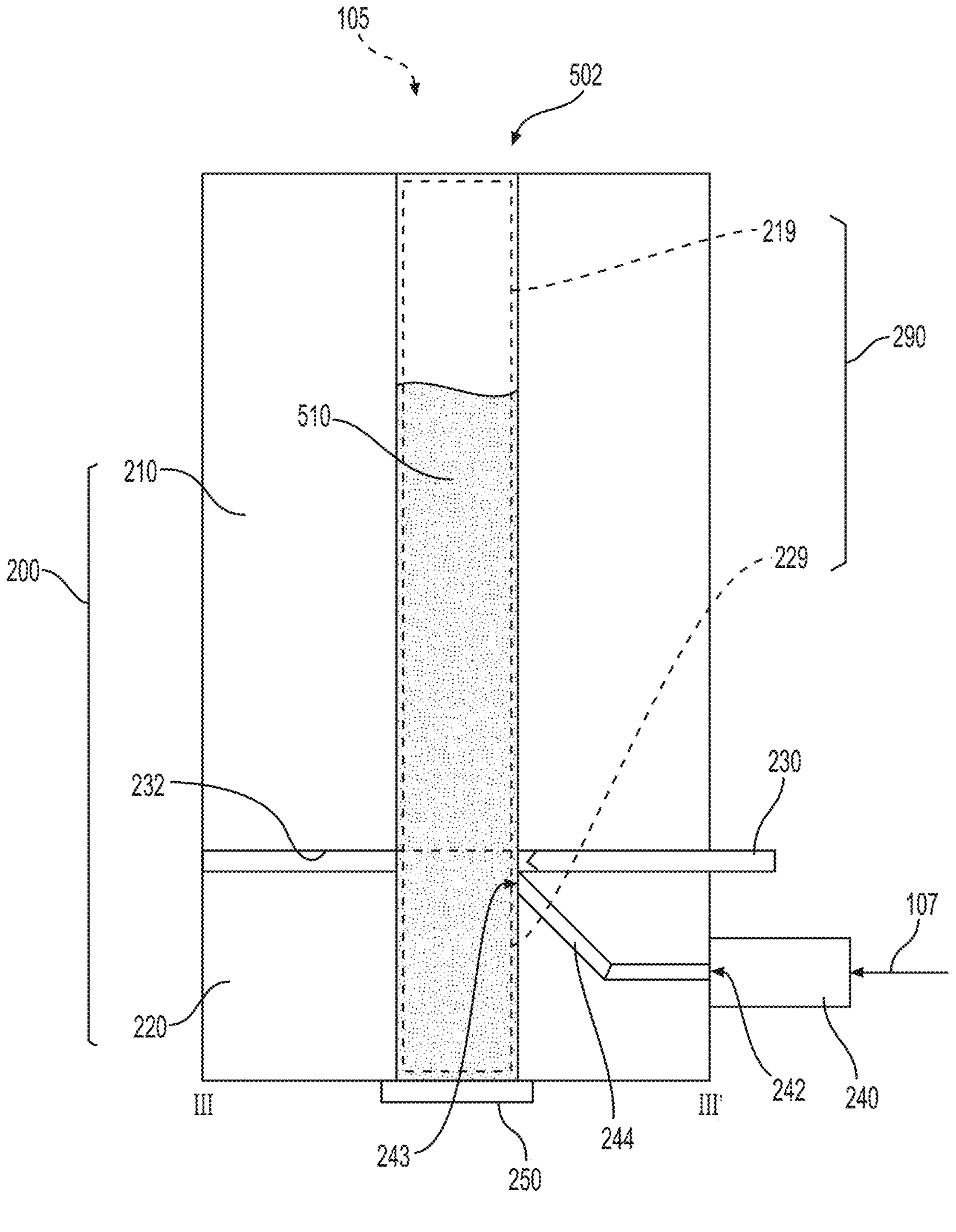
FIGS. 5A, 5B, 5C, and 5D are side cross-sectional views along line III-III' of the apparatus of FIG. 2 that illustrate operations shown in the flowchart of FIG. 4, according to some example embodiments.

Referring first to FIGS. 4 and 5A, and as shown at operation S402 of FIG. 4, compressible material 502 may be introduced ("inserted") into the continuous channel 290 of the channel assembly 200, such that the inserted compressible material defines a bulk instance 510 of the compressible material that extends continuously through the upper channel 219 and the lower channel 229 of the continuous channel 290. The introduction of compressible material 502 at S402 may be implemented by control device 120 of apparatus 100, for example based on controlling one or more elements associated with the material supply source 102 (e.g., a control valve, conveyer assembly, or the like) to cause compressible material 502 to be supplied from the material supply source 102 to be introduced into the continuous channel 290 of the channel assembly 200.

As shown in FIG. 5A, the cutting assembly 230 may be in a retracted position ("configuration") such that the cutting assembly 230 does not extend into the continuous channel 290 and does not isolate any portion of the lower channel 229 from the upper channel 219. As further shown in FIG. 5A, the discharge assembly 240 may not direct second gas 107 through the conduit assembly 244 to the top portion of the lower channel 229. In some example embodiments, the discharge assembly 240 directs a relatively small flow of second gas 107 through the conduit assembly 244 during operation S402 to establish sufficient pressurization of the conduit assembly 244 to preclude any of the compressible material from entering the conduit assembly 244 from the continuous channel 290.

In some example embodiments, a supply of the first gas 105 to the channel assembly 200 is inhibited during the insertion of compressible material 502 into the continuous channel 290 at S402. In some example embodiments, including the example embodiments shown in FIG. 5A, the first gas 105 is controlled to at least partially drive the compressible material 502 into the continuous channel 290 through the top opening 214. For example, where the apparatus 100 includes the enclosure 260 as described above with reference to FIGS. 2-3, the compressible material 502 may be introduced into enclosure 260, and the first gas 105 may be supplied into the enclosure 260 to push the compressible material 502 into the continuous channel 290 via top opening 214. The inhibition may be implemented by control device 120 of apparatus 100, for example based on controlling one or more elements associated with the gas source (e.g., a control valve) to cause a supply of first gas 105 to the continuous channel 290 of the channel assembly 200 to be inhibited.

Figure 5B:
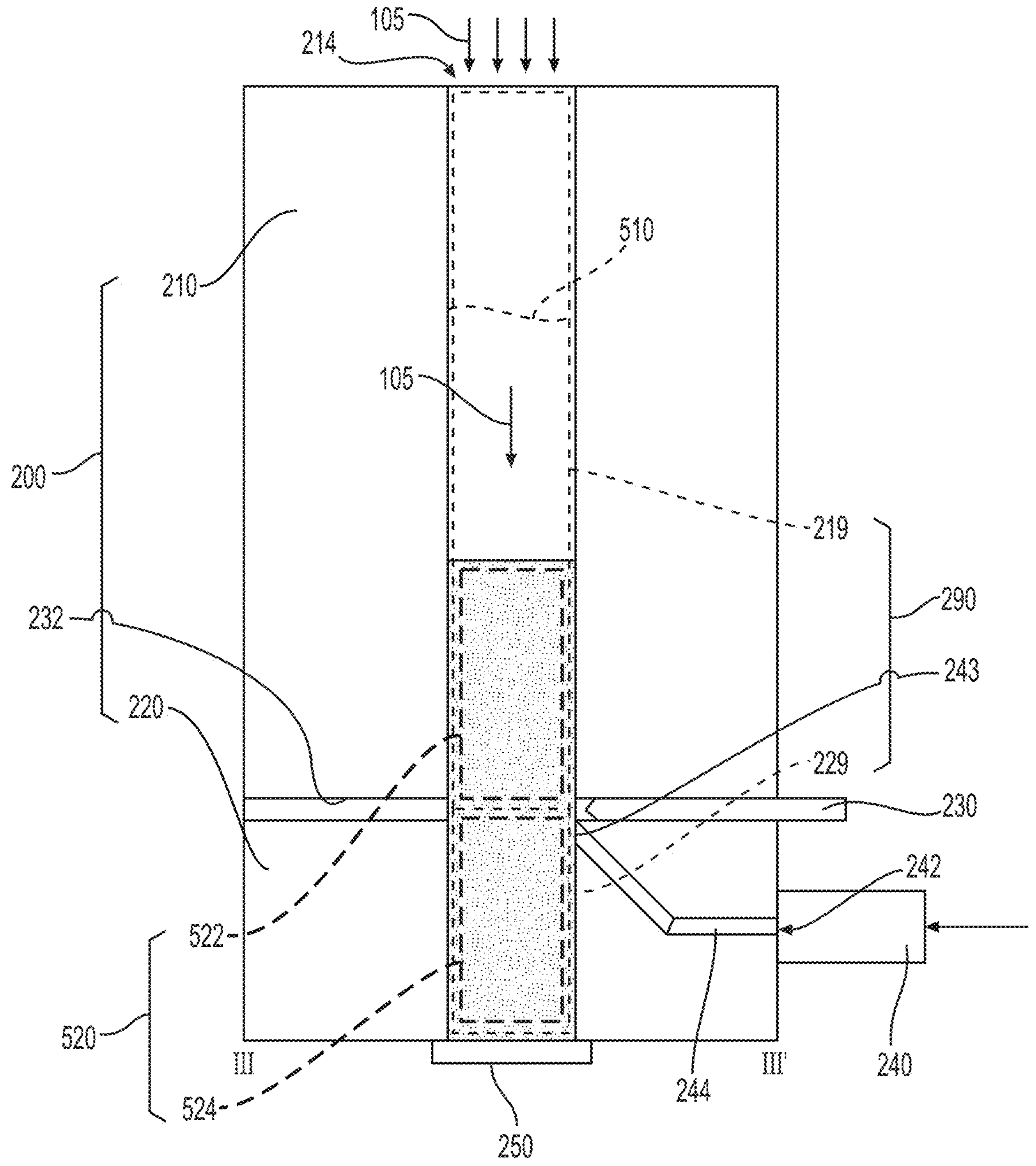

Referring now to FIGS. 4 and 5B, at S404 a gas source (e.g., the gas source 104 and/or a common gas source for the first gas 105 and the second gas 107) is controlled to supply the first gas 105 through the top opening 214 of the channel assembly 200 to compress the bulk instance 510 to establish a compressed bulk instance 520 of the compressible material. As shown in FIG. 5B, an upper material portion 522 of the bulk instance 520 is in the upper channel 219, and a lower material portion 524 of the bulk instance 520 is in the lower channel 229. The controlling of the gas source (e.g., the gas source 104 and/or a common gas source for the first gas 105 and the second gas 107) at S404 may be implemented by control device 120 of apparatus 100, for example based on controlling one or more elements associated with the gas source (e.g., a control valve) to cause the gas source to supply the first gas 105 through the top opening 214 of the channel assembly 200.

In some example embodiments, the first gas 105 is supplied (e.g., based on control of an element associated with a gas source by control device 120) at a pressure exceeding the ambient pressure surrounding the apparatus 100, such that the first gas 105 compresses the bulk instance 510 of compressible material to cause the density of the bulk instance 520 to be adjusted to a density that matches a particular density value or is within a particular range of density values. Additionally, the amount of compression (e.g., the force applied on the bulk instance 510 by the first gas 105 to achieve compression of the bulk instance 510) may be adjustably controlled (e.g., by control device 120) based on adjusting the supply of the first gas 105 to the continuous channel 290 via top opening 214 (for example, based on control device 120 controlling a gas supply valve associated with the gas source 104).

Based on utilizing the first gas 105 to achieve density adjustment of the compressible material through compression of the bulk instance 510, where the first gas 105 can be simply controlled (e.g., via control of a gas flow control valve of the gas source 104 by control device 120) to control the amount of compression and thus the resulting density of the compressed bulk instance 520, the apparatus 100 may be configured to enable relatively simplified compression and density control of the compressible material, thereby providing capital and operational savings due to reduced complexity, simplified operations, simplified adjustment operations, and mitigating a need to take the apparatus 100 off-line from operation in order to implement adjustments to the compression provided by the first gas 105. Regarding the supply of first gas 105, the utilization of moving parts may be restricted to the gas source 104 gas flow control valve that is used to control the supply of first gas 105 to the continuous channel 290, thereby representing a substantial reduction in the quantity and complexity of mechanical and/or hydraulic structures that would otherwise be used to achieve compression of the bulk instance 510.

Figure 5C:
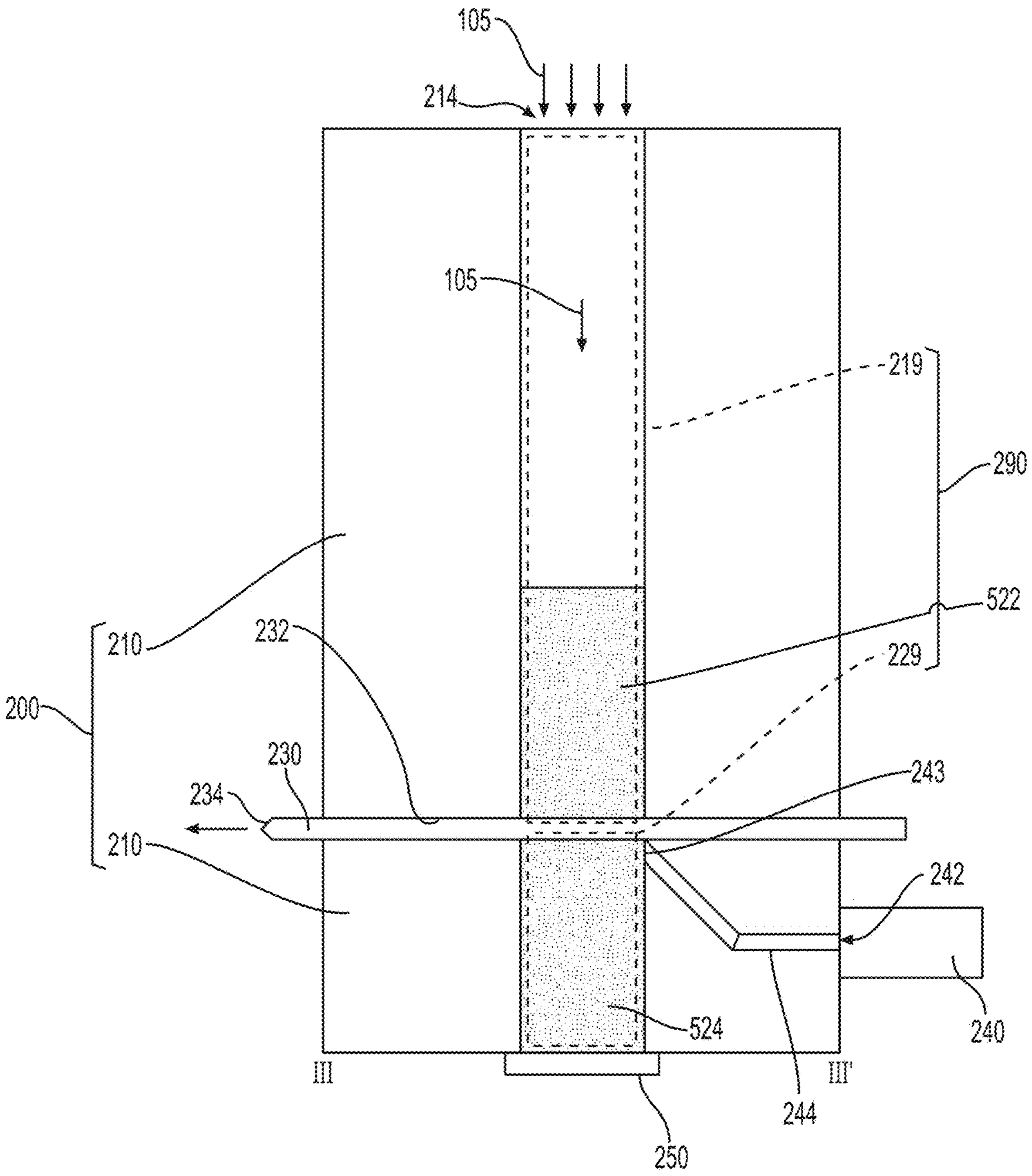

Referring now to FIGS. 4 and 5C, at S406 a cutting assembly 230 is controlled (e.g., by control device 120) to extend transversely through the continuous channel 290, based on the cutting assembly extending through transverse conduit 232, to isolate the lower channel 229 from the upper channel 219, such that the lower material portion 524 is severed from the upper material portion 522 to establish the lower material portion 524 as a portioned instance of the compressible material.

As shown, the cutting assembly 230 extends transversely through transverse conduit 232 so that the edge portion 234 of the cutting assembly 230 cuts through the bulk instance 520 to separate the upper and lower material portions 522 and 524 of the bulk instances 520 into separate, respective and isolated instances of the compressible material. The upper surface 231 of the extended cutting assembly 230 further defines a bottom boundary of the upper channel 219 holding the upper material portion 522, and the lower surface 233 of the extended cutting assembly 230 further defines a top boundary of the lower channel 229 holding the lower material portion 524. A mechanism via which the cutting assembly (e.g., 230) may be enabled to extend transversely through a transverse conduit (e.g., 232), according to at least some example embodiments, is described further below with reference to at least FIGS. 7-14.

As shown in FIG. 5C, the supply of first gas 105 may be maintained (e.g., by control device 120) concurrently with S406. In some example embodiments, the supply of first gas 105 is at least partially inhibited, such that the pressure of gas above the upper material portion 522 is reduced, in response to the cutting assembly 230 being in an at least partially fully extended position.

Figure 5D:
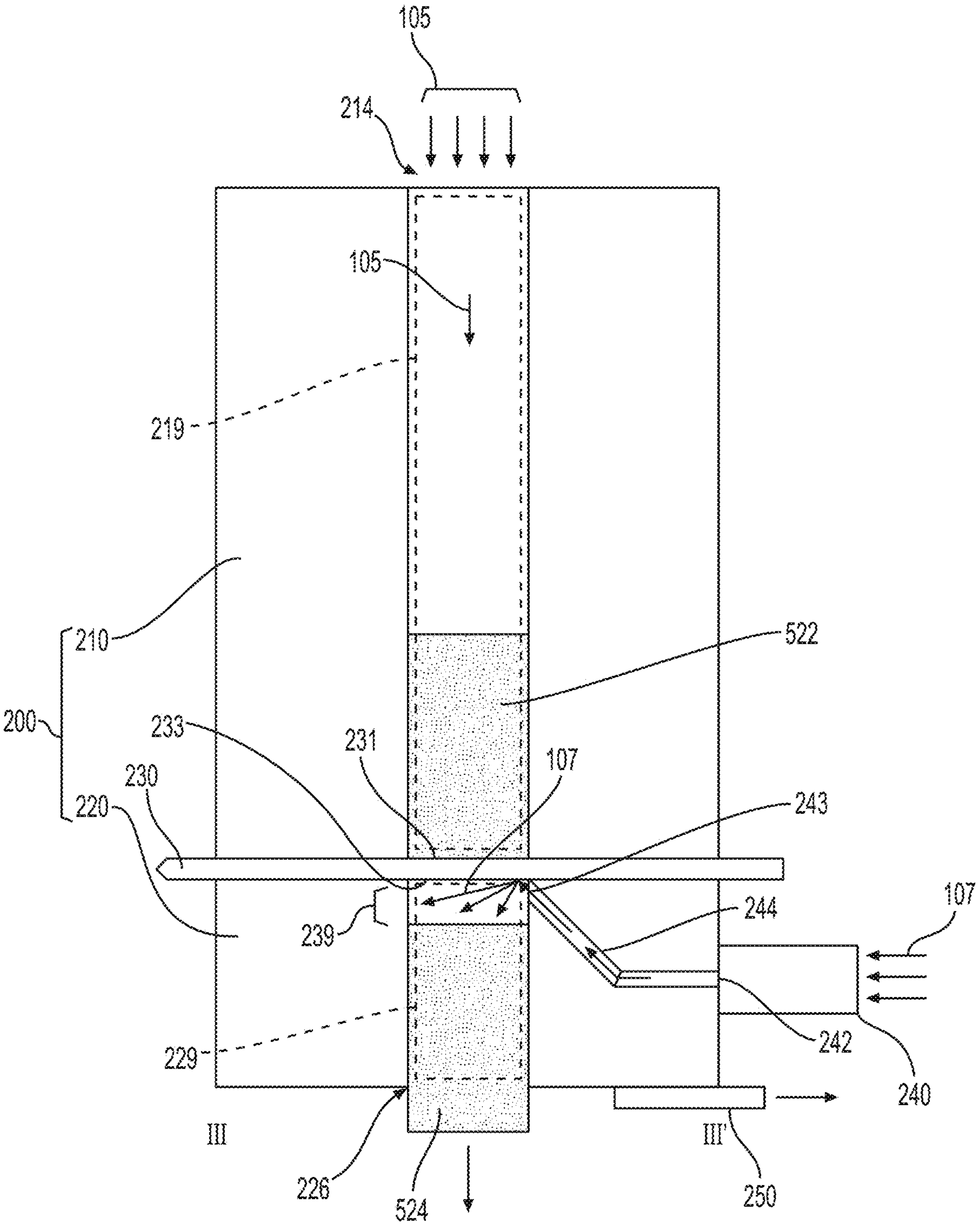

Referring now to FIGS. 4 and 5D, at S408 the discharge assembly 240 is controlled (e.g., by control device 120) to supply second gas 107 into the top portion 239 of lower channel 229 to discharge the portioned instance (lower material portion 524) through the bottom opening 226 based on directing the second gas 107 through the conduit assembly 244 of the lower assembly 220 to impinge on a lower surface 233 of the cutting assembly 230 in the lower channel 229.

As shown in FIG. 5D, the conduit assembly 244 is configured to direct the second gas 107 to enter the lower channel 229 at a top portion 239 of the lower channel 229 such that the second gas 107 impinges on the lower surface 233 of the cutting assembly 230. The impinging second gas 107 may be reflected by the lower surface 233 to distribute over a top portion of the lower material portion 524 in the top portion 239 of the lower channel 229. As shown in at least FIG. 5D, the distributed second gas 107 may relatively uniformly exert a pressure over the top portion of the lower material portion 524 and thus may push the lower material portion 524 downwards and out of the channel assembly 200 via bottom opening 226. As shown, the sealing plate 250 may controlled (e.g., by control device 120) to be in an opened configuration concurrently with the operation at S408, such that the lower material portion is discharged out of the channel assembly 200 via bottom opening 226.

In some example embodiments, the channel assembly 200 may be configured to move (e.g., based on control of the channel assembly 200 by control device 120 of apparatus 100), and one or more of the gas source 104, the cutting assembly 230, and the discharge assembly 240 may be fixed in relation to the channel assembly 200 such that one or more of operations S402-S408 is controlled based on the channel assembly 200 moving in relation to one or more positions.

As referred to herein, a "position" may include a single point location or a range of locations (e.g., a "region") in space in relation to a fixed portion of apparatus 100 (e.g., power supply 108, control device 120, material supply source 102, some combination thereof, or the like).

In some example embodiments, the gas source 104 may be fixed in relation to the channel assembly 200, such that the gas source 104 is configured to supply the first gas through the top opening 214 of the channel assembly 200 based on the channel assembly 200 moving to a first position to be in fluid communication with the gas source 104. For example, as shown in FIG. 4, at S401 the channel assembly 200 may be moved (e.g., based on control of one or more elements of apparatus 100 by control device 120) to a first position such that the channel assembly 200 is in fluid communication with gas source 104. As a result of the channel assembly 200 being moved to the first position, first gas 105 may be supplied to compress the bulk instance 510 of compressible material at S404. In addition, in some example embodiments, including the example embodiments shown in FIG. 4, compressible material may be supplied into the channel assembly 202, at S402, based on the channel assembly 200 being at least in the first position. For example, at S402, based on the channel assembly 200 being moved to at least the first position, the first gas 105 may be supplied to push compressible material into the channel assembly 200.

In some example embodiments, the gas source 104 is configured to supply a continuous supply of the first gas 105, such that the supply of the first gas 105 through the top opening 214 of the channel assembly 200 is controlled based on the channel assembly 200 moving in relation to the first position. For example, in response to the channel assembly 200 being moved away from the first position, the supply of first gas 105 to the channel assembly 200 may be inhibited, even though the gas source 104 continues to supply the first gas 105, e.g., via an at least partially opened gas flow control valve. Where the apparatus 100 includes multiple channel assemblies 200, moving a first channel assembly 200 away from the first position to thus inhibit the supply of first gas 105 to the first channel assembly 200 may further include moving a second channel assembly 200 to the first position to thus initiate the supply of first gas 105 to the second channel assembly 200, based on maintaining a continuous supply of first gas 105 from gas source 104 to any channel assembly 200 that is at the first position. Such example embodiments are described further below with reference to additional drawings.

In some example embodiments, the channel assembly 200 may be configured to move and the cutting assembly 230 may be fixed in relation to the channel assembly 200, such that the cutting assembly 230 is configured to extend transversely through the continuous channel 290 (e.g., based on control of one or more elements of apparatus 100 by control device 120) based on the channel assembly 200 moving to a second position (e.g., based on control of one or more elements of apparatus 100 by control device 120). For example, as shown in FIG. 4, at S405 the channel assembly 200 may be moved (e.g., based on control of one or more elements of apparatus 100 by control device 120) to a second position such that the channel assembly 200 moves in relation to a fixed cutting assembly 230 to cause the cutting assembly 230 to extend transversely through the continuous channel 290, for example as shown in FIG. 5C.

In some example embodiments, the second position may be different from the first position and/or may at least partially overlap with the first position. For example, where the first position is a region that encompasses the second position, such that the second position is fully overlapped by the first position, the supply of first gas 105 may be maintained to a given channel assembly 200 at S405 and S406, concurrently with the channel assembly 200 being moved to the second position to cause extension of the cutting assembly 230 transversely through the continuous channel 290 of the channel assembly 200.

In some example embodiments, the channel assembly 200 may be configured to move (e.g., based on control of one or more elements of apparatus 100 by control device 120) and the discharge assembly 240 may be fixed in relation to the channel assembly 200, such that the discharge assembly 240 is configured (e.g., based on control of one or more elements of apparatus 100 by control device 120) to direct the second gas 107 into the lower channel 229 based on the channel assembly 200 moving to a third position to be in fluid communication with the discharge assembly 240. For example, as shown in FIG. 4, at S407 the channel assembly 200 may be moved (e.g., based on control of one or more elements of apparatus 100 by control device 120) to a third portion such that the channel assembly 200 moves in relation to a fixed discharge assembly 240 to cause the inlet 242 to move into fluid communication with an outlet of the discharge assembly 240 and to cause the discharge assembly 240 to direct the second gas 107 into the conduit assembly 244 of the channel assembly 200, for example as shown in FIG. 5D.

In some example embodiments, the third position may be different from the first position and/or the second position and/or may at least partially overlap with the first position and/or the second position.

In some example embodiments, the gas source 106 is configured to supply a continuous supply of the second gas 107, such that the supply of the second gas 107 through the conduit assembly 244 of the channel assembly 200 is controlled based on the channel assembly 200 moving in relation to the third position. For example, in response to the channel assembly 200 being moved away from the third position, the supply of second gas 107 to the conduit assembly 244 may be inhibited, even though the gas source 106 continues to supply the second gas 107, e.g., via an at least partially opened gas flow control valve. Where the apparatus 100 includes multiple channel assemblies 200, moving a first channel assembly 200 away from the third position to thus inhibit the supply of second gas 107 to the conduit assembly 244, may further include moving a second channel assembly 200 to the third position to thus initiate the supply of second gas 107 to the second channel assembly 200, based on maintaining a continuous supply of second gas 107 from gas source 106 to any channel assembly 200 that is at the third position. Such example embodiments are described further below with reference to additional drawings.

As described further below with reference to additional drawings, the apparatus 100 may include an assembly, for example a rotatable assembly, that is configured to move (e.g., based on control of one or more elements of apparatus 100 by control device 120) one or more channel assemblies 200 with reference to one or more of the first position, second positon, and third positon to control operation of one or more of the supply of first gas 105, the operation of the cutting assembly 230, and the supply of the second gas 107 with reference to the one or more channel assemblies 200.

In some example embodiments, including the example embodiments shown in FIGS. 2-3 and 5A-5D example, an apparatus 100 that includes a channel assembly 200 configured to utilize a gas (e.g., first gas 105 and/or second gas 107) to compress and portion a bulk instance 510 of material enables omission, from the apparatus 100, of a piston configured to compress the bulk instance of material within a given space, where the use of pistons may result in a relatively complex apparatus, as a piston may require a piston control system that may include a spring assembly, hydraulic assembly, cam assembly, some combination thereof, or the like in order to enable piston motion control, and thus may avoid frequent maintenance and upkeep that may be implemented to maintain in a piston control system in optimal working condition.

In addition, an apparatus 100 that includes a channel assembly 200 configured to utilize a gas (e.g., first gas 105 and/or second gas 107) to compress and portion a bulk instance 510 of material enables avoidance of frequent maintenance and upkeep that may be implemented to maintain in a piston control system that may result from the piston impacting a compressible material periodically in cycles, thereby inducing cyclic wear on the piston face.

In addition, an apparatus 100 that includes a channel assembly 200 configured to utilize a gas (e.g., first gas 105 and/or second gas 107) to compress and portion a bulk instance 510 of material enables avoidance of cyclic wear of the side edges of the piston of a piston control system that could result in constant maintenance and/or periodic replacement and thus avoids taking the apparatus offline, thereby avoiding at least temporarily halting portioned instance production.

Furthermore, an apparatus 100 that includes a channel assembly 200 configured to utilize a gas (e.g., first gas 105 and/or second gas 107) to compress and portion a bulk instance 510 of material enables improved ease of control and/or adjustment thereof in order to control the density of the bulk and portioned instances of a compressed material, at least in part by avoiding adjustment of the amount of compression applied by a piston of a piston control system to enable such density adjustment and further avoiding changes of piston compression over time due to wearing of apparatus elements and/or "drift" of apparatus element configurations. Thereby an apparatus 100 that includes a channel assembly 200 configured to utilize a gas (e.g., first gas 105 and/or second gas 107) to compress and portion a bulk instance 510 of material enables avoidance of complex and/or time-consuming maintenance that may require taking the apparatus out of operation for a period of time to perform such adjustment, thereby avoiding at least temporarily halting production of portioned instances of material.

In some example embodiments, the compressible material may have fluidic characteristics (e.g., may be "moist" and/or "wet"), such that the material may have a relatively high viscosity, and may be at least mildly adhesive to various surfaces (e.g., may be "sticky"). Such a material may at least partially adhere to portions of the apparatus 100, for example inner surfaces of a channel in which the material is compressed.

In some example embodiments, an apparatus 100 that includes a channel assembly according to some example embodiments, including the example embodiments shown in at least FIGS. 2-3 and 5A-5D (and further including the example embodiments shown in FIGS. 7-14 as described further below) is configured to enable compression and/or portioning of a bulk instance 510 of a compressible material, for example as shown in at least FIGS. 5A-5D, and thus provides an improved apparatus for portioning materials based on utilizing one or more supplies of gas to compress a bulk instance of material 510 and to discharge portioned instances of material. Such a use of gas may enable relatively simple and rapidly and easily adjustable control of material compression and discharge with reduced apparatus complexity, reduced maintenance requirements, and/or reduced risk of disrupting a target density and/or volume of the portioned instances of material during the discharge of said instances from the apparatus.

Figure 6A:
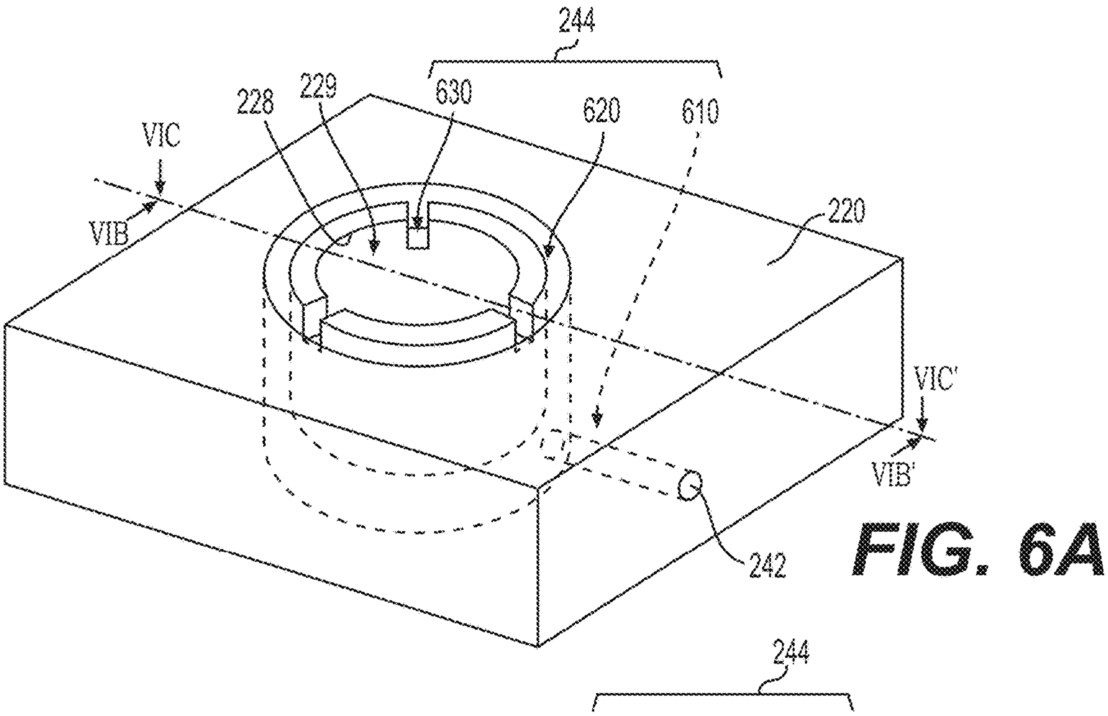
FIG. 6A is a perspective view of a lower assembly including an annular conduit assembly and bridging conduit assemblies, according to some example embodiments.
Figure 6B:
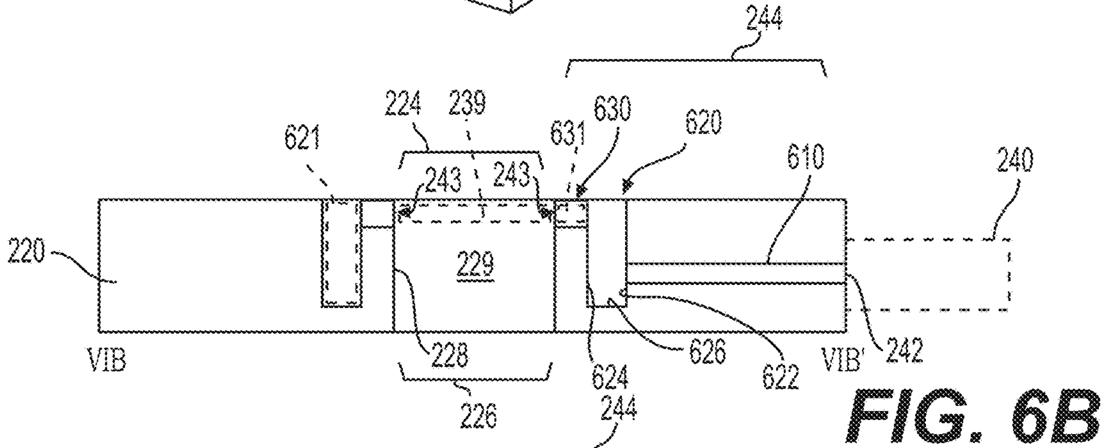
FIG. 6B is a cross-sectional view along view line VIB-VIB' of the lower assembly shown in FIG. 6A.
Figure 6C:
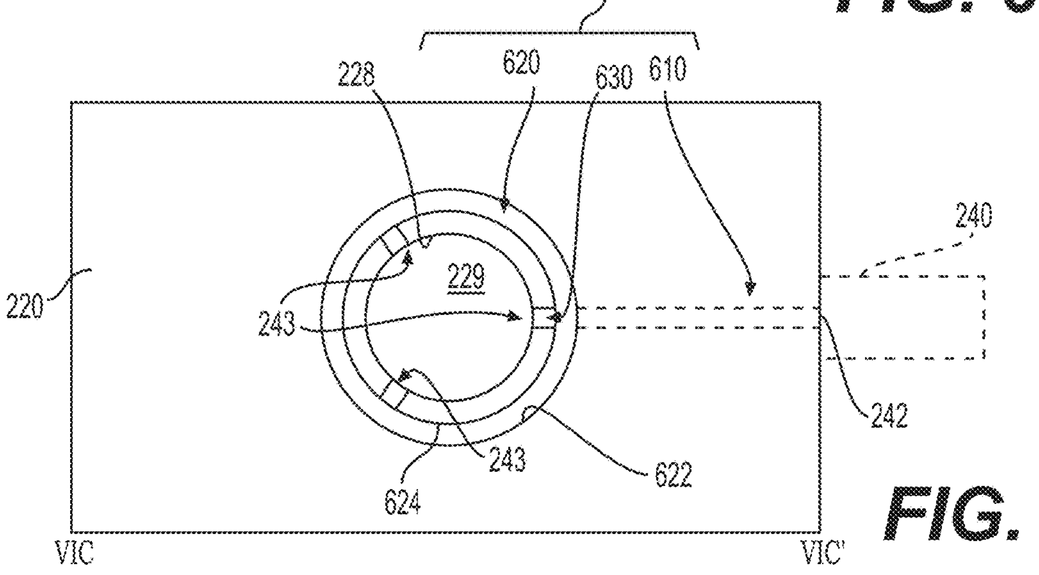
FIG. 6C is a plan view, along view line VIC-VIC', of the lower assembly shown in FIG. 6A.

FIG. 6A is a perspective view of a lower assembly including an annular conduit assembly and bridging conduit assemblies, according to some example embodiments. FIG. 6B is a cross-sectional view along view line VIB-VIB' of the lower assembly shown in FIG. 6A. FIG. 6C is a plan view, along view line VIC-VIC', of the lower assembly shown in FIG. 6A.

Referring to FIGS. 6A-6C, a lower assembly 220 may include a conduit assembly 244 that further includes an annular conduit assembly defining an annular conduit surrounding the lower channel, where the annular conduit assembly is configured to direct the second gas from the discharge assembly into the annular conduit.

For example, as shown in FIGS. 6A-6C, the lower assembly 220 may include a conduit assembly 244 that includes an annular conduit assembly 620 defining an annular conduit 621 surrounding the lower channel 229 and a conduit 610 extending from inlet 242 through an interior of the lower assembly 220 to the annular conduit assembly 620, such that the conduit 610 couples the annular conduit 621 to be in fluid communication with the inlet 242. A second gas 107 received at the inlet 242, as described above with reference to at least FIG. 3, may thus be directed into the annular conduit 621 via conduit 610.

As shown in FIGS. 6A-6C, the annular conduit assembly 620 may include an annular conduit 621 that is defined by outer sidewall 622, inner sidewall 624, and bottom surface 626. In the example embodiments shown in FIGS. 6A-6C, the annular conduit 621 of the annular conduit assembly 620 is open at a top end, but it will be understood that in some example embodiments the annular conduit assembly 620 may define an enclosed annular conduit 621 with a top surface.

As shown, the annular conduit assembly 620 may extend, at least partially within the interior of the lower assembly 220, at least partially around the lower channel 229. In FIGS. 6A-6C, for example, the annular conduit assembly 620 defines an annular conduit 621 that extends around an entirety of the lower channel 229, such that the annular conduit assembly 620 completely ("entirely") surrounds the lower channel 229.

In some example embodiments, the conduit assembly 244 further includes one or more bridging conduit assemblies that define one or more bridging conduits extending between the annular conduit assembly and a top end of the lower inner surface, where the one or more bridging conduit assemblies are configured to direct a second gas from the annular conduit to a top portion of the lower channel.

For example, as shown in FIGS. 6A-6C, the conduit assembly 244 may include bridging conduit assemblies 630 that extend from inner sidewall 624 to lower inner surface 228 and thus define respective bridging conduits 631 that extend between the annular conduit assembly 620 and respective outlets 243 in a top end of the lower inner surface 228. In the example embodiments shown in FIGS. 6A-6C, a bridging conduit 631 of a bridging conduit assembly 630 is open at a top end, but it will be understood that in some example embodiments the bridging conduit assembly 630 may enclose the bridging conduit 631 thereof with a top surface.

As shown in FIGS. 6A-6C, each bridging conduit 631 may couple the annular conduit 621 of the annular conduit assembly 620 and the lower channel 229 in fluid communication. As a result, in response to a second gas 107 being directed via conduit 610 into the annular conduit 621 of the annular conduit assembly 620, the bridging conduits 631 of the bridging conduit assemblies 630 may direct the second gas from the annular conduit 621 into the lower channel 229 at a top portion 239 thereof, such that the second gas 107 is directed to impinge on a lower surface 233 of a cutting assembly 230 that, in the extended configuration, defines a top end ("top boundary") of the lower channel 229 as shown in at least FIG. 5D (described above).

As shown in FIGS. 6A-6C, the conduit assembly 244 may include multiple bridging conduit assemblies 630, but it will be understood that in some example embodiments the conduit assembly 244 may include a single bridging conduit assembly 630 defining a single bridging conduit 631 in the lower assembly 220. In some example embodiments, where the conduit assembly 244 includes multiple bridging conduit assemblies 630, the bridging conduit assemblies 630 may be spaced apart equidistantly around a circumference of the lower inner surface 228. For example, as shown in FIGS. 6A-6C, where conduit assembly 244 includes three bridging conduit assemblies 630, the three bridging conduit assembly 630 are spaced apart equidistantly around the circumference of the lower inner surface 228. As a result, because the annular conduit assembly 620 extends at least partially around the lower channel 229, based on the second gas 107 being directed via conduit 610 into the annular conduit 621 of the annular conduit assembly 620, the second gas 107 may distribute relatively uniformly throughout the annular conduit before passing through the bridging conduits 631 into the top portion 239 of the lower channel 229. As a result, the bridging conduits 631 may direct the second gas 107 into the lower channel 229 relatively uniformly around a circumference of the top end of the lower inner surface 228, such that a downwards force applied on the lower material portion 524 held in the lower channel 229 by the second gas 107, directed by the multiple bridging conduits 631 to impinge on the lower surface 233 of the cutting assembly 230 to be redirected to apply force to the top surface of the lower material portion 524, may be pushed with a force that is relatively uniform across the top surface of the lower material portion 524. As a result, the bridging conduits 631 may enable the lower material portion 524 be pushed through the bottom opening 226 via application of a relatively uniform downwards force imparted by reflected second gas 107, thereby reducing the risk of breakup of the structure of the lower material portion 524 by the force applied via the second gas 107 and further reducing the risk of disrupting the structural integrity of the lower material portion (e.g., breaking apart due to uneven force applied to discharge the lower material portion 524) and thus ensuring that portioned instances produced via discharge of lower material portions 524 have relatively consistent shape and structure.

Figure 7:
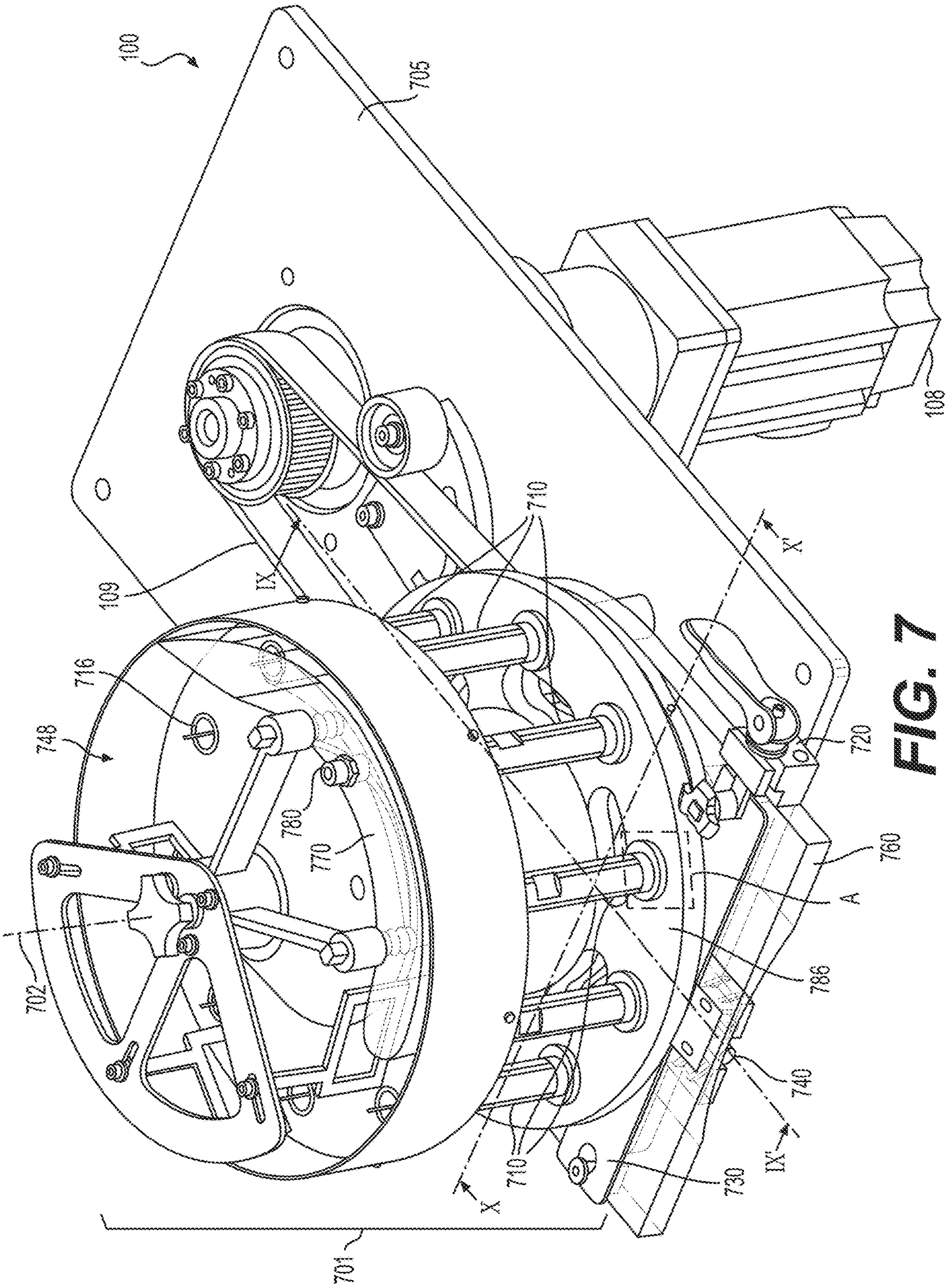
FIG. 7 is a perspective view of an apparatus including a rotatable assembly with a plurality of channel assemblies, according to some example embodiments.
Figure 8:
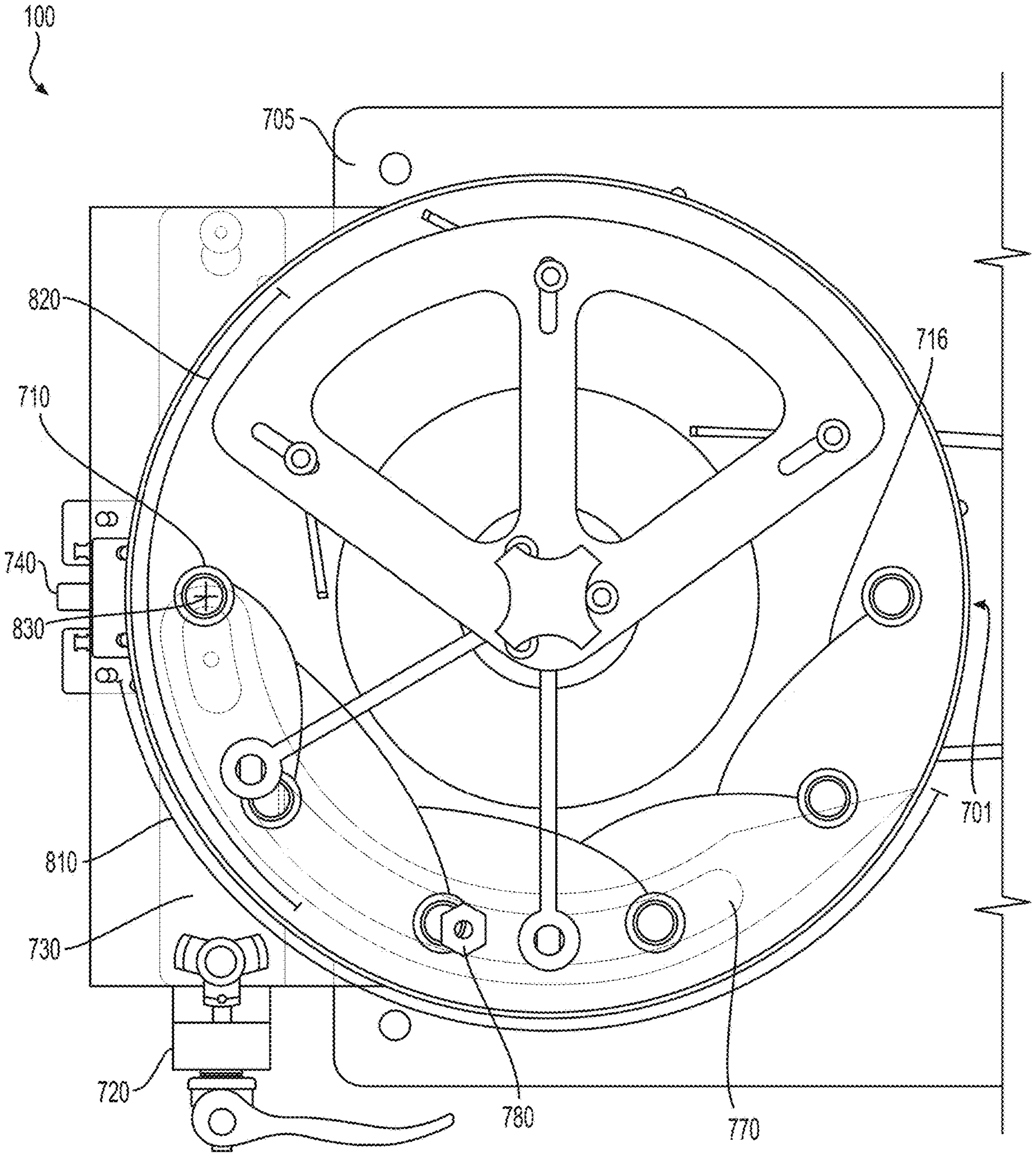
FIG. 8 is a plan view of the apparatus shown in FIG. 7.
Figure 9:
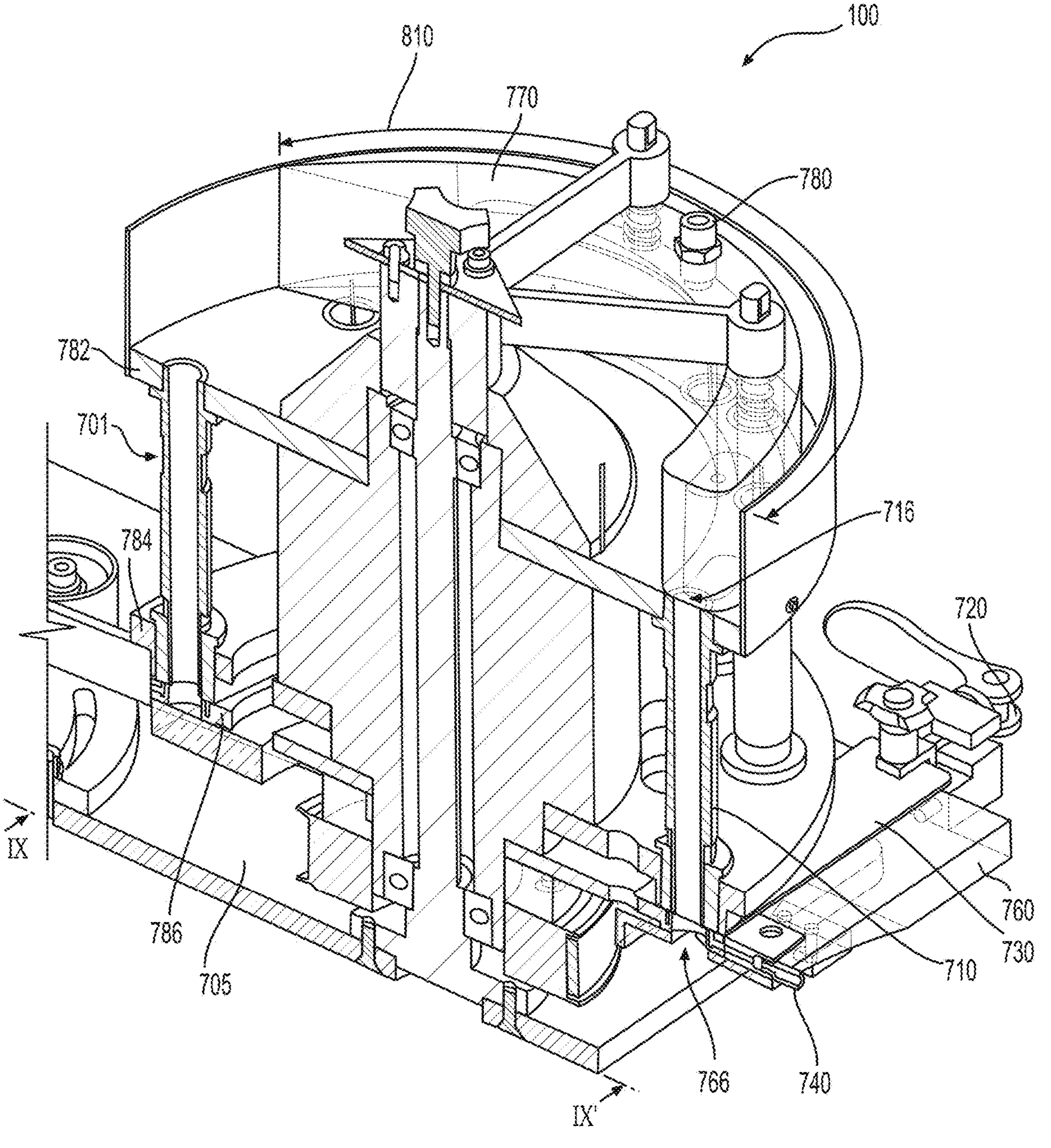
FIG. 9 is a three-dimensional cross-sectional view, along view line IX-IX', of the apparatus shown in FIG. 7.
Figure 10:
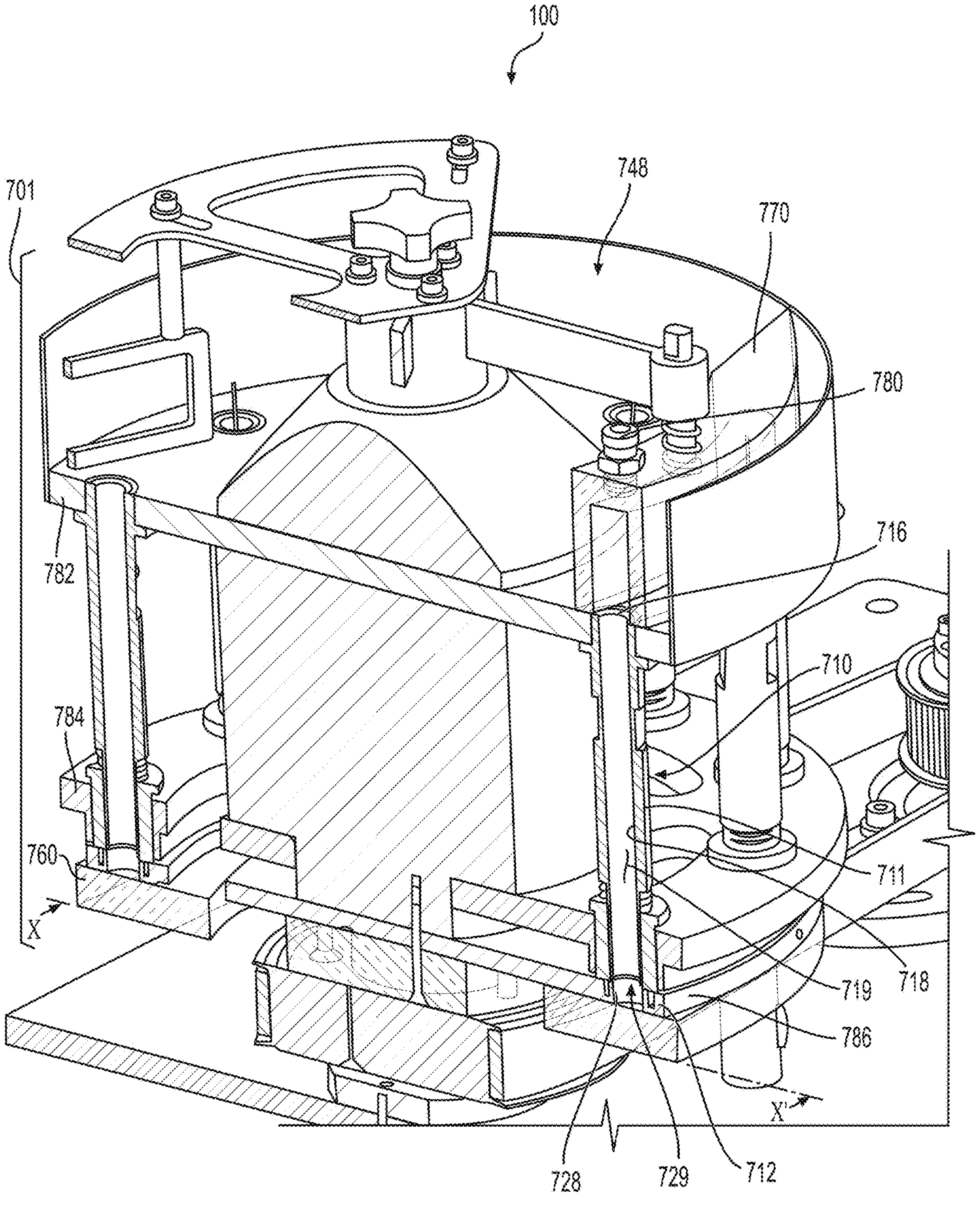
FIG. 10 is a three-dimensional cross-sectional view, along view line X-X', of the apparatus shown in FIG. 7.
Figure 11:
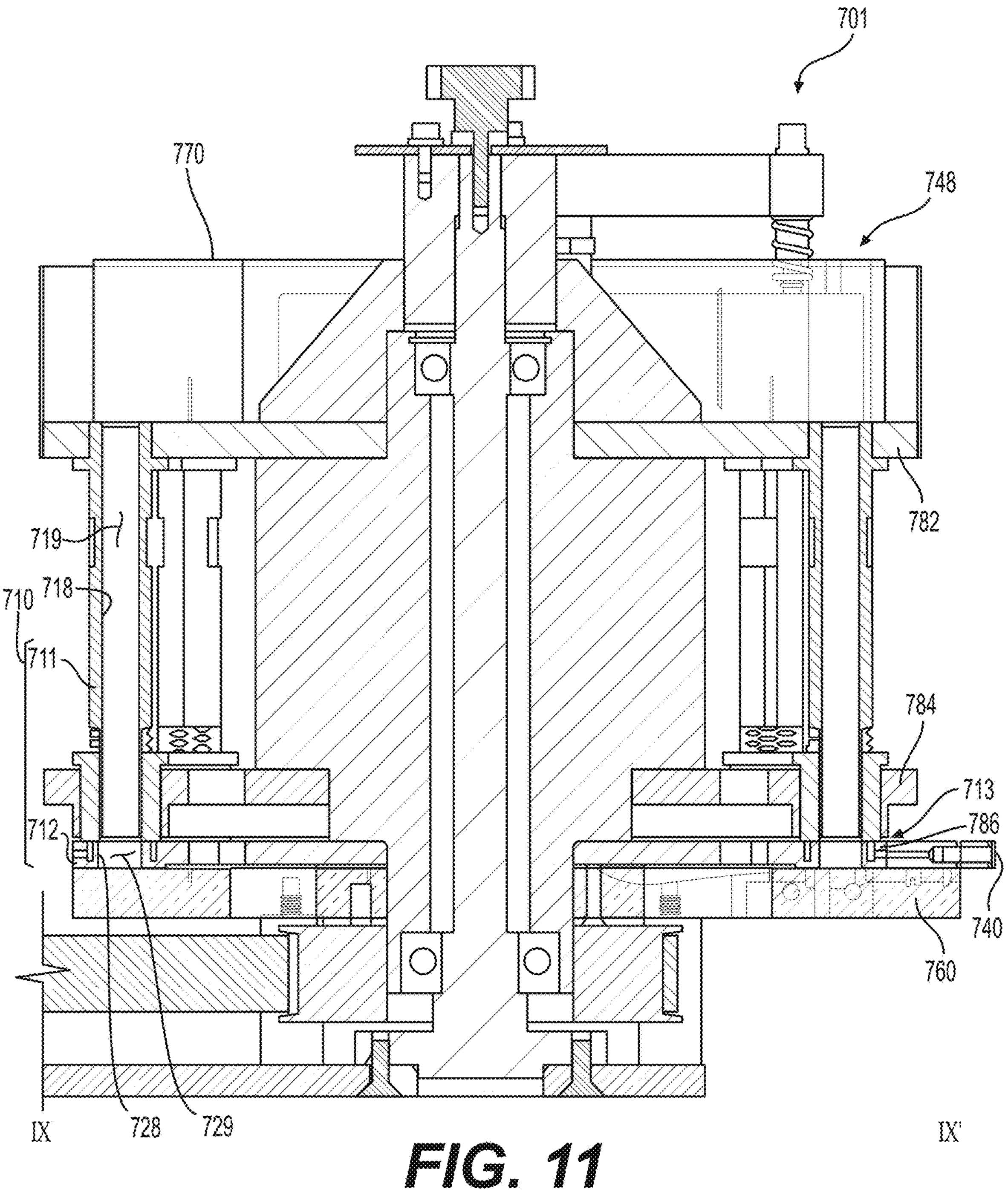
FIG. 11 is a two-dimensional cross-sectional view, along line IX-IX', of the apparatus shown in FIG. 7.
Figure 12:
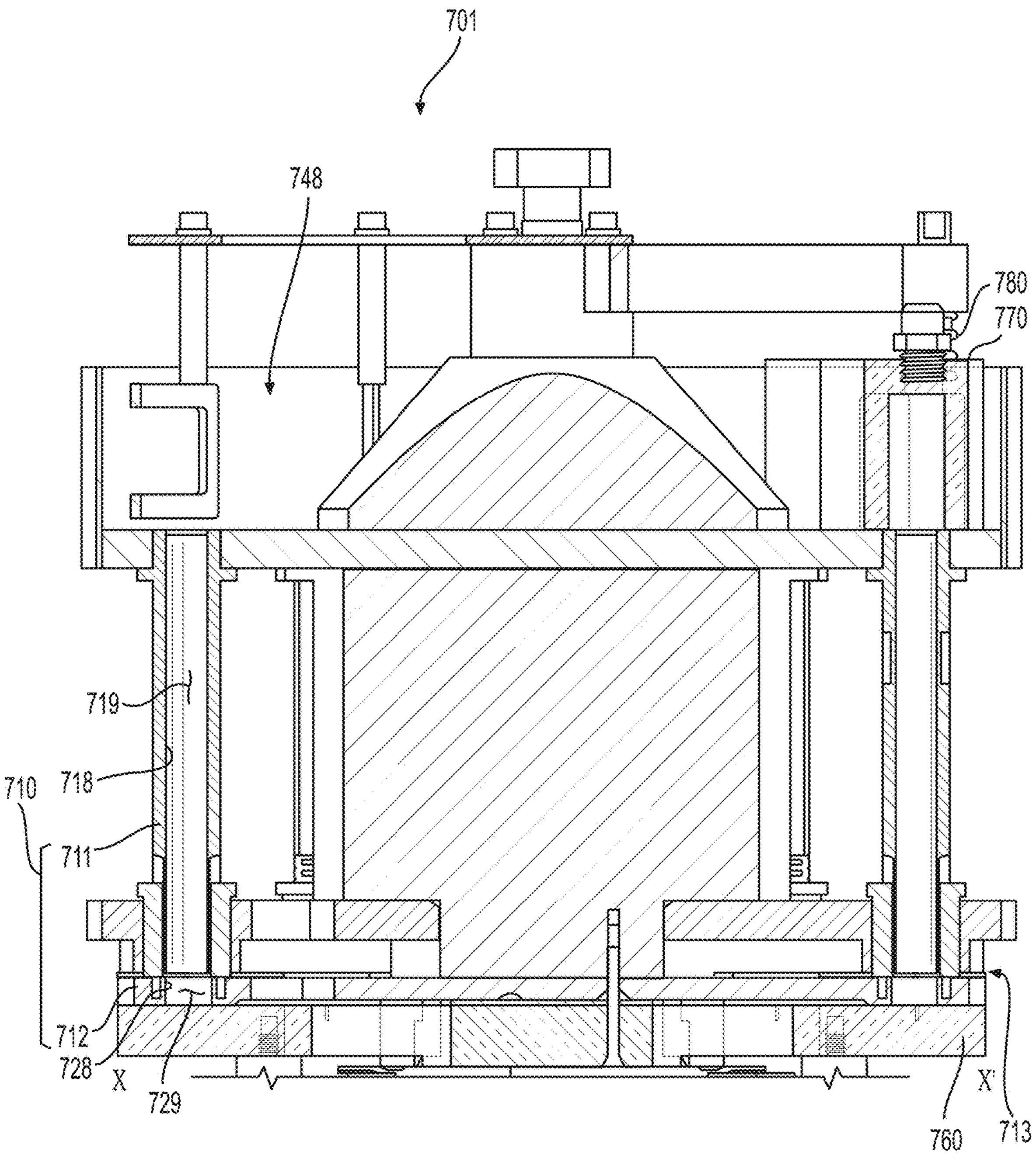
FIG. 12 is a two-dimensional cross-sectional view, along line X-X', of the apparatus shown in FIG. 7.
Figure 13:
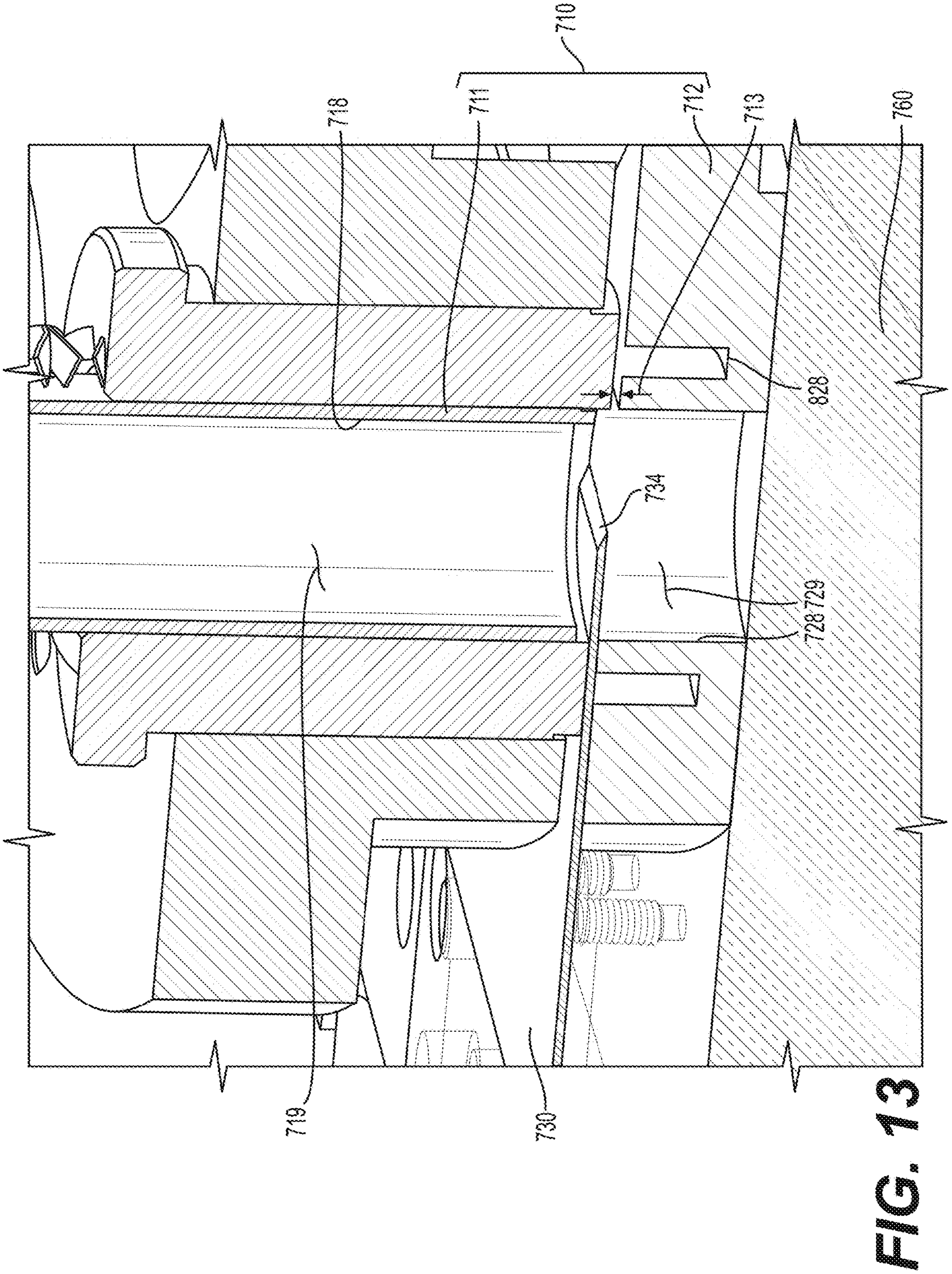
FIG. 13 is a three-dimensional cross-sectional view of the region 'A' of the apparatus shown in FIG. 7.
Figure 14:
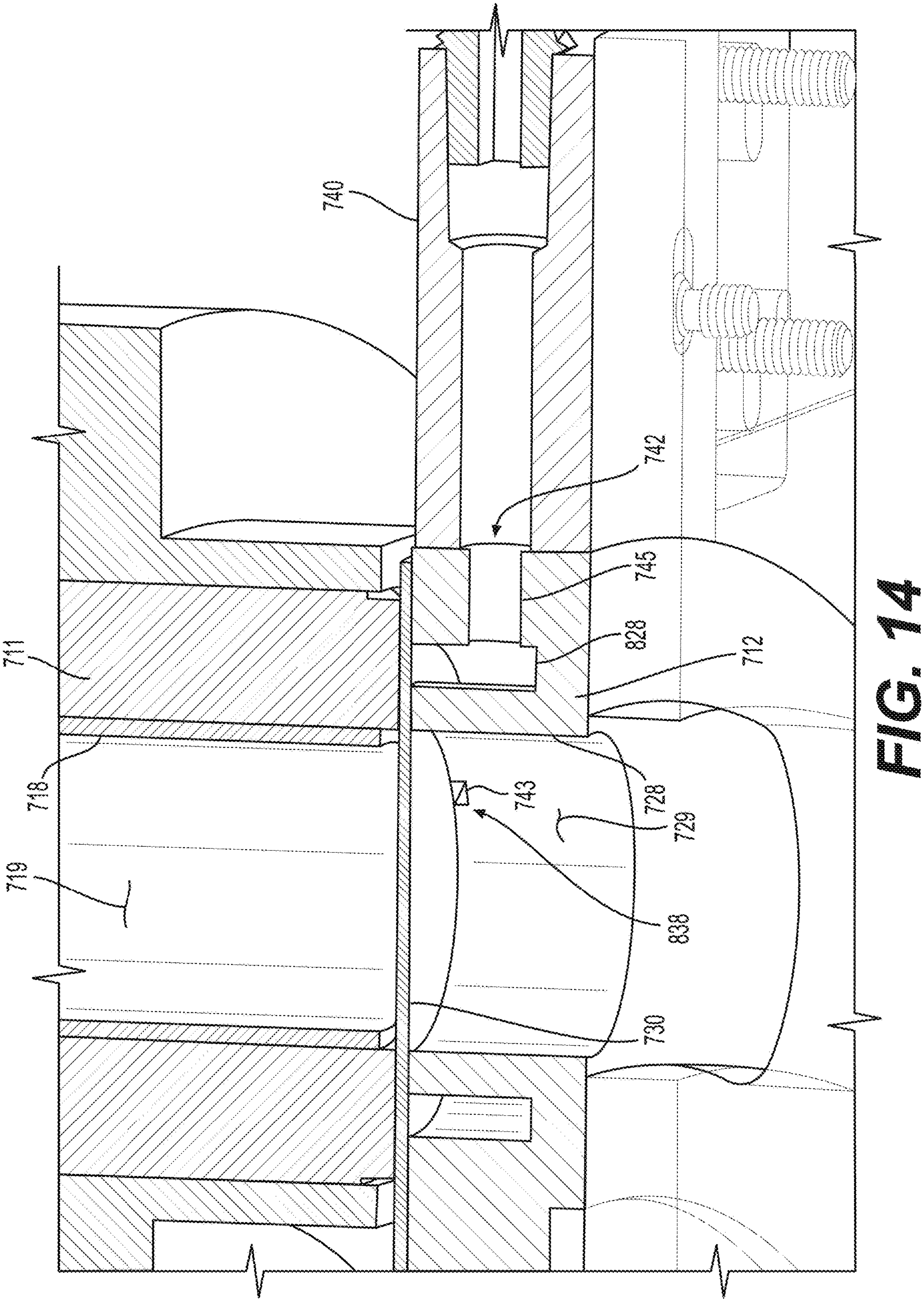
FIG. 14 is a three-dimensional cross-sectional view, along view line IX-IX', of the apparatus shown in FIG. 7.

FIGS. 7-14 are views of an apparatus including a rotatable assembly with a plurality of channel assemblies, according to some example embodiments. FIG. 7 is a perspective view of the apparatus, according to some example embodiments. FIG. 8 is a plan view of the apparatus shown in FIG. 7. FIG. 9 is a three-dimensional cross-sectional view, along view line IX-IX', of the apparatus shown in FIG. 7. FIG. 10 is a three-dimensional cross-sectional view, along view line X-X', of the apparatus shown in FIG. 7. FIG. 11 is a two-dimensional cross-sectional view, along line IX-IX', of the apparatus shown in FIG. 7. FIG. 12 is a two-dimensional cross-sectional view, along line X-X', of the apparatus shown in FIG. 7. FIG. 13 is a three-dimensional cross-sectional view of the region 'A' of the apparatus shown in FIG. 7. FIG. 14 is a three-dimensional cross-sectional view, along view line IX-IX', of the apparatus shown in FIG. 7. The apparatus shown in FIGS. 7-14 may be included in and/or may be the apparatus 100 shown in FIG. 1A. In FIGS. 7-14, dashed-lines indicate elements that are hidden from direct view.

The example embodiments of the apparatus shown in FIGS. 7-14 may be different from the example embodiments of the apparatus shown in at least FIGS. 2-3 and FIGS. 5A-5D. For example, as described further herein, instead of including a sealing plate 250 that is configured to move to expose or seal the bottom opening 226 as shown in FIGS. 2-3 and FIG. 5A-5D, the apparatus according to some example embodiments as shown in FIGS. 7-14 may include a fixed element (760) that includes a fixed opening (766), where the apparatus is configured to move a channel assembly to selectively align with the opening (766) to selectively expose or seal a bottom opening of the channel assembly, instead of moving a sealing plate to selectively expose or seal a bottom opening of the channel assembly.

In some example embodiments, an apparatus may include a rotatable assembly that is configured to rotate around a central longitudinal axis and includes a plurality of channel assemblies. The plurality of channel assemblies, each of which may be similar to the channel assembly 110 as described herein, may be spaced apart around a circumference of the rotatable assembly.

For example, as shown in FIGS. 7-14, the apparatus 100 may include a rotatable assembly 701 that is configured to rotate around a central longitudinal axis 702. The rotatable assembly 701 is shown in FIGS. 7-14 to include ten (10) channel assemblies 710 spaced apart around a circumference of the rotatable assembly 701, but it will be understood that the rotatable assembly 701 may include any quantity of channel assemblies 710. Each channel assembly 710 as described herein may be any of the channel assemblies described herein, including any of the channel assembly 110 shown in FIG. 1A and the channel assembly 200.

While the rotatable assembly 701 shown in FIGS. 7-14 includes a single ring pattern of channel assemblies 710 spaced apart around a circumference of the rotatable assembly 701, it will be understood that in some example embodiments the rotatable assembly 701 may include multiple (e.g., concentric) ring patterns of channel assemblies spaced apart around the rotatable assembly 701. For example, rotatable assembly 701 could include at least two concentric arrangements ("patterns," "configurations," etc.) of channel assemblies 710 spaced apart at equal angular displacements (e.g., 9 degrees, 10 degrees, 18 degrees, 20 degrees, 36 degrees, or the like) around the rotatable assembly 701 (e.g., around longitudinal axis 702), such that a given cylindrical sector, of any given central angle around longitudinal axis 702 of the rotatable assembly 701 includes an equal quantity of both channel assemblies 710 of an outer pattern of channel assemblies extending around the longitudinal axis 702 (e.g., a pattern that is distal to longitudinal axis 702) and channel assemblies 710 of an inner pattern of channel assemblies extending around the longitudinal axis 702 (e.g., a pattern that is proximate to longitudinal axis 702).

In some example embodiments, including the example embodiments shown in at least FIGS. 7-14, the rotatable assembly 701 is configured to rotate (e.g., based on control by power supply 108) at a rate of about 10 revolutions per minute ("rpm") to about 40 rpm. In some example embodiments, including the example embodiments shown in at least FIGS. 7-14, an apparatus 100 that includes the rotatable assembly 701 is configured to portion and discharge instances of compressible material ("produce portioned instances of compressible material") at a rate of about 100 portioned instances/minute to about 400 portioned instances/minute, for example based on rotatable assembly 701 rotating at a rate of about 10 rpm to about 40 rpm.

In some example embodiments, including the example embodiments shown in at least FIGS. 7-14, the rotatable assembly 701 is configured to rotate (e.g., based on control by power supply 108) to rotate at a rate of about 10 rpm to about 20 rpm. In some example embodiments, including the example embodiments shown in at least FIGS. 7-14, an apparatus 100 that includes the rotatable assembly 701 is configured to portion and discharge instances of compressible material ("produce portioned instances of compressible material") at a rate of about 100 portioned instances/minute to about 200 portioned instances/minute, for example based on rotatable assembly 701 rotating at a rate of about 10 rpm to about 20 rpm.

As shown in at least FIG. 7, the apparatus 100 includes a power supply 108 that is a motor configured to cause rotatable assembly 701 to rotate via drive belt 109, but it will be understood that the power supply may be any power supply that may impart rotational motion to the rotatable assembly 701. For example, the power supply 108 may be a motor (e.g., an electric motor) that is directly coupled to the rotational assembly 701 so that rotation of a driveshaft of the motor is converted directly into rotation of the rotatable assembly 701.

In some example embodiments, where an apparatus 100 includes a rotatable assembly, the gas source 104 of the apparatus may be fixed in relation to the rotatable assembly. As a result, the gas source 104 may be configured to supply the first gas 105 through a top opening 716 of a given channel assembly 710 of the plurality of channel assemblies 710 based on the rotatable assembly rotating to move the given channel assembly 710 to a first position to be in fluid communication with the gas source 104.

For example, as shown in FIGS. 7-14, apparatus 100 includes discs 782 and 784 through which the channel assemblies 710 extend, and a hopper 748 and a hopper enclosure 770 are above the upper disc, where the hopper enclosure 770 is fixed in relation to the rotatable assembly 701 and where a first gas port 780 is fixed to the hopper enclosure 770 such that the first gas port 780 is fixed in relation to the rotatable assembly 701. As the rotatable assembly 701 rotates, and thus rotates the channel assemblies 710 around the longitudinal axis 702, the hopper enclosure 770 and first gas port 780 remain fixed in place. As a result, as a given channel assembly 710 moves around the longitudinal axis 702, the channel assembly 710 periodically passes underneath (e.g., in fluid communication with) the hopper enclosure 770 and first gas port 780. In some example embodiments, including the example embodiments shown in FIGS. 7-14, the hopper enclosure 770 is a structure having sidewall elements and a top surface element that are coupled together and/or may be integral (e.g., may be one continuous instance of material) to establish an internal space ("enclosure") that is bounded on top and side ends by the structure of the hopper enclosure 770 and is bound on a bottom end by upper disc 782 that includes openings 716. As shown in FIGS. 7-14, at least one sidewall portion of the hopper enclosure 770 structure includes an opening that is open to hopper 748, such that material supplied into the hopper 748 may enter the internal space ("enclosure") of the hopper enclosure 770. As further shown in FIGS. 7-14, the first gas port 780 may extend through the top surface element of the hopper enclosure 770 to be in fluid communication with the internal space ("enclosure") of the hopper enclosure 770, such that the first gas port 780 enables a gas to be supplied into the interior space ("enclosure") of ("at least partially defined by") the hopper enclosure 770.

The hopper 748 is configured to be loaded with compressible material from a material supply source 102 (not shown in FIGS. 7-14), such that the compressible material may enter the channel assemblies 710 via the top openings 716 that are in the bottom of the hopper 748. Each top opening 716 as described herein may be any of the top openings described herein, including the top opening 214.

Additionally, the hopper enclosure 770 is configured to establish an enclosure, such as the enclosure 260 described above with reference to at least FIG. 3, wherein the first gas 105 may be supplied via the first gas port 780 to both assist in inserting the compressible material into a channel assembly 710 under the hopper enclosure 770 and to compress the bulk instance of compressible material held within a channel assembly 710 that is underneath the hopper enclosure 770. For example, as described above, the hopper enclosure 770 may include sidewall elements and a top surface element that collectively define an internal space ("enclosure") that has at least one opening in fluid communication with the space of the hopper 748, and the hopper enclosure 770 may be fixed in position in relation to the remainder of the rotatable assembly 701 (e.g., the upper disc 782 with openings 716 which may rotate beneath the hopper enclosure 770), and the compressible material may be supplied from hopper 748 into the internal space ("enclosure") of the hopper enclosure 770 via the at least one opening based on the rotatable assembly 701 rotating to cause compressible material to be directed into the hopper enclosure 770 via the at least one opening as the rotatable assembly 701 rotates.

Because the hopper enclosure 770 and first gas port 780 are fixed in position in relation to the rotatable assembly 701, the gas source 104 may supply a continuous supply of the first gas 105 to the hopper enclosure 770 via the first gas port 780. As a result, the supply of the first gas 105 to a given channel assembly 710 may be controlled by the apparatus 100 based on rotation of the rotatable assembly 701 to move the given channel assembly 710 to a position under the hopper enclosure 770.

Restated, the range ("region") of locations of a given channel assembly 710 of the plurality of channel assemblies 710 may have and remain in fluid communication with (e.g., "underneath") the hopper enclosure 770 may be referred to herein as a "first position 810" based on the channel assemblies 710 under the hopper enclosure 770 being in fluid communication with the gas source 104 via the first gas port 780. Thus, in order to cause at least the gas source 104 to supply first gas 105 through the top opening 716 of a channel assembly 710 to compress the bulk instance of compressible material held in the continuous channel 290 of the channel assembly 710, the apparatus may rotate the rotatable assembly 701 to move the channel assembly 710 to the first position 810.

In some example embodiments, where an apparatus 100 includes a rotatable assembly, the cutting assembly 730 of the apparatus 100 may be fixed in relation to the rotatable assembly 701. As a result, the cutting assembly 730 may be configured to extend transversely through the continuous channel 290 of the given channel assembly 710 based on the rotatable assembly rotating to move the given channel assembly 710 to a second position. The cutting assembly 730 as described herein may be any of the cutting assemblies as described herein, including any of the cutting assembly 130 shown in FIG. 1A and the cutting assembly 230 shown in FIGS. 2-3 and FIGS. 5A-5D.

For example, as shown in FIGS. 7-14 and as further described with reference to FIGS. 15-16C below, apparatus 100 includes, in addition to discs 782 and 784 through which the channel assemblies 710 extend, a lower disc 786 that includes portions that each define a separate lower assembly 712 of a separate channel assembly 710 of the plurality of channel assemblies 710 of the apparatus. The upper assembly d and lower assembly 712 as described herein and as shown in FIGS. 7-14 may be any of the upper assemblies and lower assemblies as described herein, including the upper assembly 210 and the lower assembly 220 shown in at least FIGS. 2-3 and FIGS. 5A-5D, respectively. The apparatus 100 includes a gap space between the upper disc 782 and lower disc 786, and the gap space may define a transverse conduit 713 through which a cutting assembly 730 may extend. The transverse conduit 713 as described herein may be any of the transverse conduits described herein, including the transverse conduit 232.

As further shown in FIGS. 7-14, the apparatus 100 includes a cutting assembly 730 that is fixed in place in relation to rotatable assembly 701 via at least fixing assembly 720. The cutting assembly extends through a portion of the gap space between discs 784 and 786. The region of space vertically overlapping the fixed cutting assembly 730 is referred to herein as a "second position 820." As shown in at least FIG. 13, based on the rotatable assembly 701 rotating to move a given channel assembly 710 into the second position 820, the upper and lower assemblies 711 and 712 of the channel assembly 710 may move in relation to the cutting assembly 730 such that the cutting assembly 730 "extends" (via relative motion of the fixed cutting assembly 730 in relation to the moving upper and lower assemblies 711 and 712) transversely through the continuous channel 790 of the channel assembly 710 (e.g., continuous channel 290) so as to isolate the upper and lower channels 719 and 729 of the channel assembly 710 from each other. Furthermore, as noted above with reference to FIG. 5C, based on the cutting assembly 730 "extending" through the continuous channel 790 of the channel assembly 710 in response to the channel assembly 710 moving to the second position 820, the edge portion 734 of the cutting assembly 730 may sever a lower material portion 524 in the lower channel 729 from an upper material portion 522 in the upper channel 719, thereby producing a portioned instance of compressible material. Each continuous channel 790, upper channel 719, and lower channel 729 as described herein may be any of the continuous channels, upper channels, and lower channels described herein, respectively, including any of the continuous channel 290, upper channel 219, and lower channel 229, respectively.

As shown in FIGS. 7-14, the first position 810 and the second positions 820 are regions of space that at least partially overlap in a horizontal direction. Thus, for example, a given channel assembly 710 may be simultaneously in the first position 810 and the second position 820 as the rotatable assembly 701 rotates to move the channel assembly 710 around the longitudinal axis 702. As a result, first gas 105 may be supplied into the channel assembly 710 to compress at least a portion of the bulk instance 520 simultaneously with the cutting assembly 730 extending through the continuous channel 790 of the channel assembly 710 to isolate the upper and lower channels 719 and 729 of the channel assembly 710.

In some example embodiments, where an apparatus 100 includes a rotatable assembly 701, the discharge assembly 740 (which may be any of the discharge assemblies described herein, including discharge assembly 240) of the apparatus 100 may be fixed in relation to the rotatable assembly 701. As a result, the discharge assembly 740 may be configured to direct the second gas 107 into the lower channel 729 of a given channel assembly 710 based on the rotatable assembly 701 rotating to move the given channel assembly 710 to a third position so that an inlet 742 of a conduit assembly 744 of the lower assembly 712 of the given channel assembly 710 to be in fluid communication with the discharge assembly 740. Each discharge assembly 740, inlet 742, and conduit assembly 744 as described herein may be any of the discharge assemblies, inlets, and conduit assemblies described herein, respectively, including any of the discharge assembly 240, inlet 242, and conduit assembly 244, respectively.

For example, as shown in FIGS. 7-14, the discharge assembly 740 is fixed in place in relation to the rotatable assembly 701. As further shown in FIGS. 7-14, and as further described with reference to FIGS. 15-16C below, apparatus 100 includes a lower disc 786 that includes portions that each define a separate lower assembly 712 of a separate channel assembly 710 of the plurality of channel assemblies 710 of the apparatus. Each portion of the disc 786 includes a separate lower inner surface 728, a separate inlet 742, and a separate conduit assembly 744 configured to direct second gas 107 from inlet 742 to an outlet 743 at a top end of the respective lower inner surface 718. Each lower inner surface 728, inlet 742, conduit assembly 744, and outlet 743 as described herein may be any of the lower inner surfaces, inlets, conduit assemblies, and outlets described herein, respectively, including any of the lower inner surface 228, inlet 242, conduit assembly 244, and outlet 243, respectively.

As shown in FIGS. 7-14, the fixed discharge assembly 740 may supply second gas 107 into a given conduit assembly 744 of a given channel assembly 710 based on the rotatable assembly 701 rotating to move the channel assembly 710 such that a given portion of disc 286 that comprises the lower assembly 712 of the given channel assembly 710 aligns with the discharge assembly 740 to position inlet 742 of the given lower assembly 712 in fluid communication with the discharge assembly 740. Then, discharge assembly 740 may supply the second gas 107 into the aligned conduit assembly 744 of the given lower assembly 712 to be directed into the top portion of the lower channel 729 of the given aligned channel assembly 710.

As shown, second gas 107 may be supplied only to the lower assembly 712, of the plurality of lower assemblies 712 in disc 786, that is aligned with the discharge assembly 740, for example as shown in FIG. 14. Other lower assemblies 712 that are not aligned with the fixed discharge assembly 740 may not receive the second gas 107.

Thus, as described herein, a position associated with alignment of a channel assembly 710 (e.g., the inlet 742 of the lower assembly 712 thereof) with discharge assembly 740 may be referred to herein as a "third position 830," such that a channel assembly 710 that is moved to the third position 830 may align the inlet 742 thereof with the fixed discharge assembly and the second gas 107 enters the conduit assembly 744 of the given channel assembly 710.

As shown in FIG. 7, the third position 830 is encompassed within at least the second position 820, such that the third position 830 overlaps with at least the second position 820 in a horizontal direction. It will be understood that, in some example embodiments, the first position 810, the second position 820, and the third position 830 may be the same as or different from each other.

As shown in FIGS. 7-14, apparatus 100 may include a sealing plate 760 that is fixed in relation to rotatable assembly 701 and is located under disc 786. Sealing plate 760 includes a conduit 766 that is aligned with the third position 830. The sealing plate 760 is configured to perform the functionality described above with reference to the sealing plate 250 shown in FIGS. 2-3 and FIGS. 5A-5D, so that moving a channel assembly 710 to the third position 830, in addition to aligning the conduit assembly 744 of the channel assembly 710 to be in fluid communication with the discharge assembly 740, aligns a bottom opening (e.g., bottom opening 216 as shown in FIGS. 2-3 and 5A-5D) of the channel assembly 710 with the conduit 766 to enable a portioned instance of compressible material to be discharged from a lower channel 729 of the given channel assembly 710 via the bottom opening and aligned conduit 766. When a given channel assembly 710 is not aligned with the third position 830, the channel assembly 710 may not be aligned with conduit 766 and thus the solid upper surface of the sealing plate 760 may inhibit compressible material held in the continuous channel 290 of the channel assembly 710 from exiting the given channel assembly 710 via the bottom opening of the given channel assembly 710.

As shown in at least FIG. 7, the hopper enclosure 770 and first gas port 780, cutting assembly 730, and discharge assembly 740 are each fixed in relation to the rotatable assembly 701. For example, in FIG. 7 each of the hopper enclosure 770 and first gas port 780, cutting assembly 730, and discharge assembly 740 are each fixed to plate 705. However, it will be understood that, in some example embodiments, one or more of the hopper enclosure 770 and first gas port 780 (and thus the gas source 104), cutting assembly 730, and discharge assembly 740 are not fixed in relation to the rotatable assembly 701 and thus may move in relation to plate 705. Cutting assembly 730 may be configured to move in relation to plate 705 to extend transversely through a continuous channel 290 of one or more channel assemblies 710 included in the rotatable assembly 701.

Figure 15:
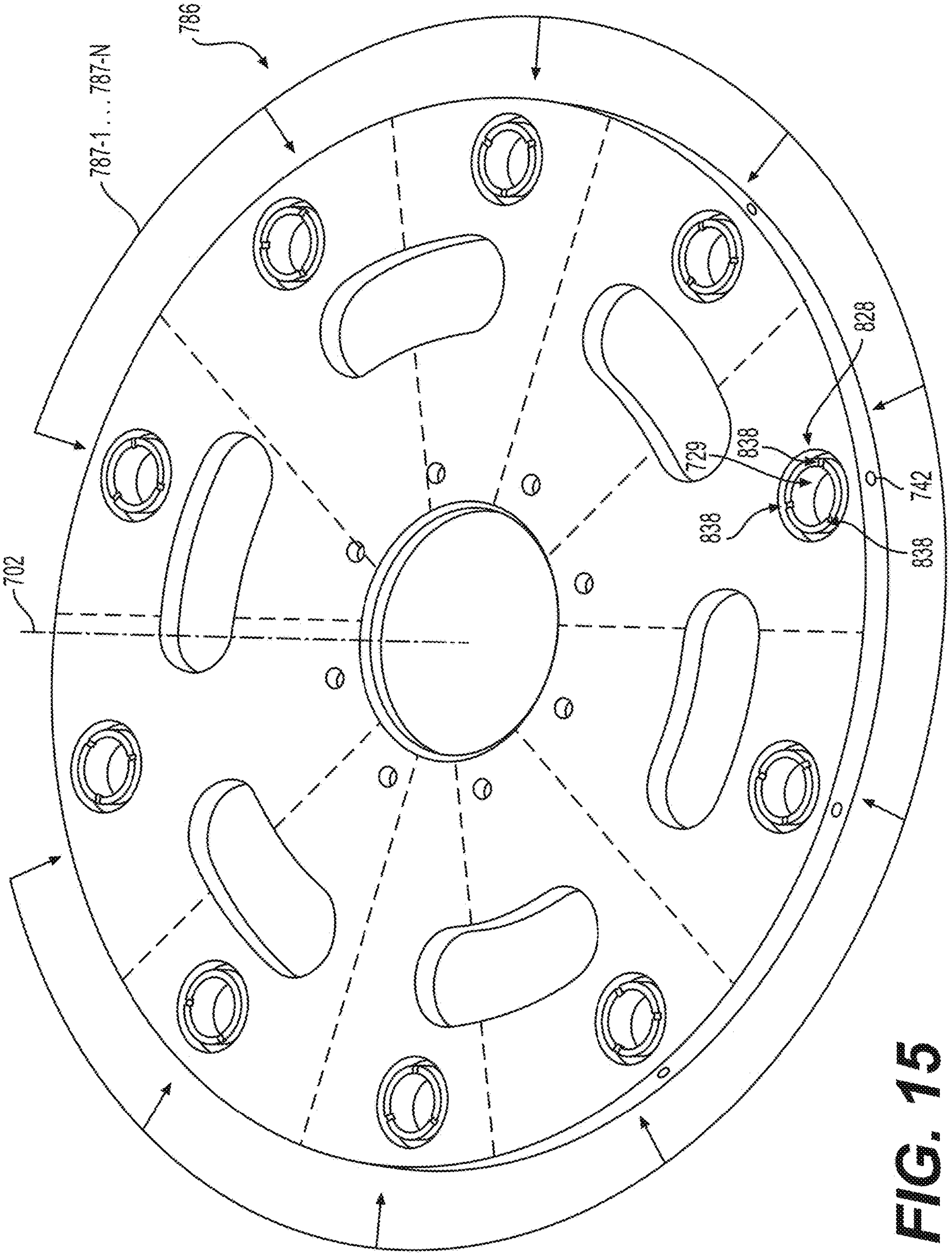
FIG. 15 is a perspective view of a disc assembly including a plurality of lower assemblies of a plurality of channel assemblies of the apparatus shown in FIG. 7.
Figure 16A:
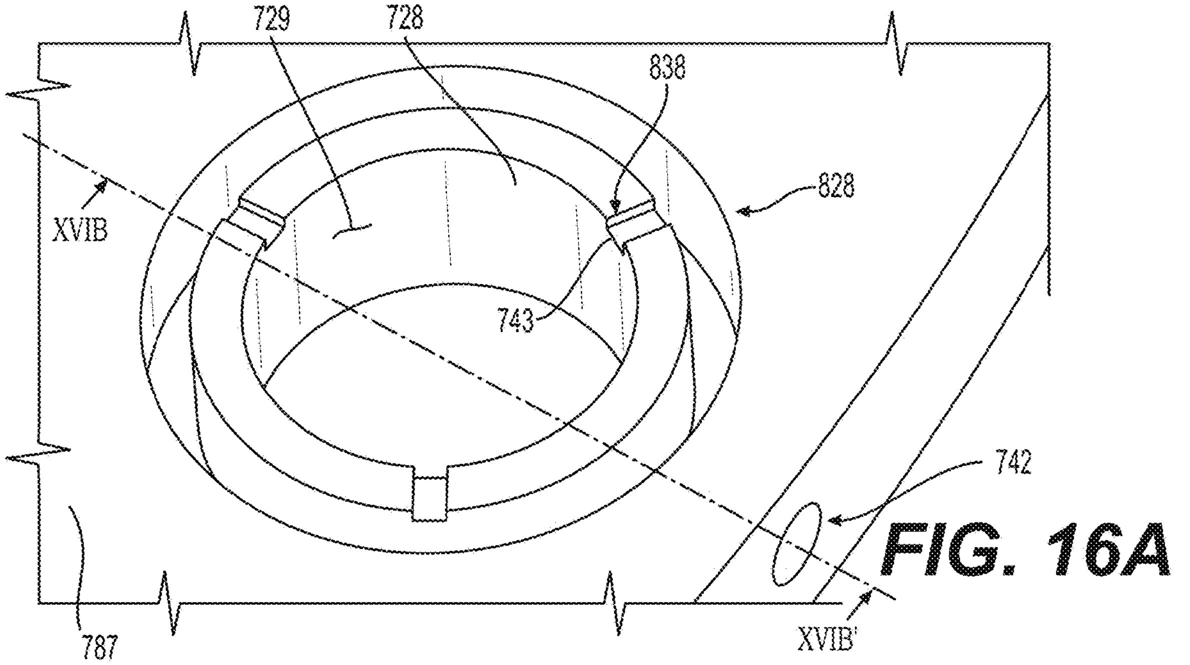
FIG. 16A is a perspective view of the region 'A' shown in FIG. 15.
Figure 16B:
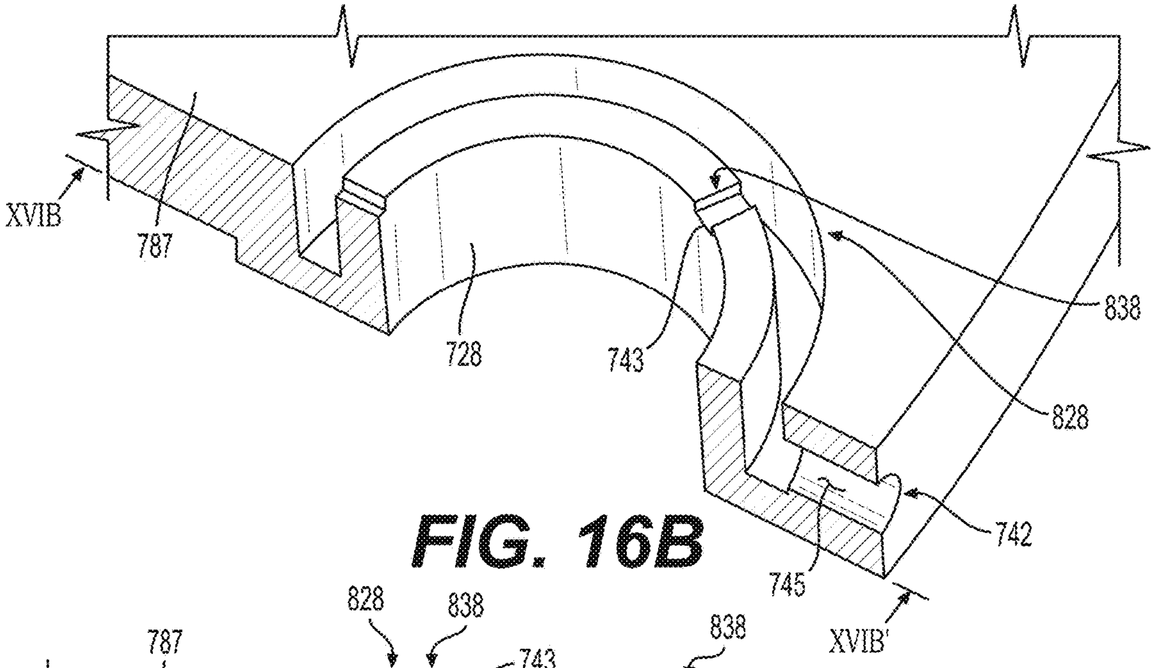
FIG. 16B is a three-dimensional cross-sectional view, along view line XVIB-XVIB', of the region 'A' shown in FIG. 15.

FIG. 15 is a perspective view of a disc 786 including a plurality of lower assemblies 712 of a plurality of channel assemblies 710 of the apparatus shown in FIG. 7. FIG. 16A is a perspective view of the region 'A' shown in FIG. 15. FIG. 16B is a three-dimensional cross-sectional view, along view line XVIB-XVIB', of the region 'A' shown in FIG. 15. FIG. 16C is a two-dimensional cross-sectional view, along view line XVIB-XVIB', of the region 'A' shown in FIG. 15.

Figure 16C:
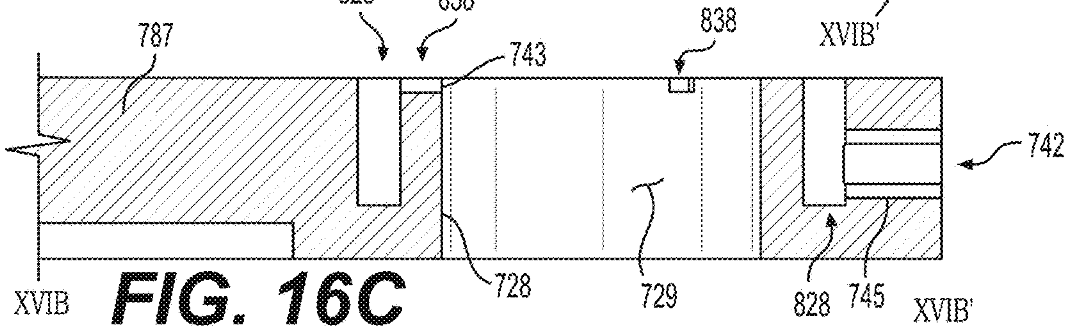
FIG. 16C is a two-dimensional cross-sectional view, along view line XVIB-XVIB', of the region 'A' shown in FIG. 15.

As shown in FIGS. 15-16C, in some example embodiments an apparatus 100 may include an element, such as disc 786, that includes multiple portions 787-1 to 787-N that each comprise a separate lower assembly 712 of a separate channel assembly 710 of a plurality of channel assemblies 710 included in the apparatus 100. Thus, each separate portion 787 of the portions 787-1 to 787-N includes a separate lower inner surface 728 defining a separate lower channel 729, and a separate conduit assembly 744 configured to direct any second gas 107 delivered to an inlet 742 thereof to an outlet 743 in a top end of the lower inner surface 728 of the given portion 787. As shown in FIGS. 15-16C, each conduit assembly 744 of each separate, respective portion 787 may include an annular conduit assembly 828 surrounding the lower channel 729 of the portion 787, one or more bridging conduit assemblies 838 extending between the annular conduit assembly 828 and the lower inner surface 728 of the portion 787, and a conduit 745 extending from a separate inlet 742 of the portion 787 to the annular conduit assembly 828 of the portion 787. As a result, where the apparatus 100 includes a discharge assembly 740 that is configured to supply second gas 107 through an aligned inlet 742 and is further fixed in relation to a rotatable assembly 701 that includes disc 786, the rotatable assembly 701 may rotate to cause disc 786 to rotate around longitudinal axis 702, such that the portions 787-1 to 787-N may move in relation to a third position 830 wherein a given portion 787 may align with the fixed discharge assembly 740. Each annular conduit assembly 282, bridging conduit assembly 838, and conduit 745 as described herein may be any of the annular conduit assemblies, bridging conduit assemblies, and conduits described herein, respectively, including any of the annular conduit assembly 620, bridging conduit assembly 630, and conduit 610, respectively.

FIGS. 17-35 are views of one or more portions of an apparatus 1000 including a rotatable assembly 1001 with a plurality 3000 of concentric patterns 3010 and 3020 of channel assemblies 2010, according to some example embodiments.

Figure 17:
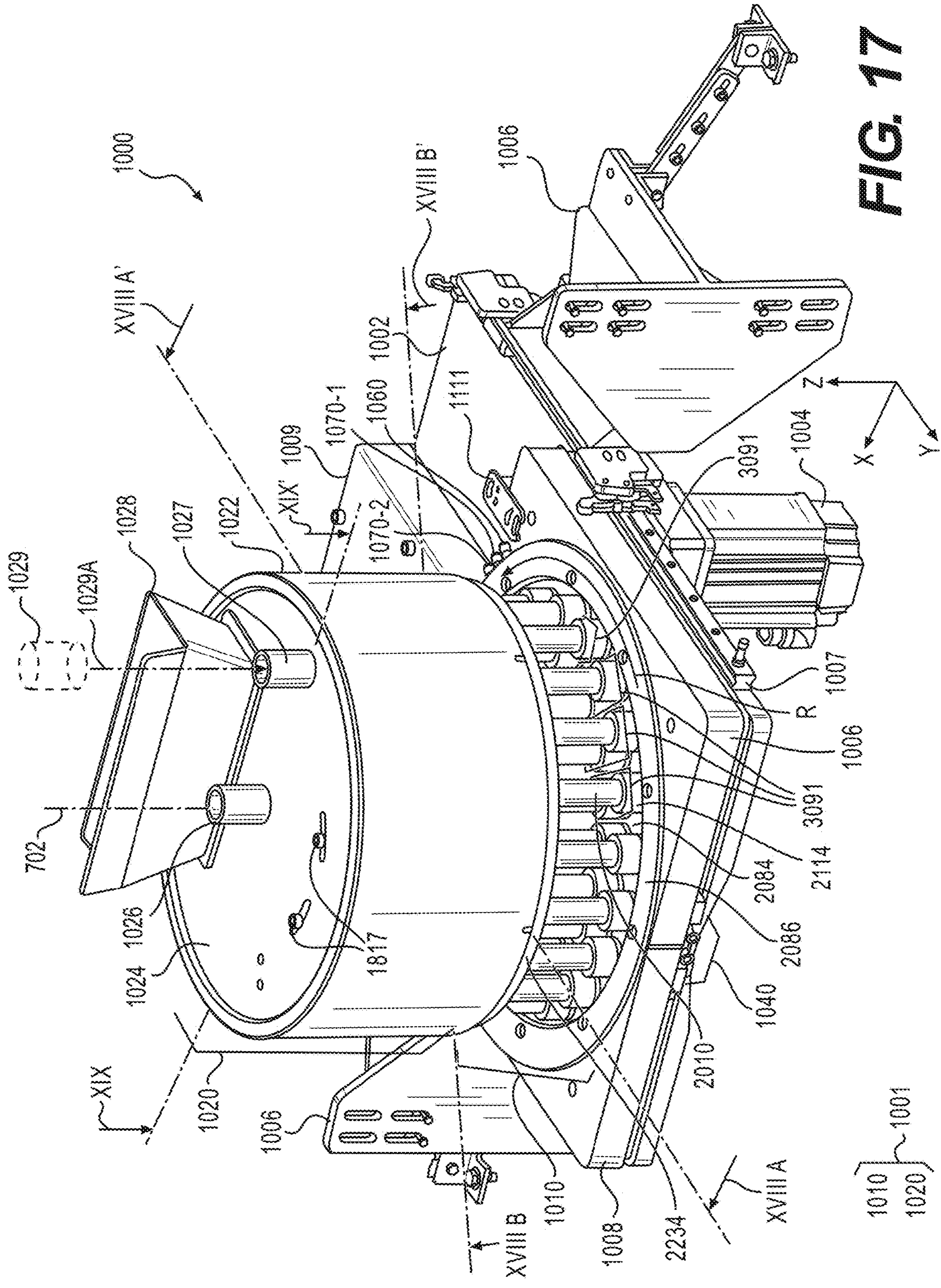
FIG. 17 is a perspective view of an apparatus including a rotatable assembly with a plurality of concentric patterns of channel assemblies, according to some example embodiments.

As shown in at least FIGS. 17-35, the apparatus 1000 may include a plate 1002 to which a rotatable assembly 1001 may be coupled. As shown in at least FIG. 17, the apparatus 1000 may include structural support elements 1006 that are configured to structurally support the plate 1002 and rotatable assembly 1001 of the apparatus 1000 in one or more particular positions, based on the structural support elements 1006 slidably coupling with separate, respective slide assemblies 1007 that are fixed to the plate 1002 and thus do not move in relation to the plate 1002. The plate 1002 and thus the rotatable assembly 1001 coupled thereto may thus be configured to slide, in a horizontal direction including the Y-direction as shown in FIG. 17, between various, separate positions based on sliding engagement between the slide assemblies 1007 and the separate, respective structural support elements 1006 that are coupled to a fixed structure. As a result, the rotatable assembly 1001 may be moved between various positions associated with operation of the apparatus 1000, maintenance of the apparatus 1000, or both.

Referring generally to FIGS. 17-35, the rotatable assembly 1001 includes at least a rotatable section 1010 and a hopper 1020. The rotatable section 1010 is configured to rotate, in relation to the non-rotating plate 1002, in a counter-clockwise direction "R" around longitudinal axis 702 that extends vertically through a center of the rotatable assembly 1001, although it will be understood that the rotatable section 1010 may rotate in other directions, including a clockwise direction that is opposite to the rotation direction "R" as shown.

Figure 18A:
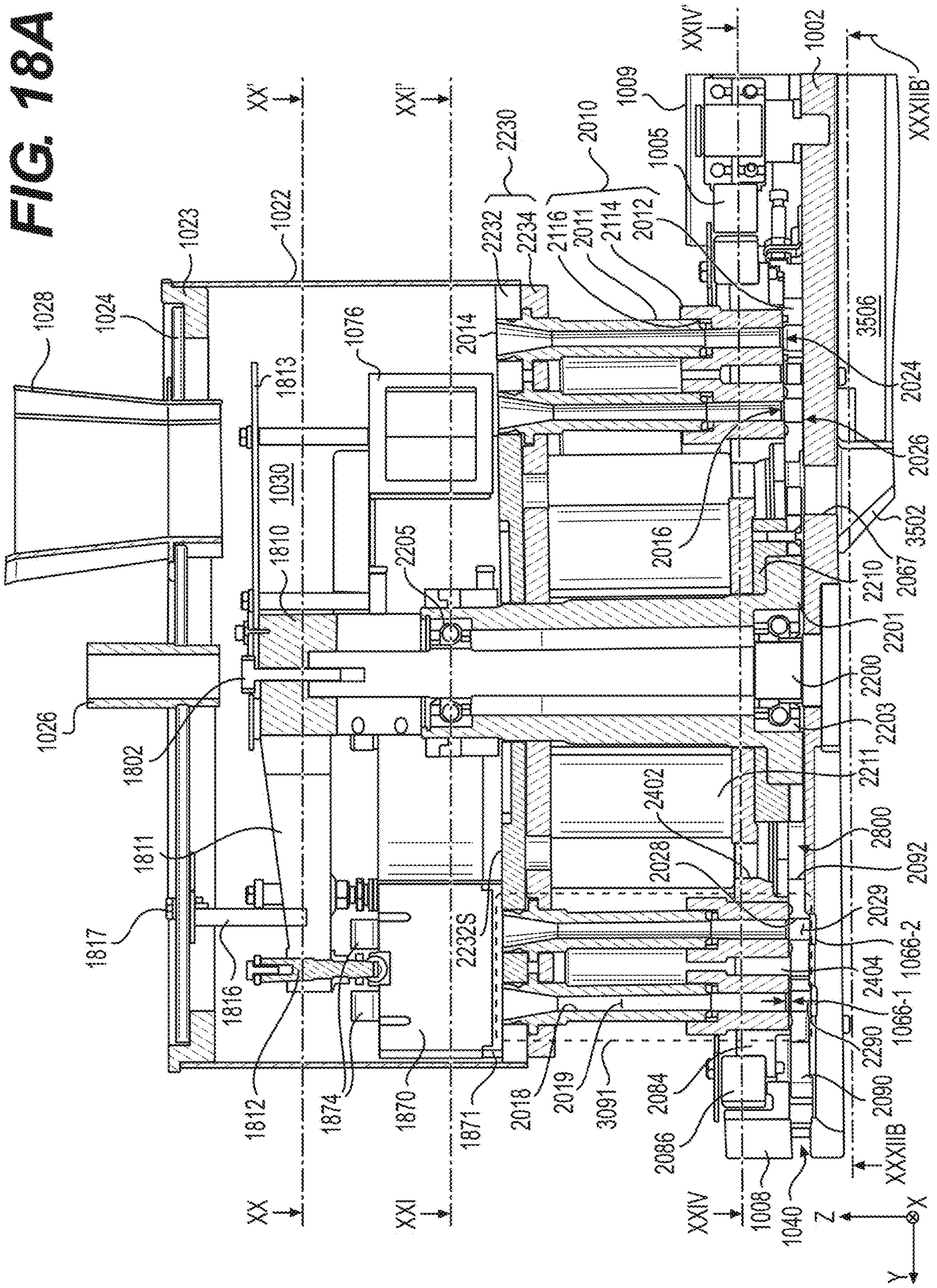
FIG. 18A is a three-dimensional cross-sectional view, along view line XVIIIA-XVIIIA', of the apparatus shown in FIG. 17, according to some example embodiments.

As shown in at least FIG. 18A, the rotatable section 1010 includes at least an upper disc assembly 2230, a lower disc 2084, a portioning disc 2090, a ring gear 2086, a side housing 1022, rotatable shaft 2201, structural elements 2210 and 2211, and a plurality of channel assemblies 2010 that are spaced apart around a circumference of the rotatable assembly 1001. Each of the elements of the rotatable section 1010 may be fixed in place in relation to each other, such that each of the elements of the rotatable section 1010 are configured to rotate around the longitudinal axis 702 at the same angular rate.

Each channel assembly 2010 includes an upper assembly 2011, a sheath 2114, a spring assembly 2116, and a lower assembly 2012, where the lower assemblies 2012 of the plurality of channel assemblies 2010 are defined by separate portions of the portioning disc 2090. Each lower assembly 2012 may correspond to, and may include some or all of the elements of, the lower assembly 220 and 712 as described herein.

As shown in at least FIG. 18A, each channel assembly 2010 of the apparatus 1000 may include at least an upper assembly 2011 and a lower assembly 2012. As shown in at least FIG. 18A, the upper assembly 2011 is defined by a tube structure and the lower assembly 2012 is defined by one or more inner surfaces of a portion of the portioning disc 2090. Additionally, as shown in at least FIGS. 18A and 22-23, each channel assembly 2010 of the apparatus 1000 includes a sheath 2114 and a spring assembly 2116. As shown, each upper assembly 2011 is fixed to the upper disc assembly 2230, which includes the top disc 2232 and the upper disc 2234. As a result, each upper assembly 2011 is fixed in place in relation to the upper disc assembly 2230 and to the portioning disc 2090 and lower disc 2084, which are each fixed in place in relation to the upper disc assembly 2230 via the rotatable shaft 2201 and structural elements 2210 and 2211. As shown, a top end of the upper assembly 2011 defines the top opening 2014 of the upper channel 2019, a bottom end of the upper assembly 2011 defines a bottom opening 2016 of the upper channel 2019, and an upper inner surface 2018 of the upper assembly 2011 defines the upper channel 2019 itself. The top opening 2014 of the upper channel 2019 may be understood to be the top opening of the channel assembly 2010 and/or the top opening of the upper assembly 2011. As further shown, a top end of the lower assembly 2012 defines the top opening 2024 of the lower channel 2029, a bottom end of the lower assembly 2012 defines a bottom opening 2026 of the lower channel 2029, and a lower inner surface 2028 of the lower assembly 2012 defines the lower channel 2029 itself. The bottom opening 2026 of the lower channel 2029 may be understood to be the bottom opening of the channel assembly 2010 and/or the bottom opening of the lower assembly 2012.

The upper and lower inner surfaces 2018 and 2028 of each channel assembly 2010 may collectively at least partially define a continuous channel that includes both the upper and lower channels 2019 and 2029. It will be understood that the upper assembly 2011 defines a top opening of the continuous channel that may be the top opening 2014, the lower assembly 2012 defines a bottom opening of the continuous channel that may be the bottom opening 2026, and the channel assembly 2010 is configured to hold a bulk instance of the compressible material extending continuously through both the upper channel 2019 and the lower channel 2029.

Figure 28:
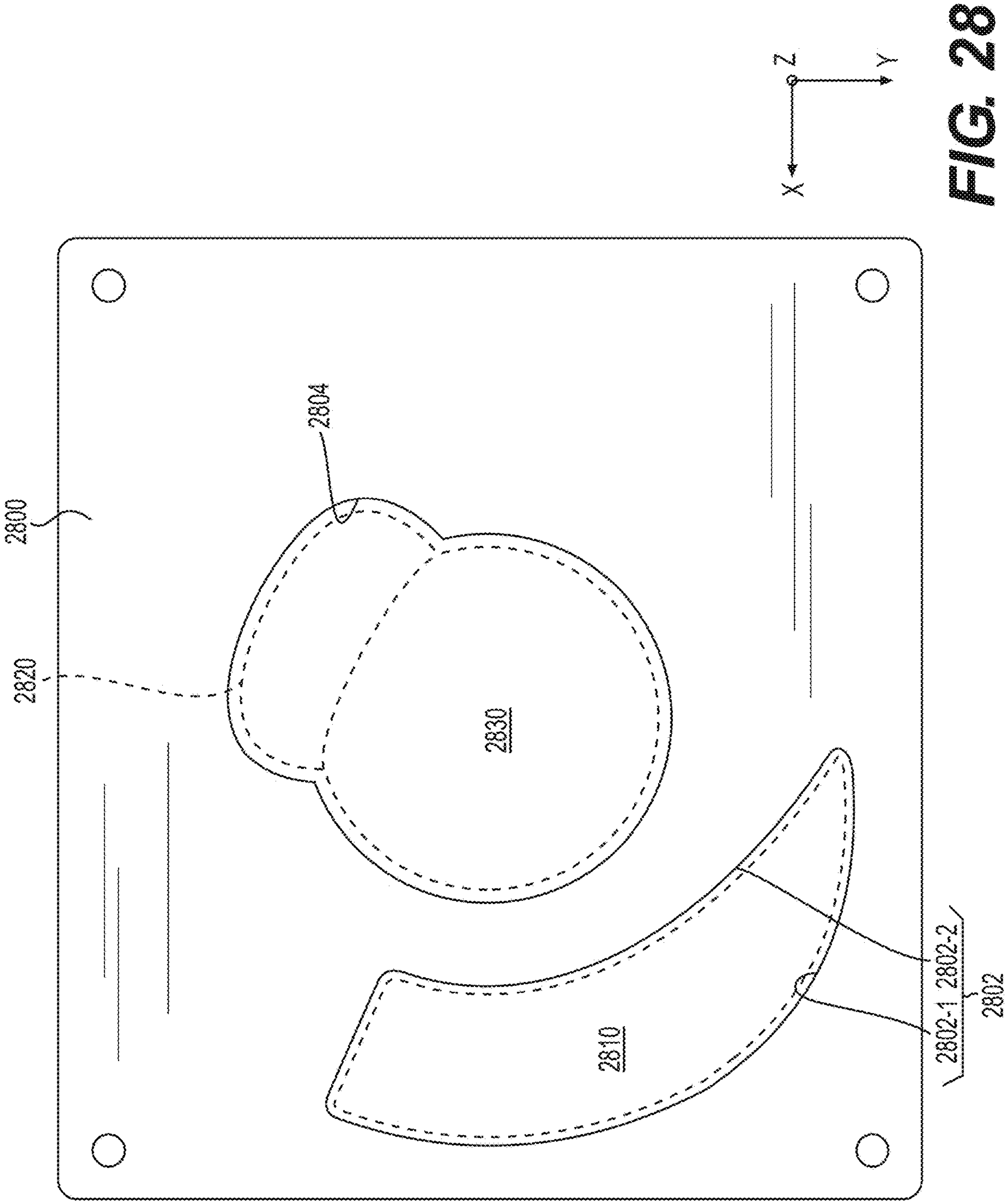
FIG. 28 is a plan view of the cutting assembly of the apparatus shown in FIG. 17, according to some example embodiments.
Figure 29A:
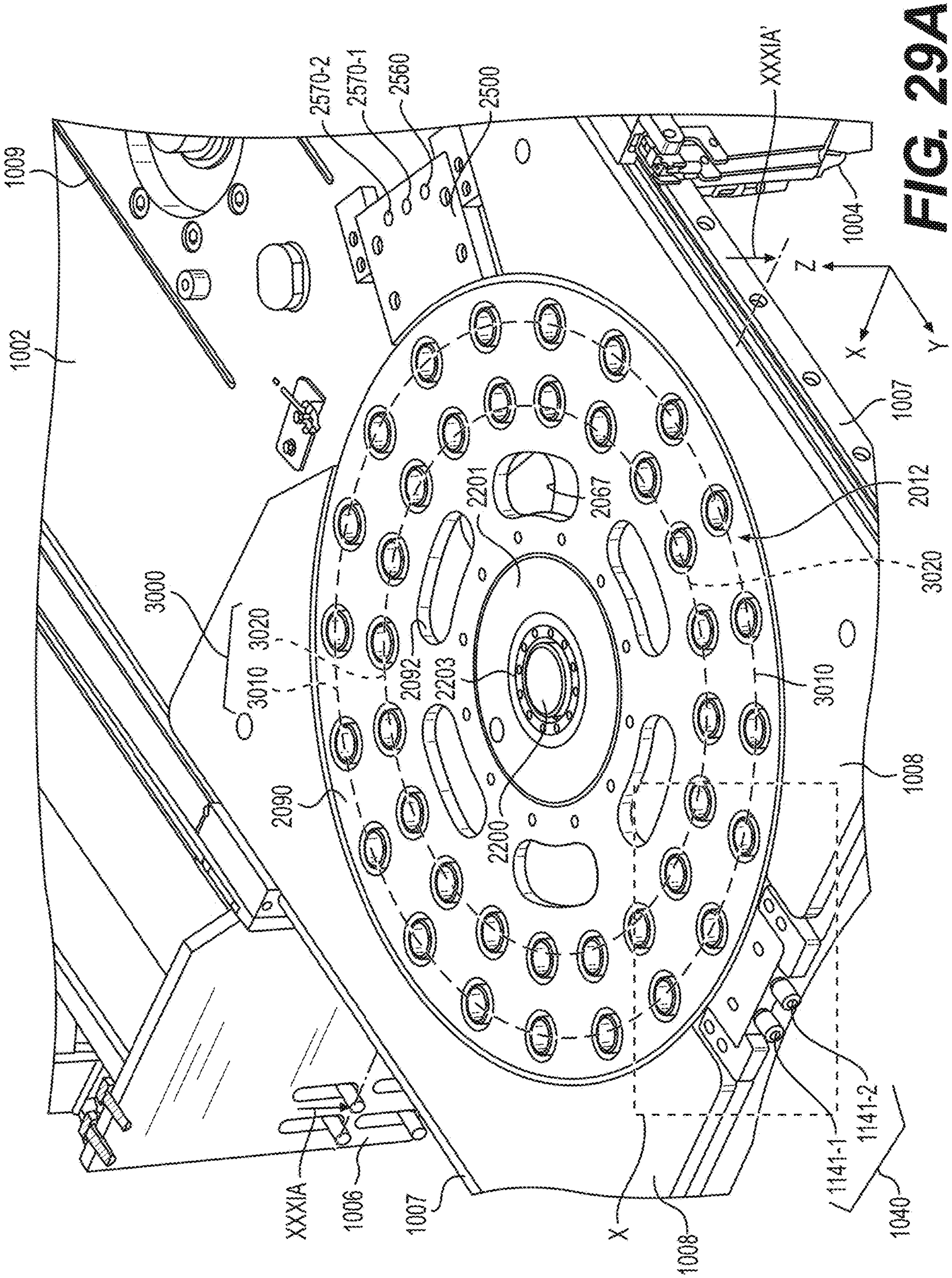
FIG. 29A is a three-dimensional cross-sectional view, along view line XXIX-XXIX', of the apparatus shown in FIG. 26, according to some example embodiments.
Figure 29B:
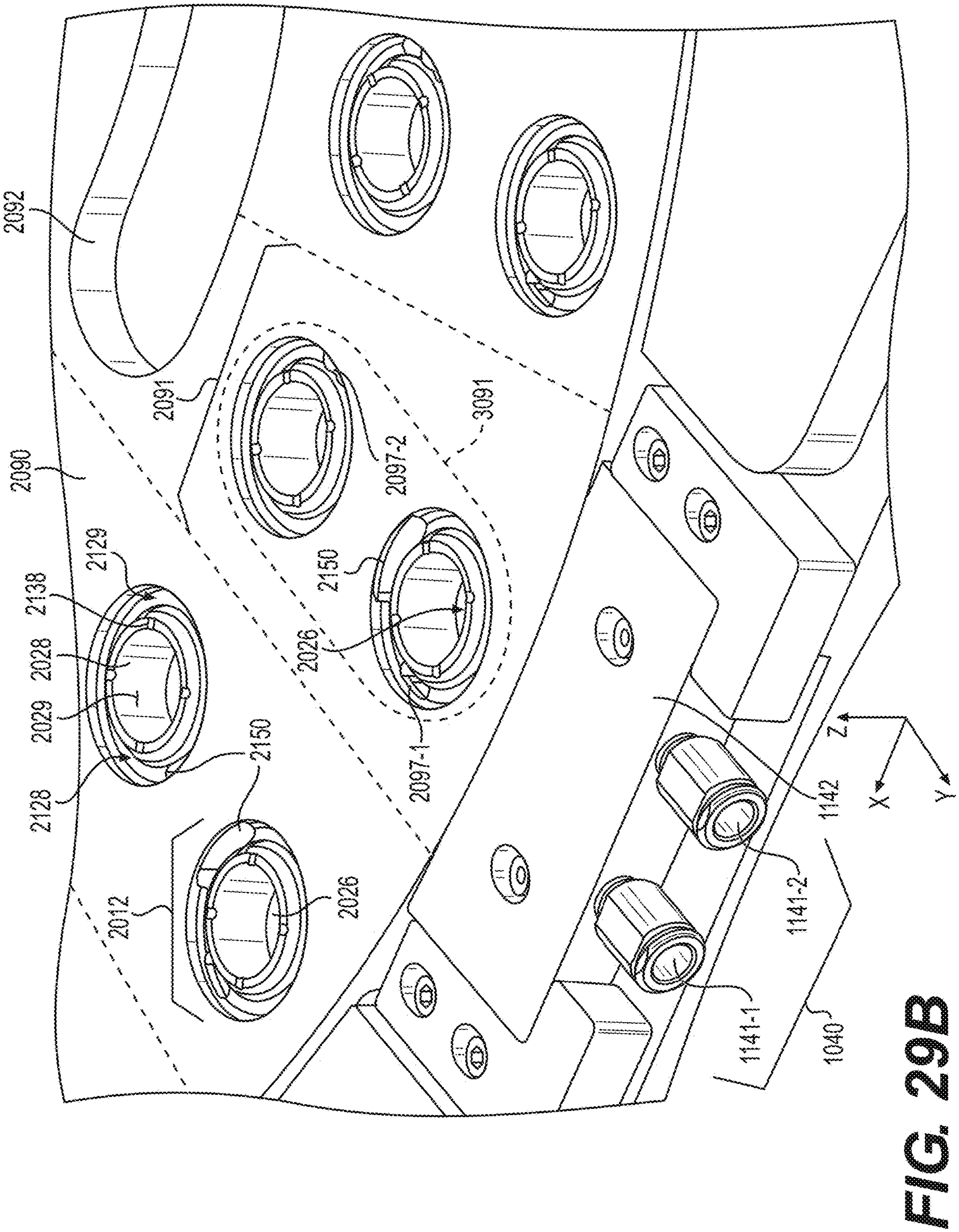
FIG. 29B is an expanded view of region X of FIG. 29A, according to some example embodiments.
Figure 30A:
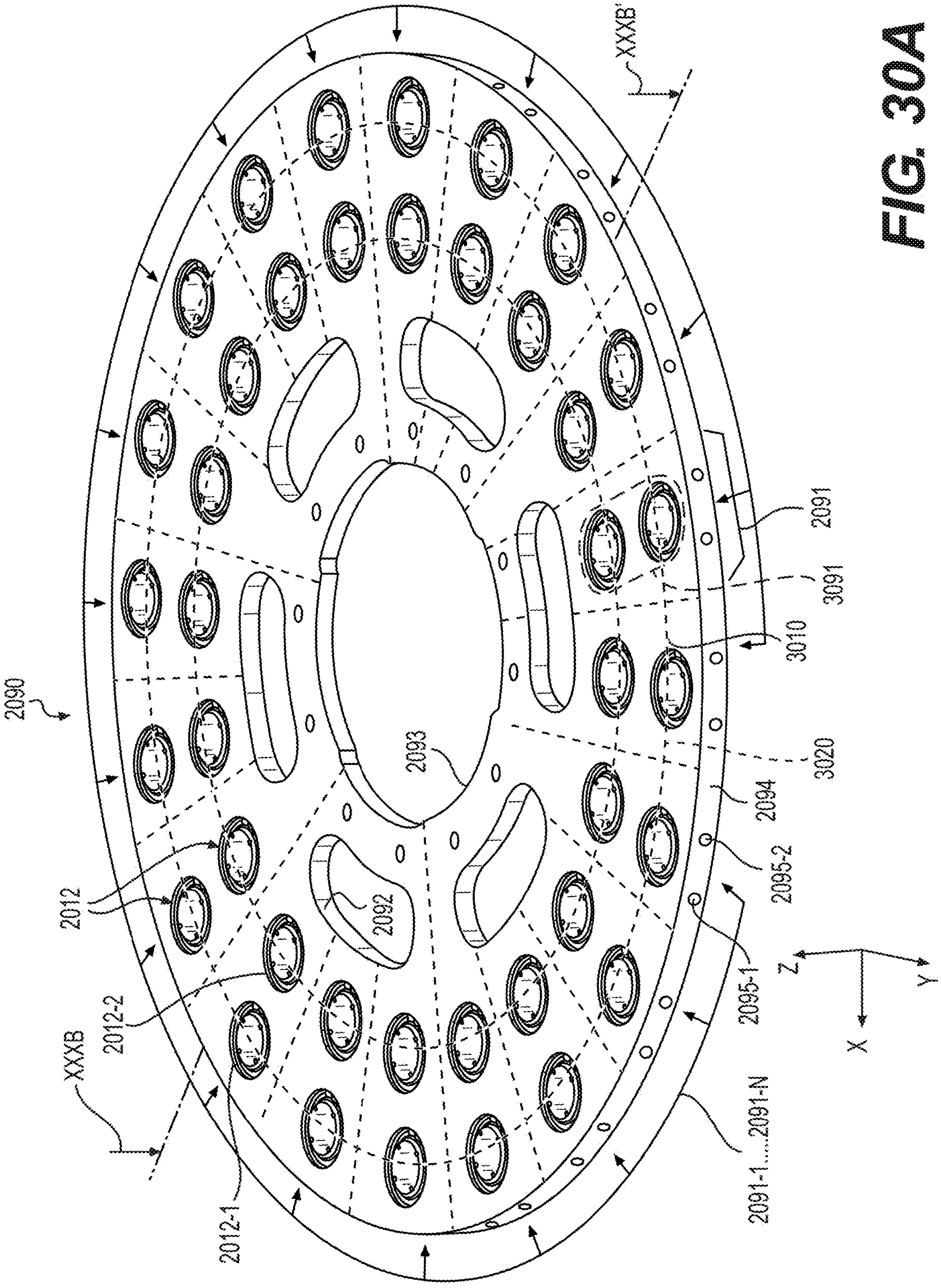
FIG. 30A is a perspective view of a portioning disc, according to some example embodiments.
Figure 30B:
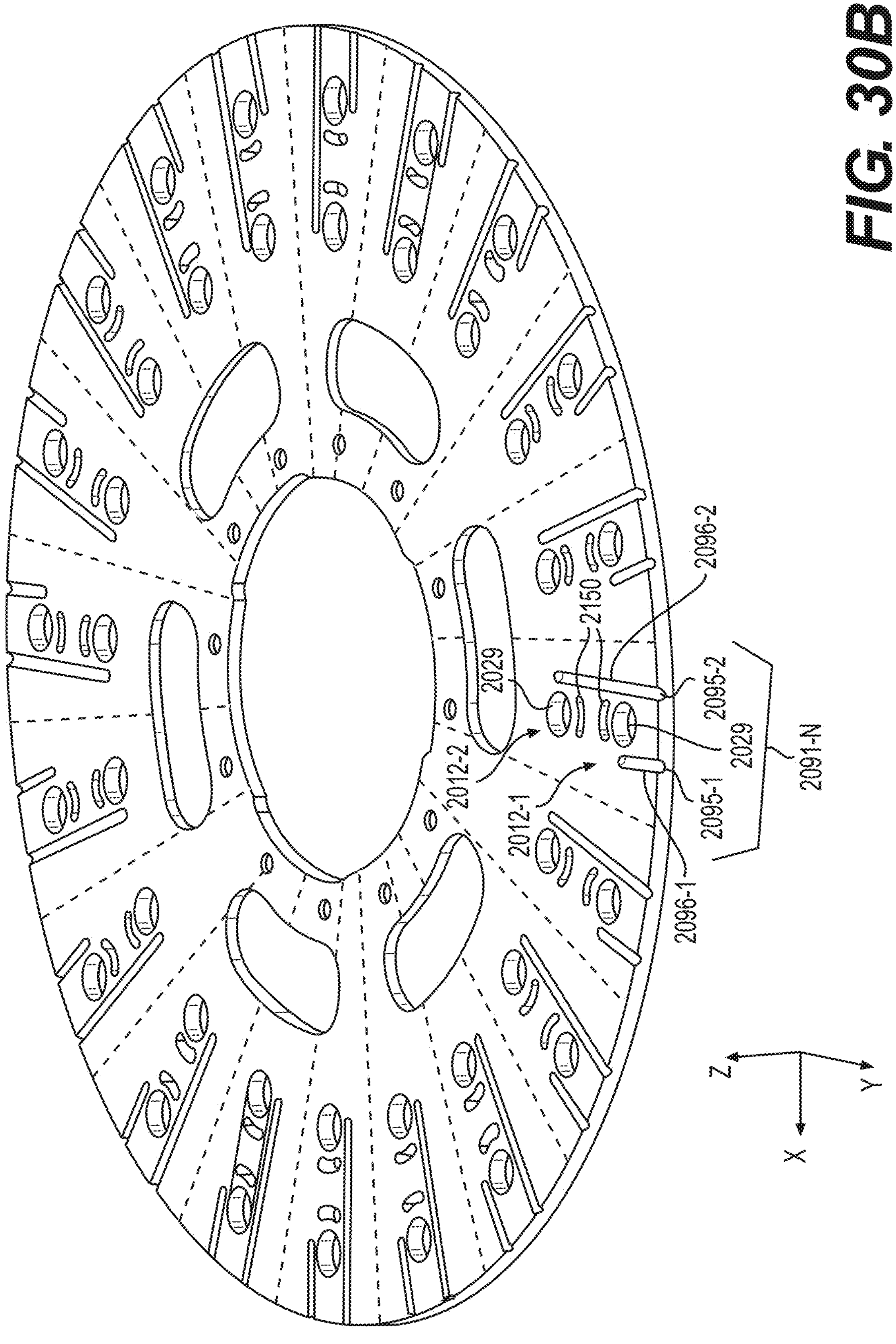
FIG. 30B is a three-dimensional cross-sectional view, along view line XXXB-XXXB', of the portioning disc shown in FIG. 30A, according to some example embodiments.

In the example embodiments shown in FIGS. 17-35, and in particular as shown in at least FIG. 29A and FIG. 30A, the plurality of channel assemblies 2010 may be arranged in a plurality of patterns 3000 of channel assemblies 2010. As shown in at least FIG. 29A and FIG. 30A, the plurality of patterns 3000 may include two, concentric patterns 3010 and 3020 of channel assemblies 2010 extending around, and centered on, longitudinal axis 702, where the patterns include an outer pattern 3010 of twenty (20) channel assemblies 2010 and an inner pattern 3020 of a separate twenty (20) channel assemblies 2010, such that the rotatable section 1010 includes forty (40) separate channel assemblies 2010. However, it will be understood that, in some example embodiments, the quantity of concentric patterns 3000 may be greater than the two patterns 3010 and 3020 shown in FIGS. 17-35, and the quantity of channel assemblies 2010 in one or more concentric patterns may be different. Additionally, it will be understood that in some example embodiments the apparatus 1000 may include one or more patterns of channel assemblies 2010 that do not have radial and/or rotational symmetry around the longitudinal axis 702.

In some example embodiments, apparatus 1000 may include a single concentric pattern of channel assemblies 2010, such as pattern 3010.

As shown in FIGS. 17-35, an in particular at least FIGS. 29A-30B, each channel assembly 2010 of the outer pattern 3010 is radially aligned with a separate channel assembly 2010 of the inner pattern 3020, such that the radially aligned channel assemblies 2010 of the outer pattern 3010 and the inner pattern 3020 may be referred to as a radially aligned set 3091 of channel assemblies 2010. As shown in at least FIG. 17, for example, each channel assembly 2010 in a given radially aligned set 3091 of channel assemblies 2010 extends through the same radial line that extends radially from the longitudinal axis 702 in the X-Y plane and thus extends normally to the longitudinal axis 702. As shown in FIGS. 17-35, the quantity of radially aligned sets 3091 of channel assemblies 2010 may equal the quantities of channel assemblies 2010 in each pattern 3010, 3020, but example embodiments are not limited thereto. For example, a given radially aligned set 3091 of channel assemblies 2010 may include two or more channel assemblies that are not radially aligned with each other.

Figure 23:
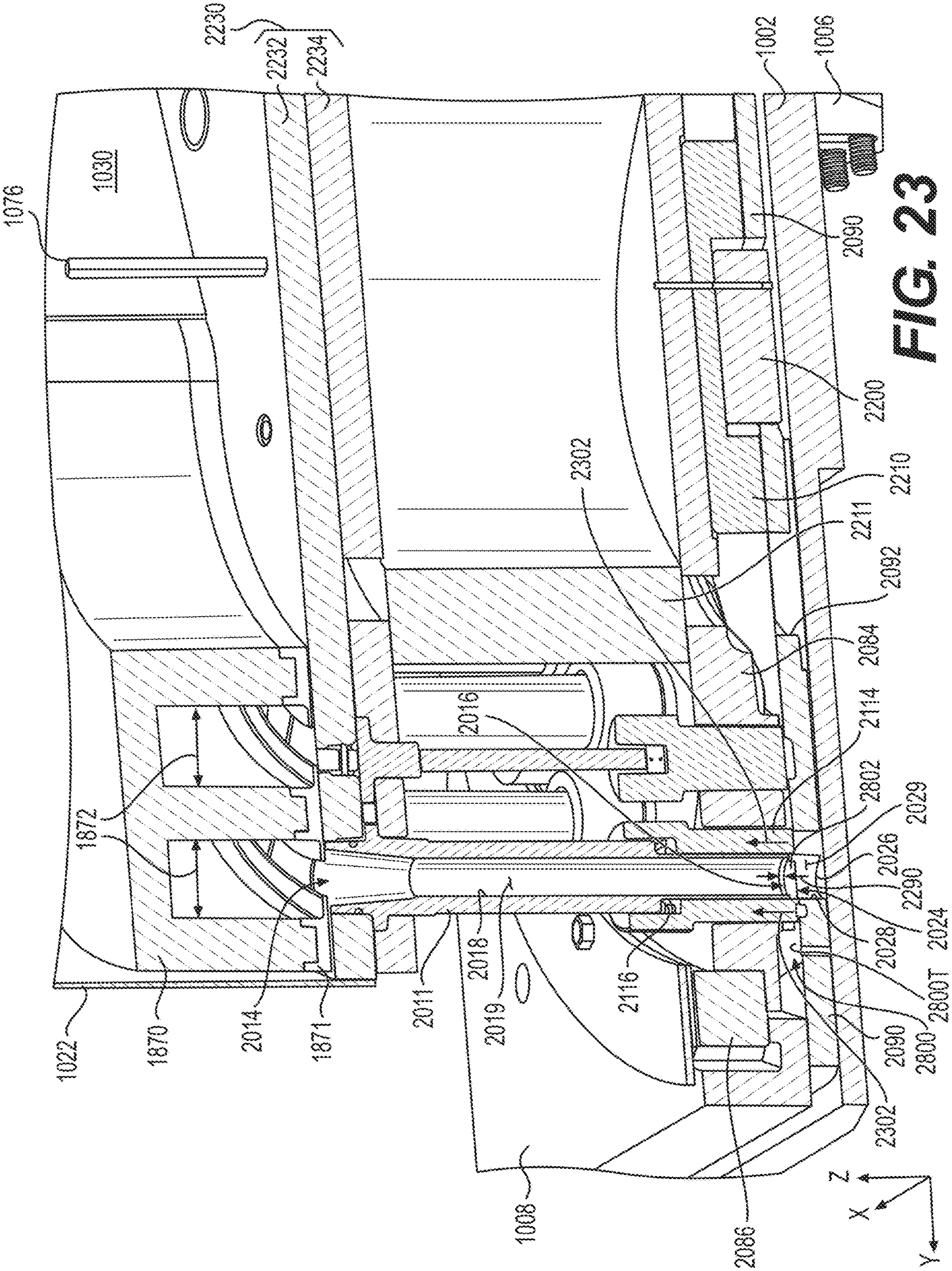
FIG. 23 is a three-dimensional cross-sectional view, along view line XXIII-XXIII', of the apparatus shown in FIG. 21, according to some example embodiments.
Figure 24:
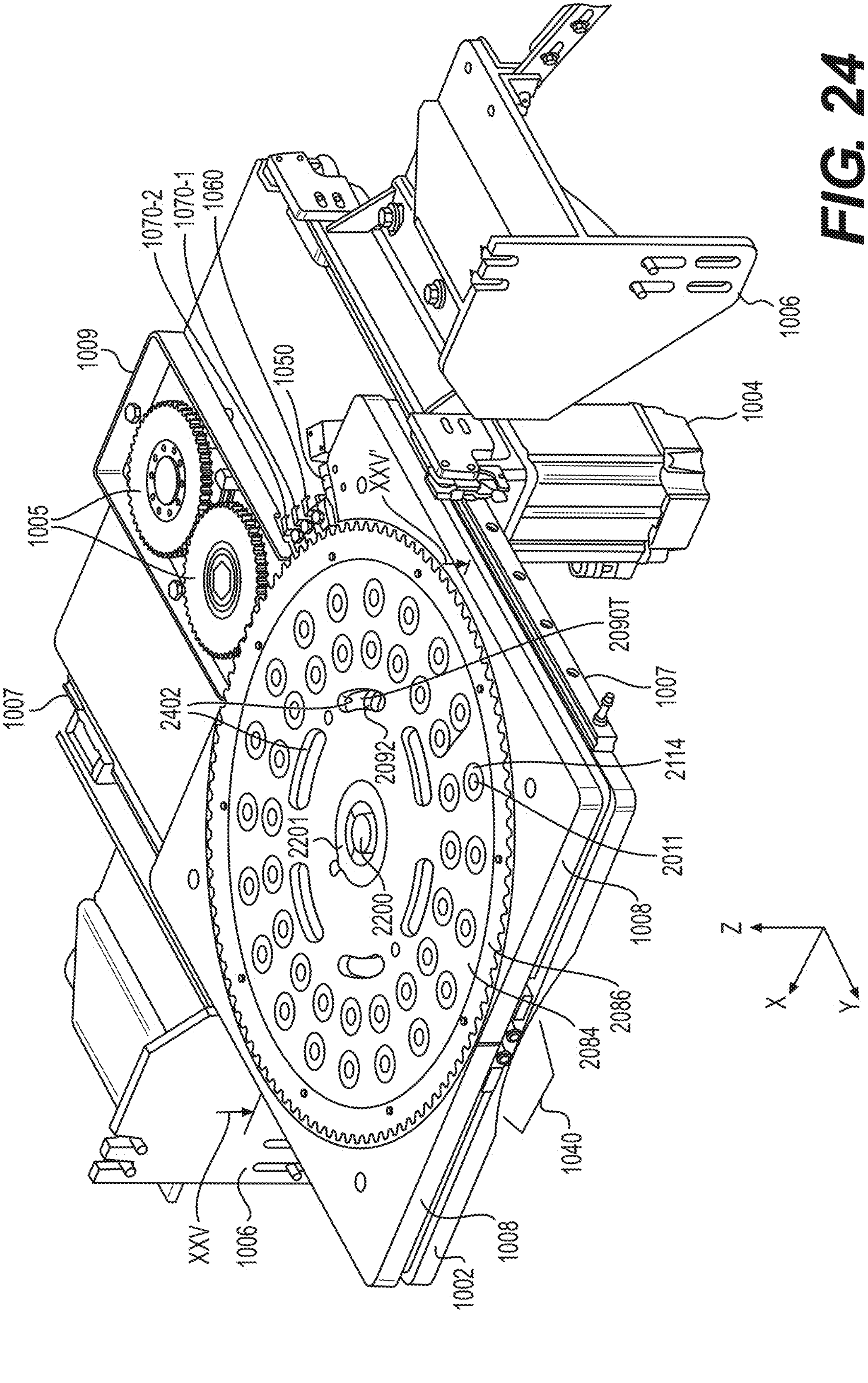
FIG. 24 is a three-dimensional cross-sectional view, along view line XXIV-XXIV', of the apparatus shown in FIG. 18A, according to some example embodiments.

As shown in at least FIGS. 17-35, in particular at least FIG. 24, the apparatus 1000 includes a power supply 1004, which may include a motor, that may generate rotational motion that may be transferred to the rotatable section 1010 of the rotatable assembly 1001 via one or more drive gears 1005 that are coupled to the power supply 1004 and the ring gear 2086 of the rotatable section 1010. The ring gear 2086 may be fixed to the lower disc 2084 via one or more bolts as shown in FIGS. 17-35. Accordingly, rotational motion may be transferred from the power supply 1004 to the rotatable section 1010 via the ring gear 2086 and the one or more drive gears 1005, to cause the rotatable section 1010 to rotate around the longitudinal axis 702 in direction "R". In some example embodiments, the rotatable section 1010 is configured to rotate round the longitudinal axis 702 at a rate of about 5 revolutions per minute, which may correspond to production of portioned instances of compressible material by the apparatus 1000 of about 200 instances per minute. But, example embodiments are not limited thereto, and the rotatable section 1010 may be configured to rotate around the longitudinal axis 702 at a rate that is greater or less than about 5 revolutions per minute.

As shown in FIGS. 17-35, in particular at least FIG. 17, the apparatus 1000 may include one or more instances of shielding that may partially or entirely isolate one or more elements of the apparatus 1000 from exposure to an exterior of the apparatus 1000 and may at least partially isolate the one or more elements from exposure to residue accumulation, including accumulation of stray compressible material, on the one or more elements. For example, as shown in at least FIG. 17, the apparatus 1000 includes ring shields 1008 that cover at least the gear teeth of the ring gear 2086 and at least partially isolate the ring gear 2086 from exposure to the exterior of the apparatus 1000. In addition, as shown in at least FIG. 17, the apparatus 1000 includes a gear shield 1009 that defines an enclosure in which the one or more drive gears 1005 are located, thereby at least partially isolating the one or more drive gears 1005 from exposure to the exterior of the apparatus 1000.

Referring now to at least FIGS. 18A-21, the hopper 1020 includes a central fixed structure 1810 with arms 1811 and 1813 that extend radially from the central fixed structure 1810 to couple with other fixed elements of the hopper 1020 that are held in a fixed position, in relation to the plate 1002, by the central fixed structure 1810 while other elements of the hopper 1020 and/or the rotatable section 1010 rotate around the longitudinal axis 702. As shown in at least FIG. 18A, the central fixed structure 1810 is fixed to a central shaft 2200 that extends along the longitudinal axis 702 via an adjustable bolt 1802. The central shaft 2200 may be fixed to the plate 1002 and may not rotate around the longitudinal axis 702. The adjustable bolt 1802 may be adjusted to adjust a tightness of the connection between the central fixed structure 1810 and the central shaft 2200. Accordingly, it will be understood that any of the elements that are fixed to the central fixed structure 1810, including the enclosure structures 1860 and 1870 as described herein, are fixed to the plate 1002 and thus are fixed in place in relation to at least the rotatable section 1010, and elements thereof, of the rotatable assembly 1001.

As shown in at least FIGS. 17-21, the hopper 1020 includes a side housing 1022 and a top housing 1024 that, collectively with a top surface 2232S of the top disc 2232 of the upper disc assembly 2230, define a hopper enclosure 1030. The top housing 1024 may be fixed to the central fixed structure 1810, and thus may be fixed to the plate 1002 via the central shaft 2200. As a result, the top housing 1024 may not move in relation to the plate 1002, via struts 1816 and bolts 1817 that secure the top housing 1024 to an arm 1811 that is fixed to the central fixed structure 1810.

As shown in at least FIGS. 17-21, the side housing 1022 may be fixed to the top disc 2232 via one or more bolts. As a result, the side housing 1022 may be configured to rotate around the longitudinal axis 702 at the same angular rate as the top disc 2232. Additionally, the side housing 1022 includes a gasket 1023 that seals a connection between the rotatable side housing 1022 and the non-rotatable top housing 1024. The top housing 1024 may be configured to remain fixed in place, based on the fixed connection of the top housing 1024 to the central fixed structure 1810 via struts 1816 and an arm 1811, while the side housing 1022 may be configured to rotate around the longitudinal axis 702. The gasket 1023 thereby may be configured to mitigate loss of compressible material from the hopper enclosure 1030 via the interface between the rotatable side housing 1022 and the fixed top housing 1024.

As shown in at least FIGS. 17-21, conduits 1026, 1027, and 1028 extend through the top housing 1024 and at least partially into the hopper enclosure 1030. Compressible material may be loaded into the hopper enclosure 1030 from a material supply source (not shown in FIGS. 17-35) via the conduit 1028. The compressible material held in the hopper enclosure 1030 may fall into one or more upper channels 2019 of one or more channel assemblies 2010 that are exposed to the hopper enclosure 1030 via the top openings 2014 of the one or more upper channels 2019 that extend through the top disc 2232 and are exposed to the hopper enclosure 1030 as the rotatable section 1010 rotates in direction "R" around the longitudinal axis 702.

As shown in at least FIGS. 17-21, conduit 1026 is vertically aligned with the longitudinal axis 702 (i.e., aligned in the Z-direction as shown) and is vertically aligned with the bolt 1802 that secures the central fixed structure 1810 to the central shaft 2200. Conduit 1026 enables operator access to the bolt 1802, to enable adjustment of the bolt 1802 to adjust the downwards force applied by the central fixed structure 1810 to one or more elements fixed to the central fixed structure 1810 via one or more of the arms 1811, 1813 extending from the central fixed structure 1810, without at least partial disassembly of the hopper 1020. In addition, conduit 1027 is configured to enable a laser level sensor 1029 to emit a beam of laser light 1029A through the conduit 1027 and into the hopper enclosure 1030 so that a level of compressible material within the hopper enclosure 1030 may be determined based on detecting a reflection of laser light 1029A from the compressible material held in the hopper enclosure 1030.

As shown in at least FIG. 18A, the conduits 1026, 1027, and 1028 each extend both out of the hopper 1020 and at least partially into the hopper enclosure 1030 that is defined by at least the top housing 1024. The extension of the conduits 1026, 1027, and 1028 at least partially into the hopper enclosure 1030 configures each conduit 1026, 1027, and 1028 to resist entry of compressible material held in the hopper enclosure 1030 into the respective conduit from an acute approach angle (e.g., to resist entry of compressible material from the hopper enclosure into the respective conduit from the side thereof). The extension of the conduits 1026, 1027, and 1028 at least partially out of the hopper 1020 configures each conduit 1026, 1027, and 1028 to mitigate escape of stray compressible material that enters the respective conduit from the hopper 1020 via the respective conduit, as the length of the conduit is increased to lengthen the distance that stray compressible material must travel, against the force of gravity to escape the hopper 1020 via the respective conduit. Accordingly, retention of the compressible material in the hopper enclosure 1030 may be improved based on the conduits 1026, 1027, and 1028 each extending both out of the hopper 1020 and at least partially into the hopper enclosure 1030.

As shown in at least FIGS. 18A-21, the central fixed structure 1810 is fixed to various baffles 1076 that are positioned throughout the hopper enclosure 1030 via arms 1813. The baffles 1076, being held in a fixed position in relation to the plate 1002 by arms 1813, are configured to improve uniformity of the distribution of compressible material within the hopper enclosure 1030 as the rotatable section 1010 that includes the top disc 2232 rotates round the longitudinal axis 702.

As shown in at least FIGS. 18A-21, the hopper 1020 includes enclosure structures 1860 and 1870 which are fixed in place, in relation to the rotatable section 1010, by the central fixed structure 1810 via arms 1811, and the arms 1811 are coupled to the enclosure structures 1860 and 1870 via compression structures 1812. Each compression structure 1812 is configured to apply a downward force in the Z-direction on the respective enclosure structure 1860 or 1870 to which the compression structure 1812 is directly coupled in order to cause the gasket 1861 or 1871 of the respective enclosure structure 1860 or 1870 to maintain a seal between the respective enclosure structure 1860 or 1870 and the top surface 2232S of the top disc 2232, to mitigate penetration of compressible material between the gasket and the top surface 2232S of the top disc 2232.

As described further herein, the force applied by the arms 1811 and compression structures 1812 to the enclosure structures 1860 and 1870 may be adjusted, to adjust the sealing between the gaskets 1861 and 1871 and the top surface 2232S of the top disc 2232, based on adjusting the bolt 1802 to adjust a tightness of the connection between the central fixed structure 1810 and the central shaft 2200 via the bolt 1802.

As shown in at least FIGS. 18A-21, the enclosure structures 1860 and 1870 are positioned at approximately opposite sides of the hopper enclosure 1030, such that a force applied on the enclosure structures 1860 and 1870 by the central fixed structure 1810, and thus the force applied on the central fixed structure 1810 by the enclosure structures 1860 and 1870, is balanced and is thus approximately centered at the longitudinal axis 702, thereby mitigating bending of the central fixed structure 1810 away from the longitudinal axis 702.

Figure 20:
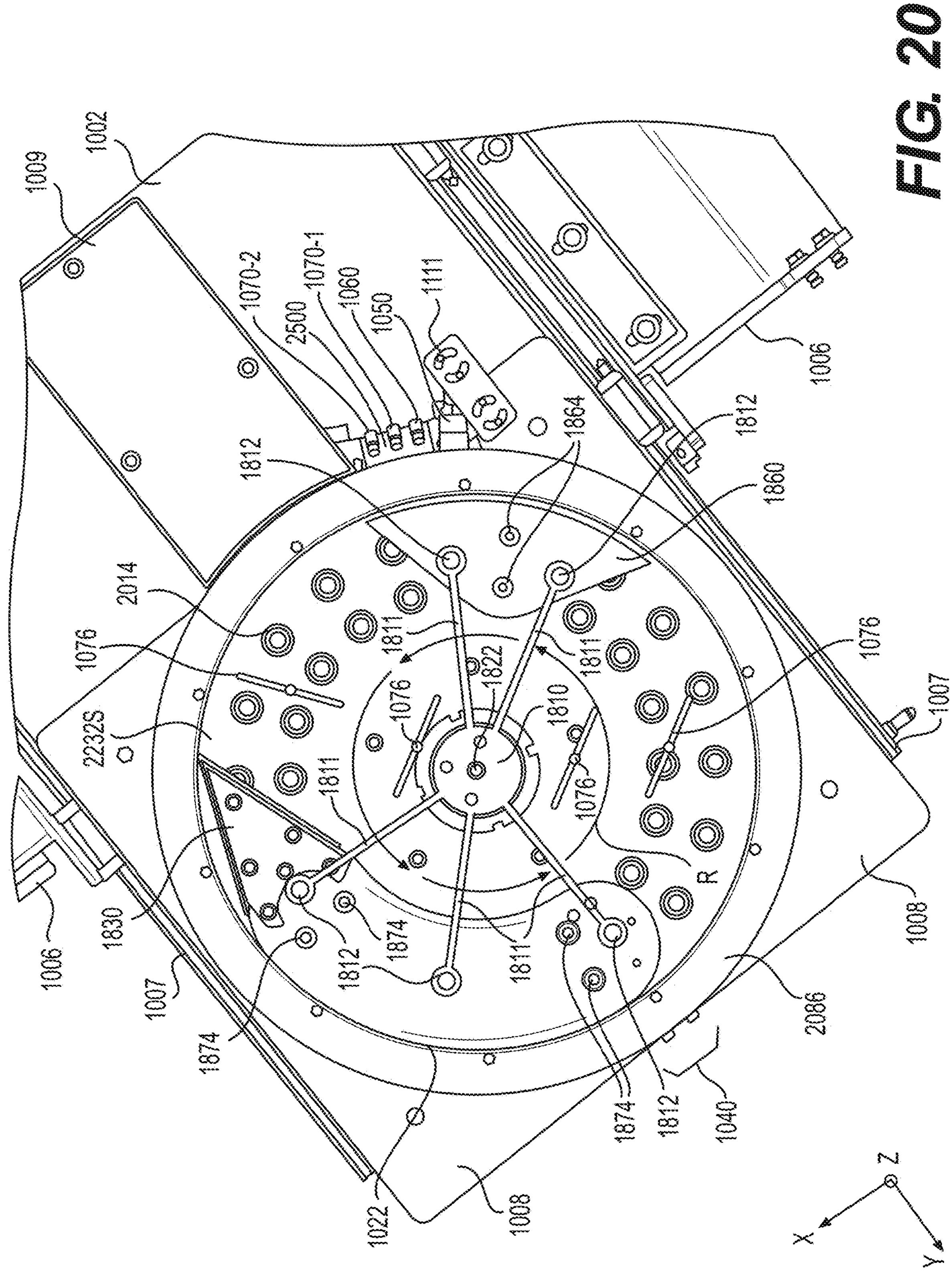
FIG. 20 is a plan cross-sectional view, along view line XX-XX', of the apparatus shown in FIG. 18A, according to some example embodiments.
Figure 21:
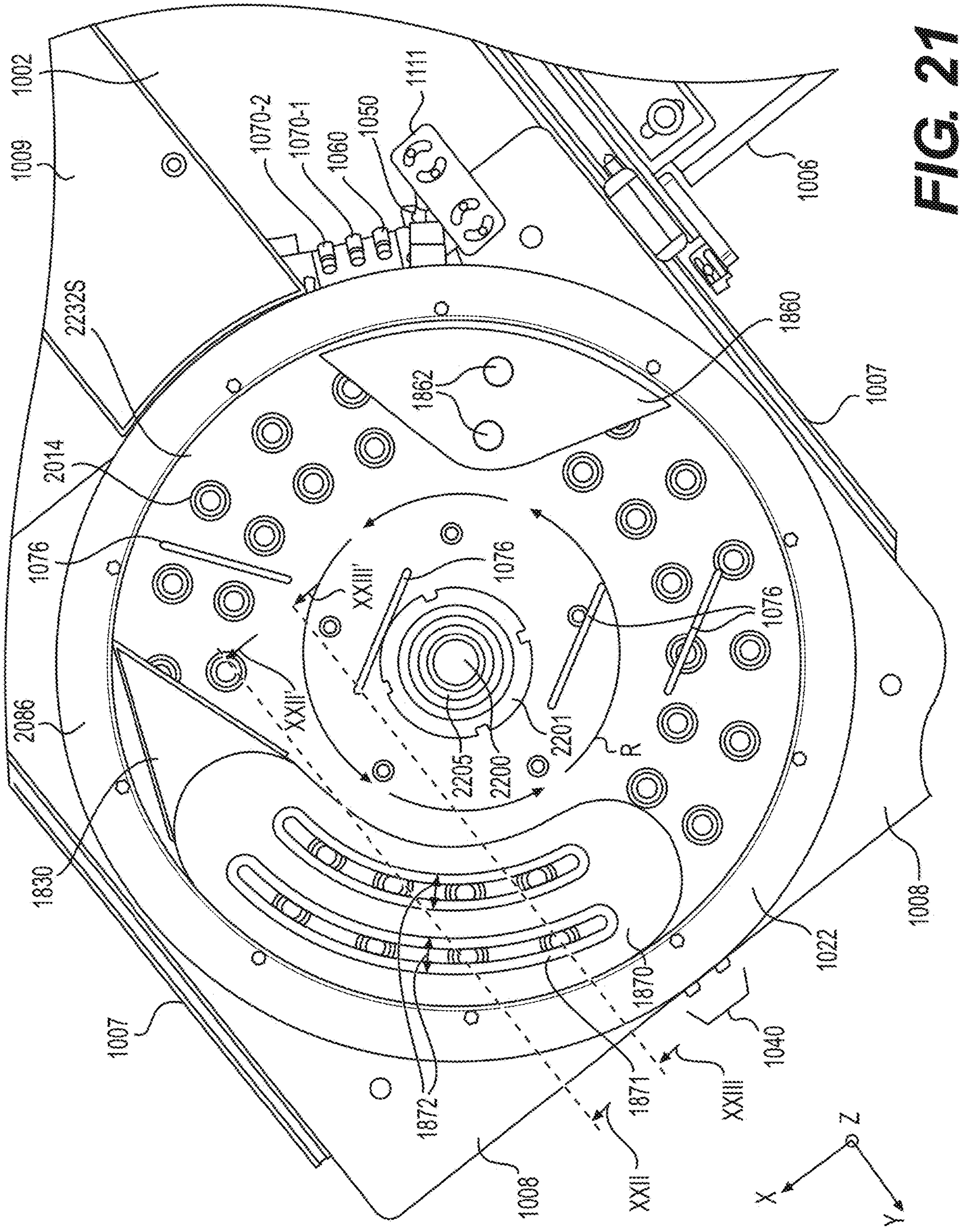
FIG. 21 is a plan cross-sectional view, along view line XXI-XXI', of the apparatus shown in FIG. 18A, according to some example embodiments.

As shown in at least FIGS. 20-21, the enclosure structure 1860 defines two separate enclosures 1862 that are each vertically aligned with a separate pattern of the patterns 1310 and 1320 of channel assemblies 2010, and each separate enclosure 1862 is coupled to a separate gas supply port 1864. The enclosure structure 1860 may be configured to induce knockdown of loose compressible material that has fallen into an upper channel 2019 of a given channel assembly 2010. The enclosure structure 1860 may induce said knockdown based on supplying pressurized gas through the top opening 2014 of the upper channel 2019 when the top opening of the upper channel 2019 of the given channel assembly 2010 is vertically aligned with an enclosure 1862 of the enclosure structure 1860. Pressurized gas may be supplied into the enclosure 1862 via the coupled gas supply port 1864, and the pressurized gas may be further supplied from the enclosure 1862 into the upper channel 2019 of the upper assembly 2011 via the top opening 2014 of the upper channel 2019 that is at least partially vertically aligned with the enclosure 1862 and thus is at least partially exposed to the enclosure 1862. Such a supply of pressurized gas, by knocking loose compressible material to a bottom of the upper channel 2019, may mitigate blockage of the upper channel 2019 by loose, uncompressed compressible material, thereby improving the uniformity of compressed bulk material in the channel assembly 2010. As shown in at least FIG. 21, the enclosures 1862 are each sized to correspond to a diameter of a single top opening 2014 of a single channel assembly 2010, such that only one channel assembly 2010 may be exposed to a given enclosure 1862 at a time. However, it will be understood that example embodiments are not limited thereto, and one or more of the enclosures 1862 may be sized to be configured to expose multiple top openings 2014 of multiple channel assemblies 2010 simultaneously as the channel assemblies 2010 rotate under the enclosure structure 1860. As further shown in at least FIG. 21, the enclosures 1862 are each positioned to simultaneously expose respective top openings 2014 of separate upper channels 2019 of separate channel assemblies 2010 of a same radially aligned set 3091 of channel assemblies 2010 as the rotatable section 1010 rotates around the longitudinal axis 702, but example embodiments are not limited thereto. For example, the enclosures 1862 may be positioned to simultaneously expose top openings 2014 of upper channels 2019 of channel assemblies 2010 that are in separate, for example adjacent, radially aligned sets 3091 of channel assemblies 2010 as the rotatable section 1010 rotates around the longitudinal axis 702. It will be understood that, in some example embodiments, the enclosure structure 1860 may define only one enclosure 1862 that may be aligned with a single concentric pattern of channel assemblies 2010.

Figure 18B:
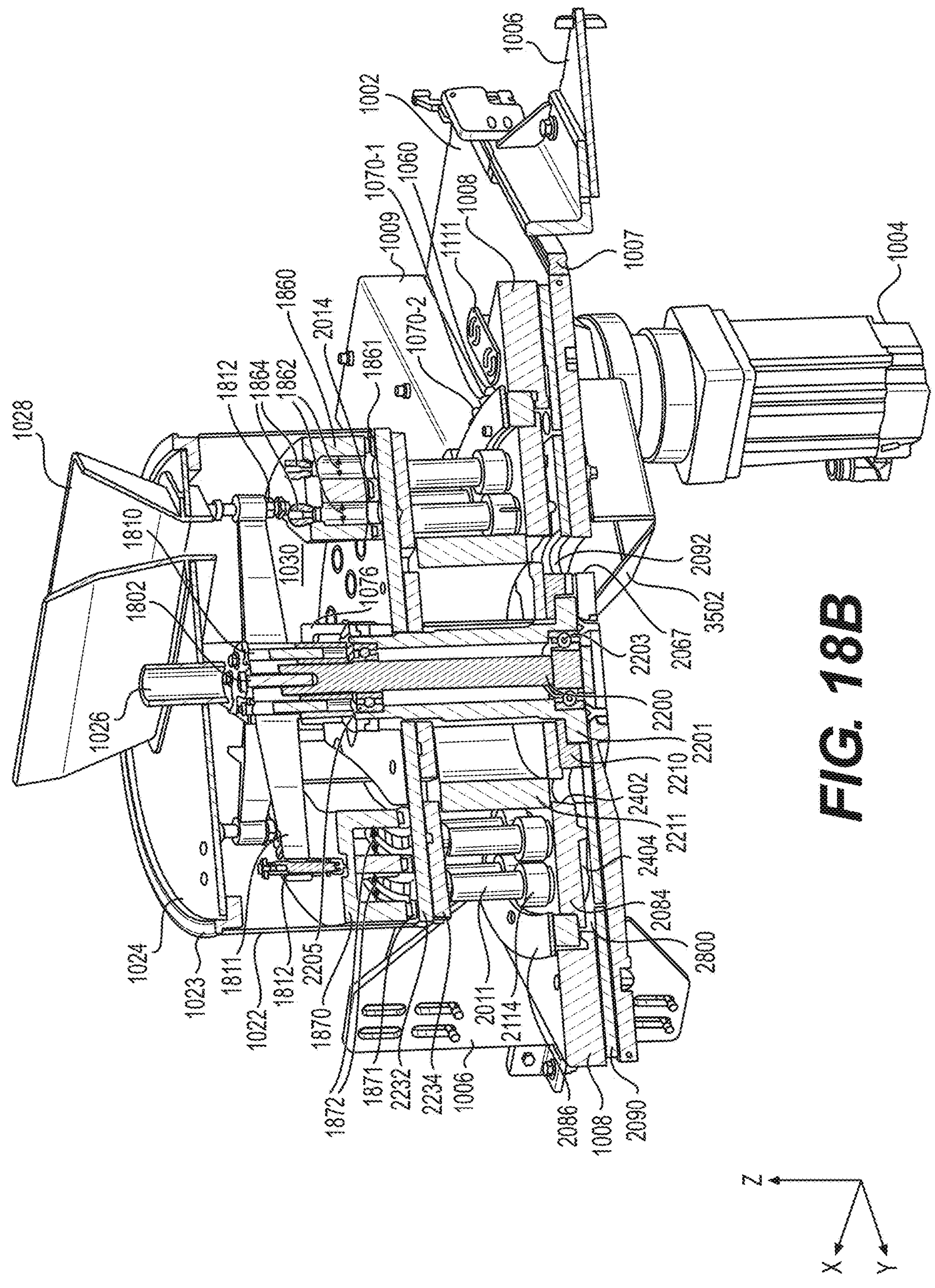
FIG. 18B is a three-dimensional cross-sectional view, along view line XVIIIB-XVIIIB', of the apparatus shown in FIG. 17, according to some example embodiments.
Figure 25:
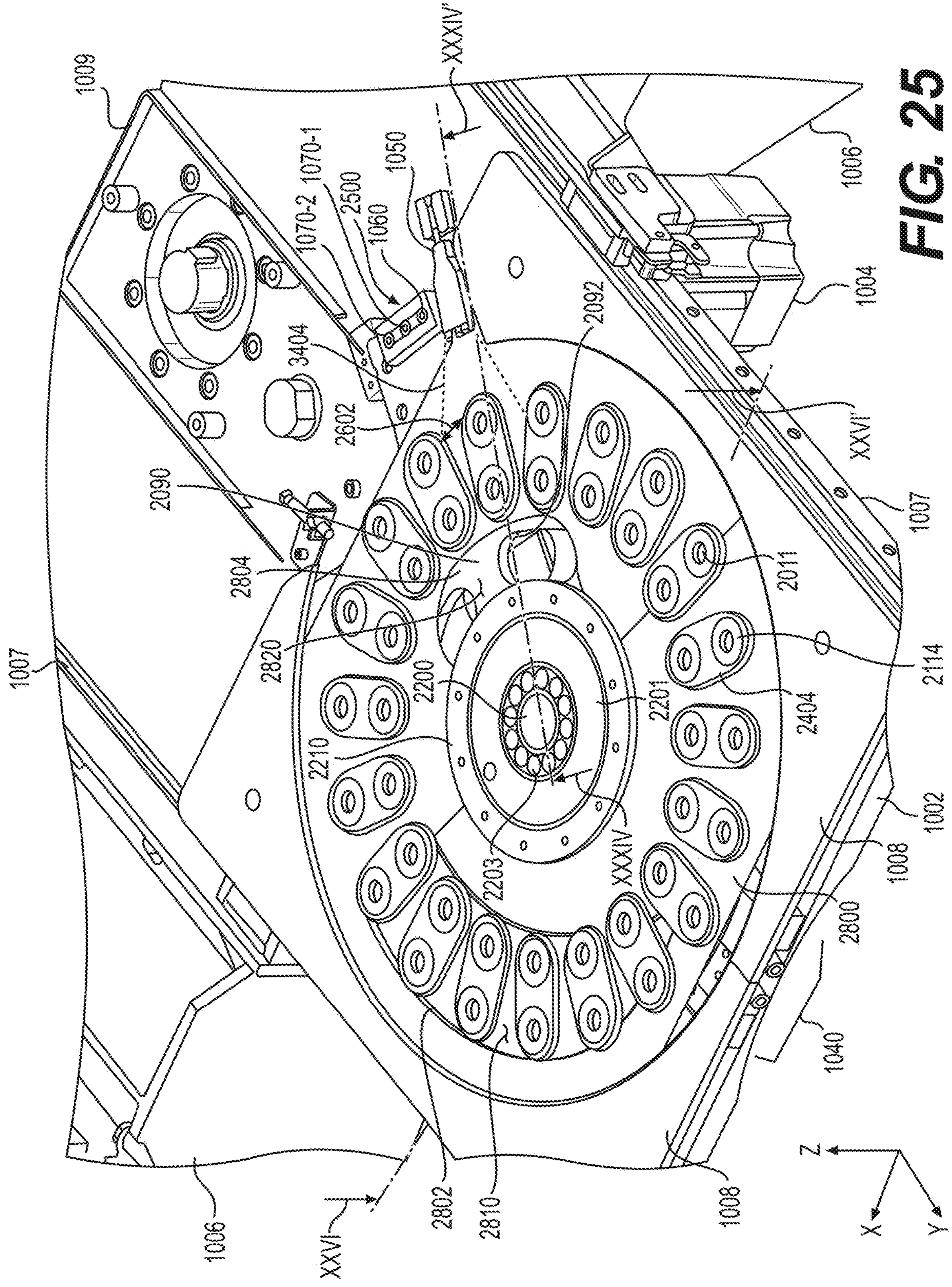
FIG. 25 is a three-dimensional cross-sectional view, along view line XXV-XXV', of the apparatus shown in FIG. 24, according to some example embodiments.
Figure 26:
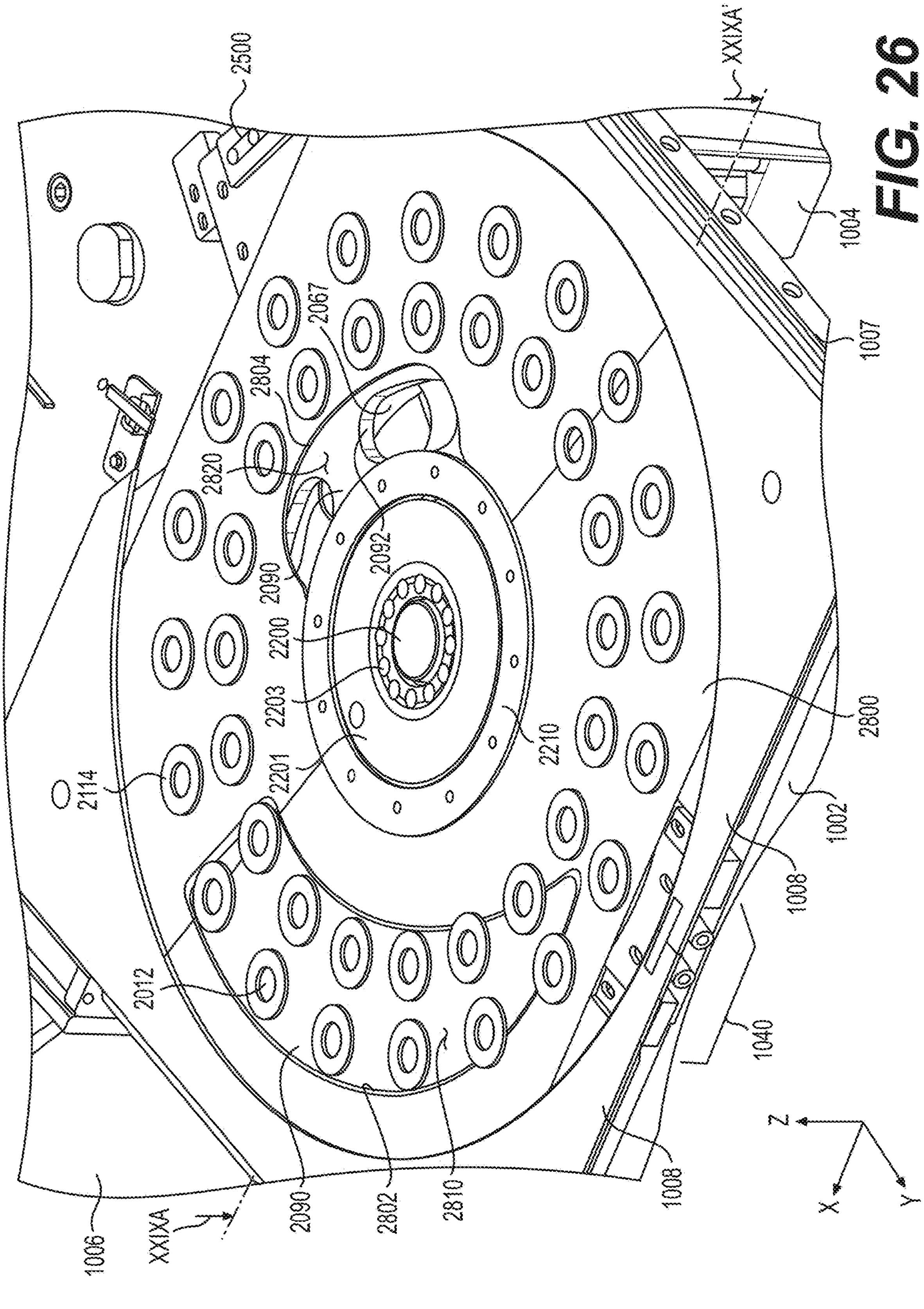
FIG. 26 is a three-dimensional cross-sectional view, along view line XXVI-XXVI', of the apparatus shown in FIG. 25, according to some example embodiments.

As shown in FIGS. 17-35, including at least FIG. 18B and FIG. 26, the enclosure structure 1860 may be vertically aligned with a cutting assembly 2800 structure that extends transversely between the upper and lower channels 2019 and 2029 of a channel assembly 2010 that is at least partially vertically aligned with, and thus exposed to, an enclosure 1862 of the enclosure structure 1860. As a result, the lower channel 2029 of the channel assembly 2010 may be isolated from the upper channel 2019 and thus the enclosure structure 1860 may cause loose compressible material to only be knocked down to the bottom of the upper channel 2019 while remaining within the upper channel 2019. Accordingly, in some example embodiments, the apparatus 1000 is configured to isolate the lower channel 2029 of a channel assembly 2010 from the upper channel 2019 of the channel assembly 2010 based on the rotatable section 1010 rotating the channel assembly 2010 to be at least partially vertically aligned with the enclosure structure 1860. As a result, the enclosure structure 1860 may be configured to push compressible material into a bottom of the upper channel 2019 that is isolated from the lower channel 2029 of the channel assembly 2010. However, it will be understood that example embodiments are not limited thereto, and in some example embodiments the cutting assembly 2800 does not extend transversely between the upper and lower channels 2019 and 2029 of a channel assembly 2010 that is at least partially vertically aligned with, and thus exposed to, an enclosure 1862 of the enclosure structure 1860.

In some example embodiments, the apparatus 1000 may be configured to supply a continuous stream of pressurized gas to the enclosures 1862 via the gas supply ports 1864. In some example embodiments, the apparatus 1000 may be configured to supply separate, independent streams of pressurized gas to the separate enclosures 1862 via the separate gas supply ports 1864. But, example embodiments are not limited thereto, and the apparatus 1000 may supply pressurized gas to each of the gas supply ports 1864 from a common gas supply conduit. In some example embodiments, the apparatus 1000 may be configured to supply separate pulses of pressurized gas to each separate enclosure 1862 via the separate gas supply ports 1864. Each separate pulse of pressurized gas may be timed to arrive at an enclosure 1862 concurrently with the rotatable section 1010 rotating to at least partially vertically align a channel assembly 2010 with the enclosure 1862 so that a top opening 2014 of the one or more channel assemblies 2010 is at least partially exposed to the enclosure 1862.

As shown in at least FIGS. 20-21, the enclosure structure 1870 defines two separate enclosures 1872 that are each aligned with a separate pattern of the patterns 1310 and 1320 of channel assemblies 2010, and each separate enclosure 1872 is coupled to a separate set of one or more gas supply ports 1874. As further shown in at least FIGS. 21-23, the gasket 1871 may at least partially define a lower boundary of the enclosures 1872 to mitigate penetration of compressible material and/or pressurized gas between the enclosure structure 1870 and the top disc 2232, but example embodiments are not limited thereto. It will be understood that, in some example embodiments, the enclosure structure 1870 may define only one enclosure 1872 that may be aligned with a single concentric pattern of channel assemblies 2010.

As shown in FIGS. 17-35, including at least FIGS. 20-21, the enclosures 1872 may each be sized and configured to at least partially vertically align with, and thus simultaneously expose, the top openings 2014 of multiple upper channels 2019 of multiple channel assemblies 2010 rotating under the enclosures 1872, although example embodiments are not limited thereto and each enclosure 1872 may be sized to vertically align with only one top opening 2014 at a time.

As further shown in FIGS. 17-35, including at least FIGS. 20-21, each enclosure 1872 may be vertically aligned with a window 2810 in the cutting assembly 2800 such that one or more of the channel assemblies 2010 that is at least partially vertically aligned with one of the enclosures 1872 includes upper and lower channels 2019 and 2029 that are open to each other and are not isolated from each other by the cutting assembly. As a result, the upper and lower channels 2019 and 2019 of the one or more channel assemblies 2010 may define a continuous channel that extends between, and includes, the upper and lower channels 2019 and 2029. In some example embodiments, the apparatus 1000 is configured to expose the lower channel 2029 of a channel assembly 2010 to the upper channel 2019 of the channel assembly 2010 based on the rotatable section 1010 rotating the channel assembly 2010 to be at least partially vertically aligned with the enclosure structure 1870. As a result, the enclosure structure 1870 may be configured to push compressible material into a bottom of the lower channel 2029 that is exposed to the upper channel 2019 of the channel assembly 2010. The enclosure structure 1870 may be configured to compress an instance of compressible material held in at least the lower channel 2029 of a given channel assembly 2010 that is at least partially vertically aligned with one of the enclosures 1872 via an exposed top opening 2014 of the given channel assembly 2010. The enclosure structure 1870 may compress the instance of compressible material based on supplying pressurized gas to the enclosures 1872 via the one or more gas supply ports 1874 to cause the pressurized gas to pass from the enclosures 1872 and into the exposed upper channels 2019 of the at least partially vertically aligned channel assemblies 2010. The upper and lower channels 2019 and 2029 of each at least partially vertically aligned channel assembly 2010 may at least partially define a continuous channel extending therebetween, such that the pressurized gas supplied through the top opening 2014 of an at least partially vertically aligned channel assembly 2010 induces compression of compressible material held in at least the lower channel 2029 of the at least partially vertically aligned channel assembly 2010.

In view of at least the above, it will be understood that each channel assembly 2010 is configured to hold a bulk instance of the compressible material extending continuously through both the upper channel 2019 and the lower channel 2029 thereof, via the gap space 2290 extending therebetween, and the enclosure structure 1870 that is fixed in place in relation to the rotatable section 1010 may be configured to supply a first gas through a top opening 2014 of at least one channel assembly 2010 of the plurality of channel assemblies 2010 to compress the bulk instance held within the at least one channel assembly 2010, based on rotation of the rotatable section 1010 to at least partially vertically align the channel assembly 2010 with an enclosure 1872 of the enclosure structure 1870 to expose the top opening 2014 of the channel assembly 2010 to the enclosure 1872. As a result, the bulk instance in the at least one channel assembly 2010 may include an upper material portion in the upper channel 2019 of the at least one channel assembly and a lower material portion in the lower channel 2029 of the at least one channel assembly 2010, as described above with reference to at least FIGS. 5A-5D. It will be further understood that the apparatus 1000, in some example embodiments, may be configured to rotate the rotatable section 1010 to cause each channel assembly 2010 of the plurality of channel assemblies to be sequentially vertically aligned with at least one enclosure of each enclosure structure 1860 and 1870.

In some example embodiments, the apparatus 1000 may be configured to supply a continuous stream of pressurized gas to the enclosures 1872 via the gas supply ports 1874. In some example embodiments, the apparatus 1000 may be configured to supply separate, independent streams of pressurized gas to the separate enclosures 1872 via the separate gas supply ports 1874, but example embodiments are not limited thereto, and the apparatus 1000 may supply pressurized gas to each of the gas supply ports 1874 from a common gas supply conduit. In some example embodiments, the apparatus 1000 may be configured to supply separate pulses of pressurized gas to each separate enclosure 1872 via the separate gas supply ports 1874. Each separate pulse of pressurized gas may be timed to arrive at an enclosure 1872 concurrently with the rotatable section 1010 rotating to at least partially vertically align one or more channel assemblies 2010 with the enclosure 1872 so that a top opening 2014 of the one or more channel assemblies 2010 is at least partially exposed to the enclosure 1872.

In some example embodiments, the enclosure structure 1870 may be understood to be configured to supply a first gas through the top opening 2014 of one or more channel assemblies 2010 that are at least partially vertically aligned with one or more enclosures 1872 of the enclosure structure 1870. In some example embodiments, the enclosure structure 1860 may be understood to be configured to supply a second gas through the top opening 2014 of one or more channel assemblies 2010 that are at least partially vertically aligned with one or more enclosures 1862 of the enclosure structure 1860. The first and second gases may be different gases and/or may be supplied to the respective gas supply ports 1874 and 1864 from different gas sources.

In some example embodiments, and as shown in at least FIGS. 18A-21, the enclosure structures 1860 and 1870 are fixed in place on opposite sides of the rotatable section 1010, the enclosure structures 1860 and 1870 defining separate, respective enclosures 1862 and 1872 that are each configured to be open to one or more channel assemblies 2010 based on the rotatable section 1010 rotating around the longitudinal axis 702 to at least partially vertically align the one or more channel assemblies 2010 with the respective enclosure. Each enclosure structure 1860 and 1870 may be configured to supply a gas through a top opening 2014 of a channel assembly 2010 and into at least an upper channel 2019 of the channel assembly 2010 based on rotation of the rotatable section to at least partially vertically align the top opening 2014 of the channel assembly 2010 with an enclosure of the enclosure structure.

In some example embodiments, the enclosure structures 1860 and 1870 are configured to supply the same gas (e.g., air) from the same gas source to the respective enclosures 1862 and 1872 thereof. In some example embodiments, the enclosure structures 1860 and 1870 are configured to supply different gases from separate gas sources to the respective enclosures 1862 and 1872 thereof. In some example embodiments, apparatus 1000 is configured to supply gas to an enclosure 1862 thereof, via a gas supply port 1864 thereof, to pressurize the enclosure 1862 to a first pressure in order to cause the gas to be supplied through exposed top openings of the one or more channel assemblies 2010 that are least partially vertically aligned with the one or more enclosures 1862. In some example embodiments, the apparatus 1000 is configured to supply gas to an enclosure 1872 thereof, via a gas supply port 1874 thereof, to pressurize the enclosure 1872 to a second pressure in order to cause the gas to be supplied through exposed top openings of the one or more channel assemblies 2010 that are least partially vertically aligned with the one or more enclosures 1872. The first and second pressures may be the same pressure or may be different pressures. For example, the apparatus 1000 may be configured to supply gas into enclosures 1862 of the enclosure structure 1860 to simply knock down loose compressible material held within one or more chamber assemblies 2010 that are least partially vertically aligned with one or more of the enclosures 1862 to the bottom ends of at least the upper channels 2019 thereof. Additionally, the apparatus

1000 may be configured to supply gas into enclosures 1872 of the enclosure structure 1870 to compress the compressible material held within one or more channel assemblies 2010 that are least partially vertically aligned with one or more of the enclosures 1872. The apparatus 1000 may be configured to cause one or more enclosures 1862 to be pressurized to a first pressure while the apparatus 1000 may be further configured to cause one or more enclosures 1872 to be pressurized to a second pressure that is greater than the first pressure. The apparatus 1000 may include a control device 120 as described above with reference to at least FIG. 1A to be configured to control the pressurization of the enclosures 1862 and 1872.

Figure 19:
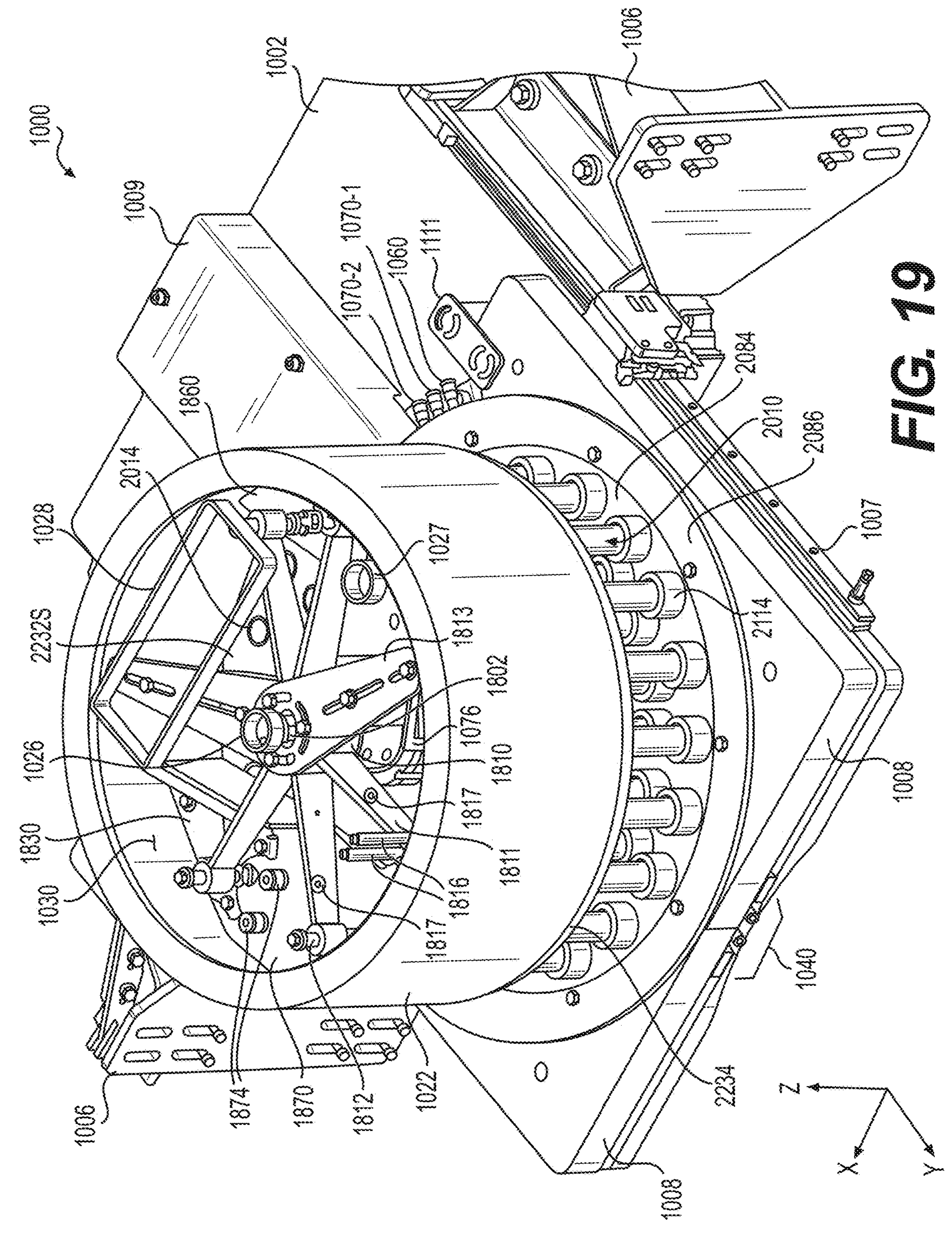
FIG. 19 is a three-dimensional cross-sectional view, along view line XIX-XIX', of the apparatus shown in FIG. 17, according to some example embodiments.

As shown in at least FIGS. 19-21, the enclosure structure 1870 may be coupled to a diversion structure 1830 that is fixed to a leading end of the enclosure structure 1870, where the leading end faces against the direction of rotation R of the rotatable section 1010 and thus is the “upstream” end of the enclosure structure 1870. The diversion structure 1830 is configured to divert compressible material that is held in the hopper enclosure 1030 away from the upstream end of the enclosure structure 1870 to thereby mitigate a risk of compressible material accumulation between the enclosure structure 1870 and the side housing 1022 and to further mitigate a risk of penetration of compressible material between the enclosure structure 1870 and the top disc 2232.

As shown in at least FIGS. 18A-21, the rotatable section 1010 includes a hollow cylindrical rotatable shaft 2201 that is fixed to the upper disc assembly 2230 and is further fixed to the portioning disc 2090 and the lower disc 2084 via structural element 2210, where the lower disc 2084 is coupled to the upper disc assembly 2230, which includes upper disc 2234 and top disc 2232, independently of the rotatable shaft 2201 via structural element 2211. Furthermore, the rotatable shaft 2201 is rotatably coupled to the fixed central shaft 2200 via upper and lower ball bearing assemblies 2205 and 2203.

It will be understood that at least the top disc 2232 of the upper disc assembly 2230 and/or the side housing 1022 may be considered to be part of the hopper 1020, in addition to and/or in alternative to being considered part of the rotatable section 1010.

Figure 22:
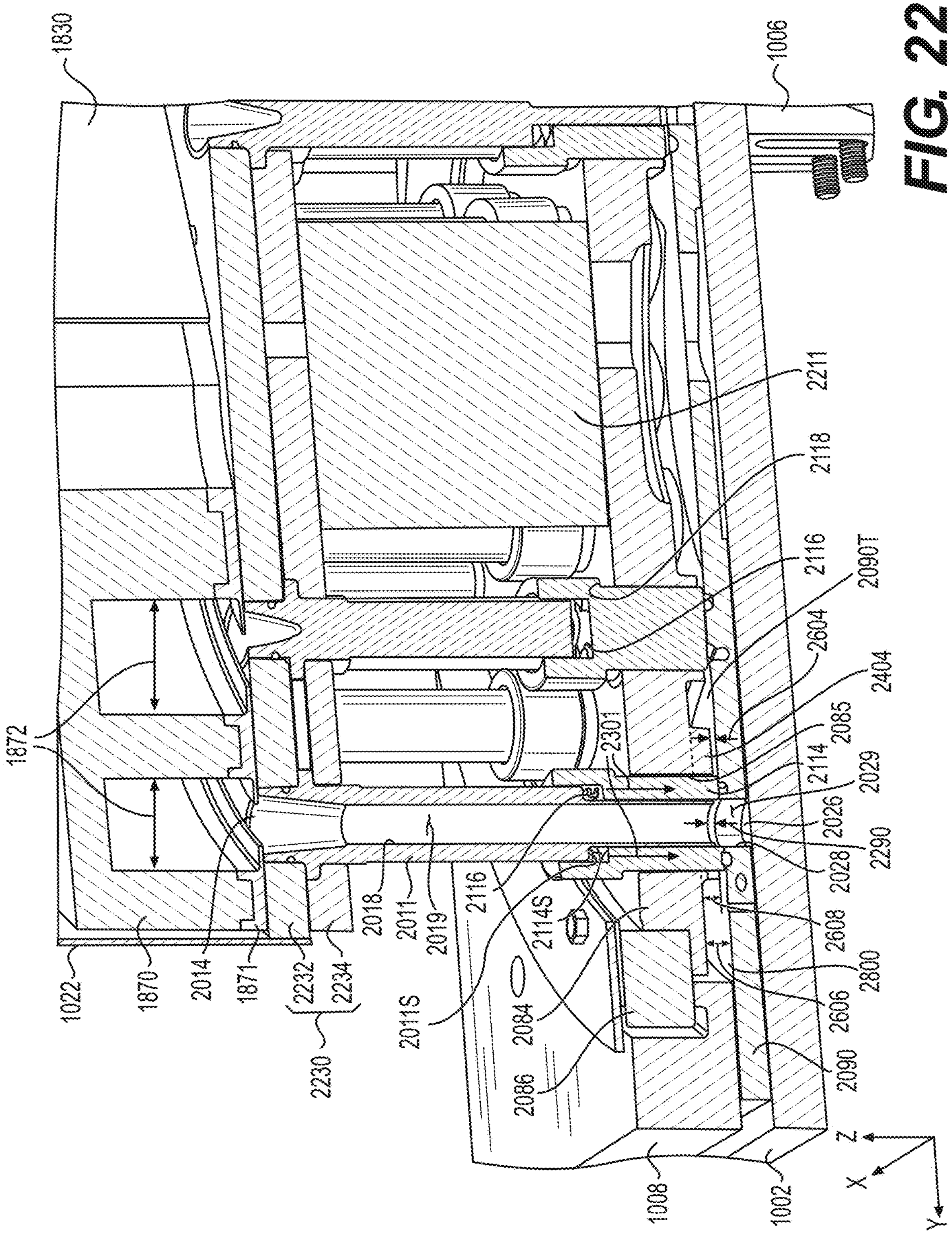
FIG. 22 is a three-dimensional cross-sectional view, along view line XXII-XXII', of the apparatus shown in FIG. 21, according to some example embodiments.

As shown in at least FIGS. 22-23, each sheath 2114 extends around a lower portion of a separate upper assembly 2011 and extends through a separate conduit 2085 extending through the lower disc 2084. Additionally, each spring assembly 2116 is between a separate upper assembly 2011 and a separate sheath 2114 and is configured to exert a spring force to push an upper surface 2114S of the sheath 2114 away from a lower surface 2011S of the upper assembly 2011, thereby pushing the sheath 2114 downwards 2301 in the Z-direction (the vertical direction) through the conduit 2085 towards the portioning disc 2090.

As shown in at least FIG. 22, the bottom end of the upper assembly 2011, and thus the bottom opening 2016 of the upper channel 2019, is spaced apart from the top opening 2024 of the lower assembly 2012 by a gap space 2290. As further shown in FIG. 22, in the absence of a countering upwards force, the spring assembly 2116 pushes the sheath 2114 downwards 2301 into contact with a top surface 2090T of the portioning disc 2090 to thereby enclose the gap space 2290 between the upper and lower channels 2019 and 2029 and thus establish a continuous channel that extends through the channel assembly 2010 and between the upper and lower channels 2019 and 2029 and thus includes the upper and lower channels 2019 and 2029.

As further shown in FIG. 23, when the channel assembly 2010 rotates around the longitudinal axis 702 such that an edge 2802 of the fixed cutting assembly 2800 extends transversely through the gap space 2290 between the upper and lower assemblies 2011 and 2012, a lower material portion in the channel assembly 2010 may be severed from an upper material portion in the channel assembly 2010 to produce a portioned instance, as described above with reference to FIGS. 5A-5D. The structure of the cutting assembly 2800 may push the sheath 2114 upwards 2302, countering the spring force exerted by the spring assembly 2116, and isolating the upper and lower channels 2019 and 2029 of the channel assembly 2010 from each other. The spring force applied by the spring assembly 2116 upon the sheath 2114 may push the sheath 2114 downwards against the top surface 2800T of the structure of the cutting assembly 2800 so as to maintain an enclosure of the bottom opening 2016 of the upper channel 2019 when the cutting assembly 2800 isolates the upper and lower channels 2019 and 2029 from each other. The cutting assembly 2800 may be in direct contact with the top surface 2090T of the portioning disc 2090 to seal the top opening 2024 of the lower channel 2029.

As shown in at least FIGS. 22 and 23, the sheath 2114 is configured to slide vertically, in the Z-direction, in relation to the upper assembly 2011, the lower disc 2084, and the portioning disc 2090 to ensure a seal of the bottom opening 2016 of the upper channel 2019 to isolate at least the upper channel 2019 from an exterior of the apparatus 1000 and thus to prevent loss of compressible material from the channel assembly 2010 via the gap space 2290.

Figure 27:
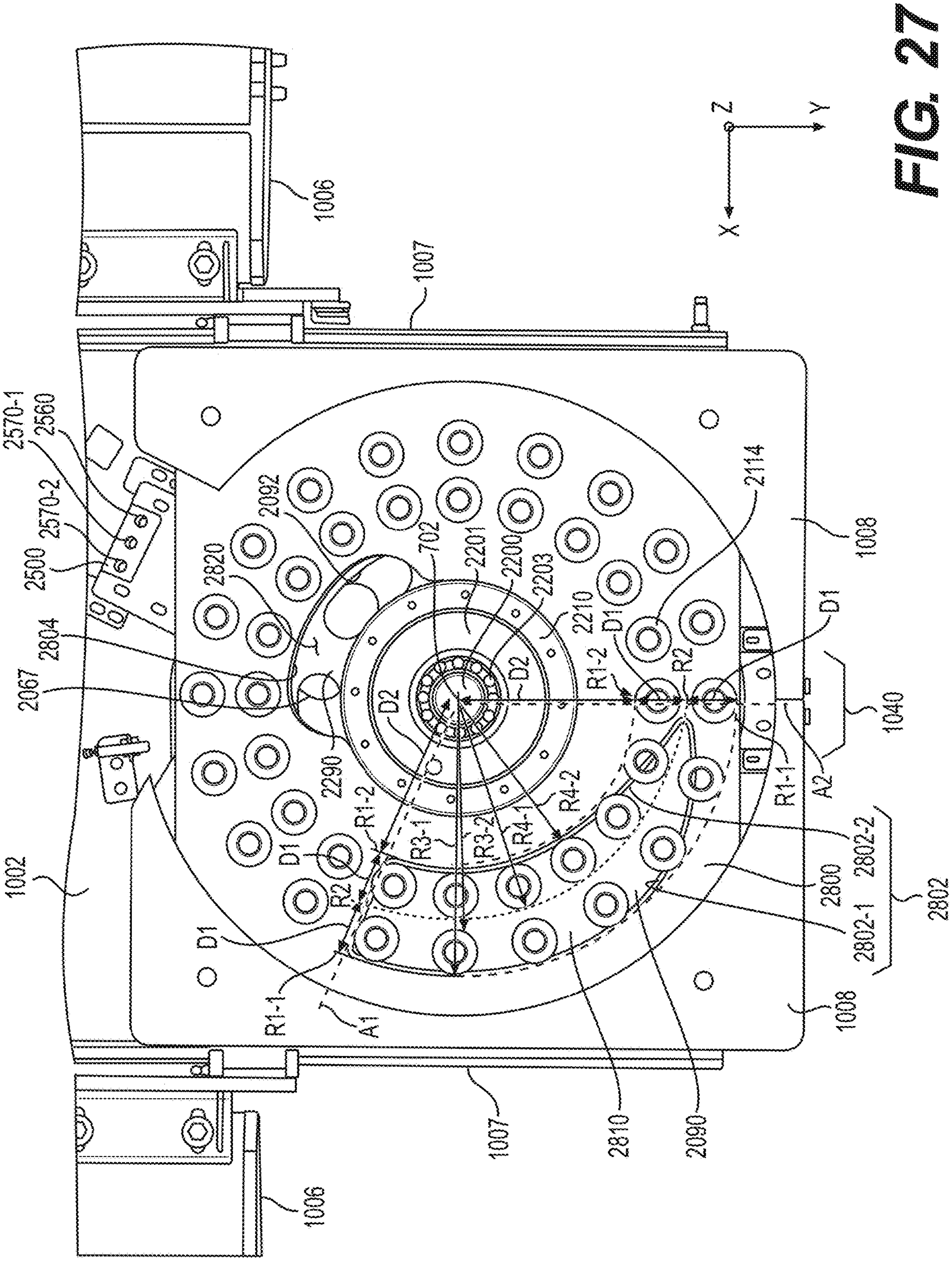
FIG. 27 is a plan cross-sectional view, along view line XXVI-XXVI', of the apparatus shown in FIG. 25, according to some example embodiments.

As shown in at least FIGS. 26-28, the apparatus 1000 includes a cutting assembly 2800 that includes a cutting edge 2802 that defines a window 2810 and a separate edge 2804 that defines both a central space 2830 through which elements of the apparatus 1000 may extend (e.g., structural elements 2210 and shafts 2200 and 2201) and a window 2820 that is configured to enable residue material to be supplied to a vacuum housing enclosure 3506 via at least a cleanout port 1067 extending through the plate 1002 (see FIGS. 27 and 32B-35).

As shown, the cutting assembly 2800 is fixed in place in relation to the plate 1002, and thus is fixed in place in relation to the rotatable section 1010. The cutting assembly 2800 is configured to be vertically located between the upper assemblies 2011 of the channel assemblies 2010 and the portioning disc 2090 that defines the lower assemblies 2012 of the channel assemblies 2010. As the rotatable section 1010, which includes the channel assemblies 2010, rotates around the longitudinal axis 702 and in relation to the cutting assembly 2800, the cutting assembly 2800 structure may extend transversely between the upper and lower assemblies 2011 and 2012 of a given channel assembly 2010 through the gap space 2290 thereof, where the sheath 2114 of the channel assembly 2010 is pushed against the cutting assembly 2800 structure to seal the bottom opening 2016 of the upper channel 2019 and the cutting assembly 2800 further seals the top opening 2024 of the lower channel 2029.

As shown in at least FIGS. 26 and 27 and as further shown in at least FIG. 22, as a given channel assembly 2010 is rotated through the region that includes the window 2810 of the cutting assembly 2800, such that the channel assembly 2010 is rotated into being vertically aligned with the window 2810, the cutting assembly 2800 structure is absent from the gap space 2290 between the upper and lower assemblies 2011 and 2012 of the channel assembly 2010. As a result, the spring assembly 2116 pushes the sheath 2114 downwards 2301 and into contact with the top surface 2090T of the portioning disc 2090 to seal the gap space 2290 and to establish the continuous channel that extends between the upper and lower channels 2019 and 2029 via the gap space 2290.

As further shown in at least FIGS. 26 and 27 and as further shown in at least FIG. 23, as the given channel assembly 2010 is further rotated back into a region that includes the cutting assembly structure 2800, such that the channel assembly 2010 is rotated to be gradually vertically aligned with one or more portions of the cutting edge 2802 of the cutting assembly 2800 and thus at least partially vertically mis-aligned with the window 2801, the cutting edge 2802 gradually extends transversely through the gap space 2290 as the channel assembly 2010 is rotated around the longitudinal axis 702. As the cutting edge 2802 extends transversely through the gap space 2290, the cutting assembly 2800 structure pushes the sheath 2114 upwards to enable the cutting assembly 2800 structure to extend transversely through the gap space 2290 and to isolate the upper and lower channels 2019 and 2029 of the channel assembly 2010 from each other.

Accordingly, it will be understood that the cutting assembly 2800 is configured to extend transversely through a gap space 2290 between an upper assembly 2011 and a lower assembly 2012 of a channel assembly 2010 based on rotation of the rotatable section 1010 to at least partially vertically align the channel assembly 2010 with the cutting edge 2802 of the cutting assembly 2800. As a result, a lower material portion in the channel assembly 2010 may be severed from an upper material portion in the channel assembly 2010 to produce a portioned instance, and the cutting assembly 2800 may isolate the lower channel 2029 of the channel assembly 2010 from the upper channel 2019 of the channel assembly 2010, as similarly described above with reference to at least FIGS. 5A-5D.

As shown in at least FIGS. 26 and 28, the cutting assembly 2800 may be configured to define a window 2810, bounded by edge 2802, that configures the edge 2802 to extend gradually through the gap space 2290 of a given channel assembly 2010 as the channel assembly 2010 rotates around the longitudinal axis 702 in relation to the fixed cutting assembly 2800 and gradually leaves vertical alignment with the window 2810. Additionally, as shown in FIGS. 26-28, the cutting assembly 2800 may be configured to define the window 2810 to have a particular shape so that, for each radially aligned set 3091 of channel assemblies 2010, opposing portions of the cutting edge 2802 extend gradually through the gap spaces 2290 of each channel assembly 2010 of the radially aligned set 3091 at the same rate. The window 2810 may be shaped so that the rate may be a linear rate, such that the window 2810 may be shaped to cause opposing portions of the cutting edge 2802 to extend through the gap spaces 2290 of both channel assemblies 2010 of a given radially aligned set 3091 of channel assemblies at a particular, constant rate as both channel assemblies 2010 gradually exit vertical alignment with the window 2810 at the same, constant rate. Based on the cutting assembly 2800 being configured to define a window 2810 shaped to cause the edge 2802 to extend gradually through the gap spaces 2290 of each radially aligned set 3091 of channel assemblies 2010 at a same rate, the cutting assembly 2800 may be configured to enable improved consistency of the cutting of compressible material held in each of the radially aligned channel assemblies 2010.

As shown in at least FIGS. 26-28, the cutting edge 2802 of the cutting assembly 2800 may include one or more portions 2802-1 and 2802-2, where each separate portion of the cutting edge 2802 extends in an arc around the longitudinal axis between two separate angular positions A1 and A2. In some example embodiments, the angular displacement between the separate angular positions may be about 108 degrees. As a result, one or more of the portions 2802-1 and 2802-2 of the cutting edge may extend along an arc having an angular displacement of about 108 degrees, but example embodiments are not limited thereto. The first and second portions 2802-1 and 2802-2 as shown in at least FIGS. 26-28 will be understood to be opposing first and second portions of the cutting edge 2802, as the cutting edge portions generally face towards each other.

As shown in at least FIGS. 27-28, the first portion 2802-1 of the cutting edge 2802 is configured to extend in an arc, between a first angular position A1 and a second angular position A2, such that the arc further curves from a first radial distance R1-1 from the longitudinal axis 702 at angular position A1 to a second radial distance R2 from the longitudinal axis 702 at angular position A2. As shown, the first radial distance R1-1 may be a distance D2+2(D1) from the longitudinal axis 702, and the second radial distance R2 may be a distance D2+D1 from the longitudinal axis 702. The first radial distance R1-1 may be distal from the longitudinal axis 702 in relation to the distal radial distance R3-1 of the channel assemblies 2010 of the outer pattern 3010 of channel assemblies. The second radial distance R2 may be proximate to the longitudinal axis 702 in relation to the proximate distance R3-2 of the channel assemblies 2010 of the outer pattern 3010 of channel assemblies. Accordingly, as a given channel assembly 2010 of the outer pattern 3010 is rotated around the longitudinal axis 702 and is rotated between angular positions A1 and A2, the first portion 2802-1 of the cutting edge 2802 progressively moves in relation to the given channel assembly 2010 in an inwards radial direction in a radial distance D1 from the first radial distance R1-1 to the second radial distance R2 and thus moves transversely through the channel assembly 2010 cross section via gap space 2290 thereof in a radial direction towards the longitudinal axis 702. The radial distance of the first portion 2802-1 of the cutting edge 2802 may change at a constant, linear rate between radial distances R1-1 and R2 between angular positions A1 and A2.

As shown in at least FIGS. 27-28, the second portion 2802-2 of the cutting edge 2802 is configured to extend in an arc, between a first angular position A1 and a second angular position A2, such that the arc further curves from a first radial distance R1-2 from the longitudinal axis 702 at angular position A1 to a second radial distance R2 from the longitudinal axis 702 at angular position A2. The first radial distance R1-2 may be proximate to the longitudinal axis 702 in relation to the proximate radial distance R4-2 of the channel assemblies 2010 of the inner pattern 3020 of channel assemblies. As shown, the first radial distance R1-2 may be a distance D2 from the longitudinal axis 702. The second radial distance R2 may be distal from the longitudinal axis 702 in relation to the distal distance R4-1 of the channel assemblies 2010 of the inner pattern 3020 of channel assemblies. Accordingly, as a given channel assembly 2010 of the inner pattern 3020 is rotated around the longitudinal axis 702 and is rotated between angular positions A1 and A2, the second portion 2802-2 of the cutting edge 2802 progressively moves in relation to the given channel assembly 2010 in an outwards radial direction in a radial distance D1 from the first radial distance R1-2 to the second radial distance R2 and thus moves transversely through the channel assembly 2010 cross section via gap space 2290 thereof in a radial direction away from the longitudinal axis 702. The radial distance of the second portion 2802-2 of the cutting edge 2802 may change at a constant, linear rate between radial distances R1-2 and R2 between angular positions A1 and A2.

As further shown in at least FIG. 27, the first and second portions 2802-1 and 2802-2 may extend from separate radial distances R1-1 and R1-2 from the longitudinal axis 702 at angular position A1 to meet at a same radial distance R2 from the longitudinal axis 702 at angular position A2, where the radial distance R2 is between the distal radial distance R4-1 of the channel assemblies 2010 of the inner pattern 3020 and the proximate radial distance R3-2 of the channel assemblies 2010 of the outer pattern 3010. As shown in at least FIG. 27, radial distance R2 is equidistant between radial distances R1-1 and R-2, such that the first and section portions 2802-1 and 2802-2 extend equal radial distances D1 while extending between angular positions A1 and A2. Additionally, the first and second portions 2802-1 and 2802-2 of the cutting edge 2802 may extend in opposite radial directions along the same radial distance D1 within a same angular displacement A1-A2. As a result, the first and second portions 2802-1 and 2802-2 of the cutting edge 2802 may extend transversely, in opposing radial directions, through the respective gap spaces 2290 of radially aligned channel assemblies 2010 at a same rate, as the radially aligned channel assemblies 2010 are moved along a same radial distance D1 between angular positions A1 and A2 as the rotatable section 1010 is rotated. Accordingly, the first and section portions 2802-1 and 2802-2 of the cutting edge 2802 may complete severing of material portions held in the respective, radially-aligned channel assemblies 2010 at a same, gradual rate.

As further shown in FIGS. 26-27, the first and second portions 2802-1 and 2802-2 of the cutting edge 2802 may extend in radial directions at a common rate, as a function of change in angular position, for a portion of the angular displacement between angular positions A1 and A2. As shown in FIG. 27, for example, the first and second portions 2802-1 and 2802-2 may be curved at respective ends proximate to angular positions A1 and A2. But, it will be understood that, in some example embodiments, the first and second portions 2802-1 and 2802-2 of the cutting edge 2802 may extend in radial directions at a common rate, as a function of change in angular position, for an entirety of the angular displacement between angular positions A1 and A2.

As shown in at least FIGS. 29A-32A, the portioning disc 2090 that defines the lower assemblies 2012 of the channel assemblies 2010 may be considered to include multiple radial disc portions 2091-1 to 2091-N ("N" being a positive integer), where each radial disc portion 2091 defines the lower assemblies 2012 of a separate radially aligned set 3091 of channel assemblies 2010. Each radial disc portion 2091 includes an outer lower assembly 2012-1 that is a lower assembly 2012 for a channel assembly 2010 of the outer pattern 3010 of channel assemblies 2010 and an inner lower assembly 2012-2 that is a lower assembly 2012 for a channel assembly 2010 of the inner pattern 3020 of channel assemblies 2010. The portioning disc 2090 may define a central port 2093 through which elements of the apparatus 1000 may extend (e.g., structural elements 2210 and shafts 2200 and 2201).

As further shown, each lower assembly 2012 includes an lower inner surface 2028 defining the lower channel 2029 and an outer, annular conduit assembly 2128 surrounding the lower channel 2029 of the lower assembly 2012. The outer, annular conduit assembly 2128 may define an annular conduit surrounding the lower channel 2029 of the channel assembly 2010. As further shown, each lower assembly 2012 includes one or more bridging conduit assemblies 2138 extending between the annular conduit assembly 2128 and the lower inner surface 2028 of the lower assembly 2012. Each bridging conduit assembly 2138 may define a bridging conduit extending between the annular conduit assembly 2128 and the lower inner surface 2028 of the channel assembly 2010. Each bridging conduit assembly 2138 may define a bridging conduit extending between the annular conduit assembly 2128 and a top end of the lower inner surface 2028 of the channel assembly 2010, for example as shown in at least FIGS. 29A-30A. In the example embodiments illustrated, each lower assembly 2012 includes four bridging conduit assemblies 2138 spaced equidistantly apart around the lower inner surface 2028 of each lower assembly 2012, but example embodiments are not limited thereto. As further shown, each radial disc portion 2091 includes a set of conduits 2096-1 and 2096-2 extending from respective ports 2095-1 and 2095-2 at the edge 2094 of the portioning disc 2090 to respective inlet ports 2097-1 and 2097-2 in the respective outer annular conduit assemblies 2128 of the inner and outer lower assemblies 2012-1 and 2012-2 of the given radial disc portion 2091. As shown, the conduits 2096-1 and 2096-2 are configured to intersect the outer annular conduit assemblies 2128 of separate lower assemblies 2012-1 and 2012-2 tangentially, but it will be understood that each conduit 2096-1 and 2096-2 may intersect a respective outer annular conduit assembly 2128 at any approach angle with respect to the inner surface of the outer annular conduit assembly 2128, including normally (e.g., a 90-degree angle approach angle between a conduit 2096 and the outer annular conduit assembly 2128).

As shown in at least FIGS. 29A-31B, the port 2095, conduit 2096, inlet port 2097, outer annular conduit assembly 2128, and bridging conduit assembly 2138 of a given lower assembly 2012 may define a conduit assembly 2190 of the lower assembly 2012 and thus a conduit assembly 2190 of the channel assembly 2010 in which the lower assembly 2012 is included. Accordingly, it will be understood that port 2095-1, conduit 2096-1, inlet port 2097-1, and the outer annular conduit assembly 2128 and bridging conduit assemblies 2138 of the lower assembly 2012-1 define a conduit assembly 2190-1 of the lower assembly 2012-1 and thus of the channel assembly 2010 that includes the lower assembly 2012-1, while port 2095-2, conduit 2096-2, inlet port 2097-2, and the outer annular conduit assembly 2128 and bridging conduit assemblies 2138 of the lower assembly 2012-2 define a conduit assembly 2190-2 of the lower assembly 2012-2 and thus of the channel assembly 2010 that includes the lower assembly 2012-2.

As shown in at least FIGS. 29A-31B, a conduit assembly 2190 of a channel assembly 2010 may be configured to direct a gas received into the conduit assembly 2190, for example from the discharge assembly 1040 as described herein, into the annular conduit 2129 defined by the annular conduit assembly 2128, and the one or more bridging conduit assemblies 2138 may be configured to direct the gas from the annular conduit 2129 defined by the annular conduit assembly 2128 to a top portion of the lower channel 2029 of the channel assembly 2010.

As shown in at least FIGS. 29A-29B, 31A-31B, and 32A, the apparatus 1000 includes a discharge assembly 1040 that is fixed in relation to the rotatable section 1010 and is configured to independently supply separate streams of pressurized gas, which may be a second gas that may be separate and/or different from the gases supplied to one or more of the enclosure structures 1860 and 1870, to the separate lower assemblies 2012-1 and 2012-2 of a given radially aligned set 3091 of channel assemblies 2010 that are included in a given radial disc portion 2091 of the portioning disc 2090, based on the portioning disc 2090 rotating around the longitudinal axis 702 to at least partially radially align the ports 2095-1 and 2095-2 of the given radial disc portion 2091 with separate, respective discharge ports 1144-1 and 1144-2 of the discharge assembly 1040. As shown, the discharge assembly 1040 may include separate gas supply ports 1141-1 and 1141-2 that are coupled to separate conduits 1143-1 and 1143-2 that extend through the gas discharge structure 1142 to separate, respective discharge ports 1144-1 to 1144-2. The discharge assembly 1040 may be configured to independently supply pressurized gas to the outer lower assembly 2012-1 of a given at least partially radially aligned radial disc portion 2091 of the portioning disc 2090 via at least partial radial alignment of the discharge port 1144-1 with the port 2095-1 of the given radial disc portion 2091. The discharge assembly 1040 is further configured to independently supply pressurized gas to the inner lower assembly 2012-2 of the given at least partially radially aligned radial disc portion 2091 of the portioning disc 2090 via at least partial radial alignment of the discharge port 1144-2 with the port 2095-2 of the given at least partially radially aligned radial disc portion 2091.

Figure 31A:
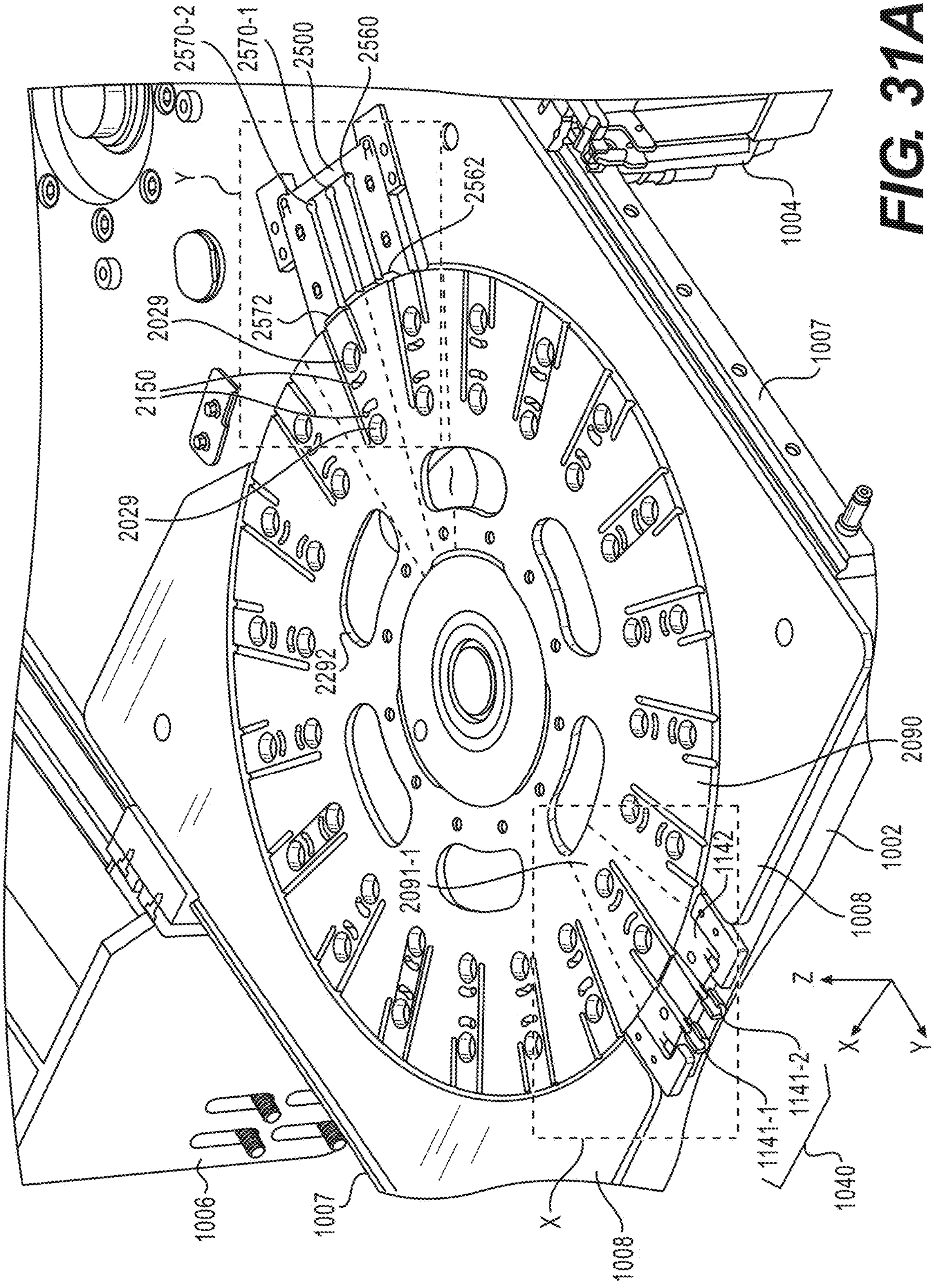
FIG. 31A is a three-dimensional cross-sectional view, along view line XXXIA-XXXIA', of the apparatus shown in FIG. 29A, according to some example embodiments.
Figure 31B:
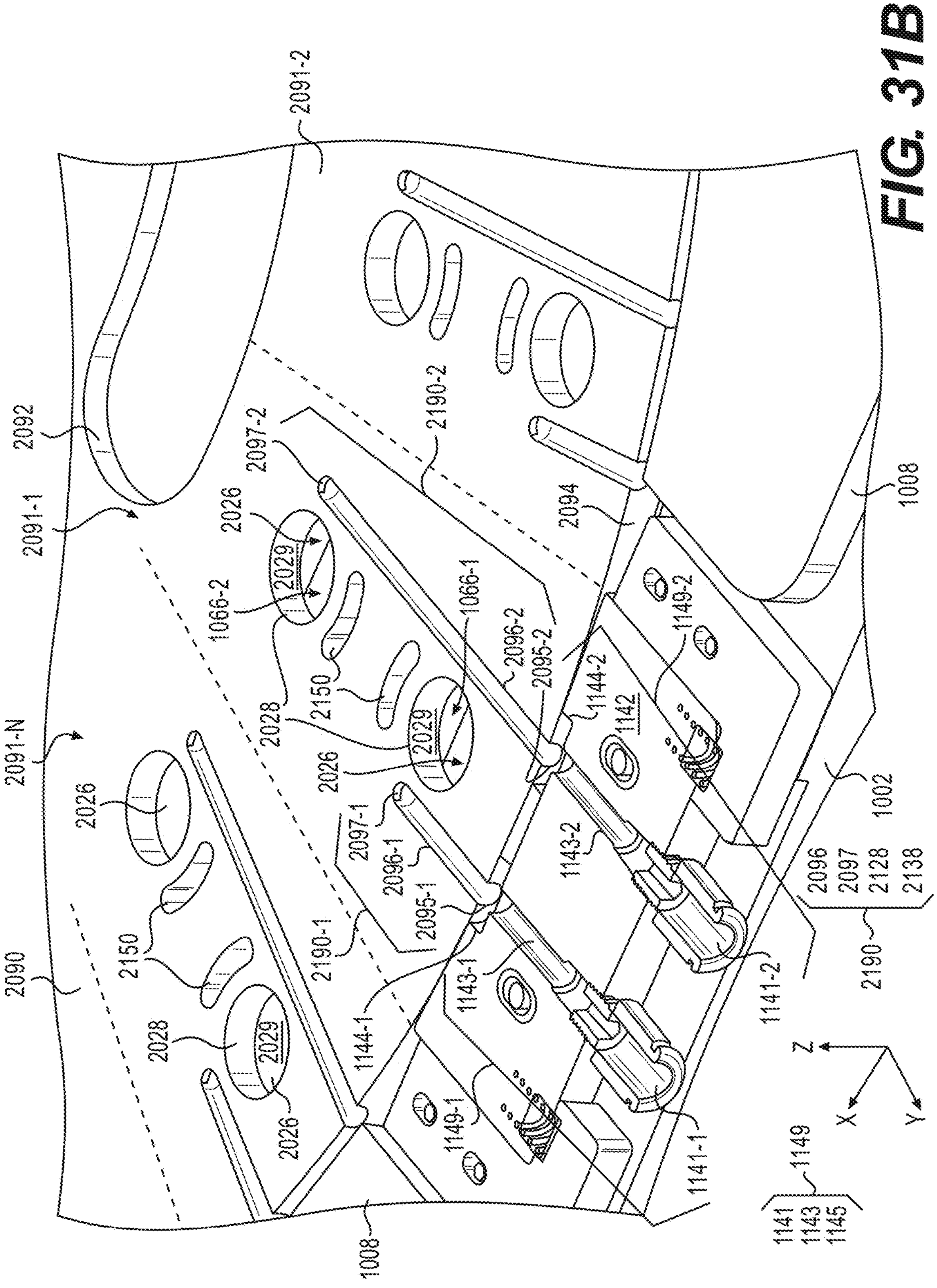
FIG. 31B is an expanded view of region X of FIG. 31A, according to some example embodiments.

As shown in at least FIG. 31B, each separate supply port 1141, conduit 1143, and discharge port 1144 of the discharge assembly 1040 may define a separate conduit assembly 1149 of the discharge assembly 1040. Accordingly, it will be understood that supply port 1141-1, conduit 1143-1, and discharge port 1144-1 of the discharge assembly 1040 define a conduit assembly 1149-1 of the discharge assembly 1040, while supply port 1141-2, conduit 1143-2, and discharge port 1144-2 of the discharge assembly 1040 define a conduit assembly 1149-2 of the discharge assembly 1040. Additionally, it will be understood that when a port 2095 of a conduit assembly 2190 of a channel assembly 2010 is at least partially radially aligned with a port 1144 of a conduit assembly 1149 of the discharge assembly 1040, the conduit assembly 2190 of the channel assembly 2010 is at least partially radially aligned with the conduit assembly 1149 of the discharge assembly 1040 such that a gas may be supplied by the discharge assembly to the lower assembly 2012 of the channel assembly 2010 via the at least partially radially aligned conduit assemblies 1149 and 2190 thereof.

Accordingly, as shown in at least FIGS. 31A-31B, it will be understood that the discharge assembly 1040 is configured to supply a gas into a lower channel 2012 of a channel assembly 2010 via a conduit assembly 2190 of the channel assembly 2010 and a conduit assembly 1149 of the discharge assembly to discharge a portioned instance held in a lower channel 2029 of the channel assembly 2010 through the bottom opening 2026 of the channel assembly 2010, based on rotation of the rotatable section 1010 to at least partially radially align the conduit assembly 2190 of the channel assembly 2010 with the conduit assembly 1149 of the discharge assembly.

In some example embodiments, the discharge assembly 1040 may include only a single conduit assembly 1149, instead of the two conduit assemblies 1149-1 and 1149-2 as shown in at least FIG. 31B.

As shown, discharge ports 1144-1 and 1144-2 may be wider than ports 2095-1 and 2095-2 of the portioning disc 2090, so that the conduit assemblies 2190 of the channel assemblies 2010 may be at least partially aligned with corresponding conduit assemblies 1149 of the discharge assembly 1040 even when the ports 2095-1 and 2095-2 are not radially aligned with the respective conduits 1143-1 and 1143-2 of the discharge assembly 1040, and further, alternatively or in addition, so that gas may be supplied continuously to the lower assemblies 2012 of the given radial disc portion 2091 while the radial disc portion 2091 is rotated through an arc that is longer than the diameter of one of the ports 2095-1 and 2095-2.

While the example embodiments illustrate that the discharge assembly 1040 includes separate gas supply ports 1141-1 and 1141-2 that supply gas to the separate discharge ports 1144-1 and 1144-2 via separate, independent and non-intersecting conduits 1143-1 and 1143-2, it will be understood that, in some example embodiments, the discharge assembly 1040 may include an individual gas supply port that is configured to supply pressurized gas to both discharge ports 1144-1 and 1144-2 simultaneously.

In some example embodiments, the apparatus 1000 may be configured to supply a continuous stream of pressurized gas to the conduits 1143-1 and 1143-2 and the discharge ports 1144-1 and 1144-2 via the separate gas supply ports 1141-1 and 1141-2. In some example embodiments, the apparatus 1000 may be configured to supply separate, independent streams of pressurized gas to the separate conduits 1143-1 and 1143-2 and the discharge ports 1144-1 and 1144-2 via the separate gas supply ports 1141-1 and 1141-2. But, example embodiments are not limited thereto, and the apparatus 1000 may supply pressurized gas to each of the gas supply ports 1141-1 and 1141-2 from a common gas supply conduit. In some example embodiments, the apparatus 1000 may be configured to supply separate pulses of pressurized gas to each separate discharge port 1144-1 and 1144-2 via the separate gas supply ports 1141-1 and 1141-2 and conduits 1143-1 and 1143-2, where each separate pulse of pressurized gas is timed to arrive at the respective discharge port 1144-1 or 1144-2 concurrently with the rotatable section 1010 rotating to at least partially radially align a corresponding port 1095-1 or 1095-2 with the respective discharge port 1144-1 or 1144-2.

As shown in at least FIGS. 29A-29B, 31A-31B, and 32A-32B, the plate 1002 may have separate outlet conduits 1066-1 and 1066-2 that extend through the plate 1002 and are positioned to be at least partially vertically aligned with separate bottom openings 2026 of separate lower channels 2029 of separate, respective lower assemblies 2012-1 and 2012-2 of a given radially aligned set 3091 of channel assemblies 2010, based on a given radial disc portion 2091 of the portioning disc 2090 that includes the given radially aligned set 3091 being at least partially radially aligned with the discharge assembly 1040. This exposes the bottom openings 2026 to an exterior of the apparatus 1000 by the outlet conduits 1066-1 and 1066-2 and lower material portions of compressible material held in the lower assemblies 2012-1 and 2012-2 of the given radially aligned set 3091 may be discharged therefrom based on pressurized gas being supplied to the lower assemblies 2012-1 and 2012-2 via the at least partially radially aligned discharge assembly 1040 via at least discharge ports 1144-1 and 1144-2 and conduits 1096-1 and 1096-2.

As shown in at least FIG. 29A-29B, 31A-32B, each lower assembly 2012 of each channel assembly 2010 may include a cleanout port 2150, referred to herein as a cleanout port of the channel assembly 2010, that extends from the annular conduit assembly 2128 to an exterior of the rotatable section 1010, for example through the portioning disc 2090 between the outer annular conduit assembly 2128 of the given lower assembly 2012 and a bottom surface 2090B of the portioning disc 2090. As shown in at least FIG. 32B, the outlet conduits 1066-1 and 1066-2 are configured to cover the bottom openings of the cleanout ports 2150 of the lower assemblies 2012-1 and 2012-2 of a given radial disc portion 2091 of the portion disc 2090 that is at least partially vertically aligned with the outlet conduits 1066-1 and 1066-2 based on being at least partially radially aligned with the discharge assembly 1040, and to only expose the bottom openings 2026 of the lower channels 2029 of said lower assemblies 2012-1 and 2012-2. As a result, an entirety of gas supplied to each lower assembly 2012-1 and 2012-2 of the given radial disc portion 2091 from the discharge assembly 1040 may be directed into the lower channel 2029 to cause an instance of compressible material held therein to be discharged from the respective lower channel 2029 via the bottom opening 2026 thereof that is exposed by an outlet conduit of the outlet conduits 1066-1 and 1066-2.

It will be understood that, in some example embodiments, a cleanout port 2150 may be absent from one or more channel assemblies 2010 of the apparatus 1000.

Accordingly, it will be understood that the apparatus 1000 may include at least one outlet conduit 1066-1 and/or 1066-2 that is configured to expose only the bottom opening 2026 of a channel assembly 2010, such that the cleanout port 2150 of the channel assembly 2010 remains isolated from an exterior of the apparatus 1000, based on the rotatable section 1010 rotating to at least partially align the conduit assembly 2190 of the channel assembly 2010 with a conduit assembly 1149 discharge assembly 1040.

In view of at least the above, the discharge assembly 1040, which will be understood to be fixed in relation to the rotatable section, may be configured to supply a second gas (which may be different from the first gas supplied to at least the enclosure structure 1870) into a lower channel 2029 of a channel assembly 2010. This may cause a portioned instance of material held in the lower channel 2029 to be discharged through the bottom opening 2026 of the channel assembly 2010 based on directing the second gas through a conduit assembly 2190 (e.g., one or more conduits 2096, inlet ports 2097, outer annular conduit assemblies 2128, one or more bridging conduit assemblies 2138, a sub-combination thereof, or a combination thereof) of the lower assembly 2012 of a channel assembly 2010 to impinge on a lower face 2800B of the cutting assembly 2800 in the lower channel 2029 of the conduit assembly 2010 in response to rotation of the rotatable section to at least partially radially align the conduit assembly 2190 with at least a portion of the discharge assembly 1040, for example as described with regard to discharge assembly 240, conduit assembly 200, and lower material portion 524 with regard to FIGS. 5A-5D. In some example embodiments, one or more lower assemblies 2012 includes a conduit assembly 2190 that is configured to direct gas from the discharge assembly 1040 to discharge a portioned instance held in the lower channel 2029 through the bottom opening 2026 of the lower assembly 2012 without directing the gas to imping on a lower face 2800B of the cutting assembly 2800.

As shown in FIGS. 17-35, the apparatus 1000 includes a cleanout assembly 2500 that is configured to supply two separate fluids to the lower assemblies 2012-1 and 2012-2 of each given radial disc portion 2091 as the portioning disc 2090 is rotated around longitudinal axis 702 to at least partially radially align the given radial disc portion 2091 with the cleanout assembly 2500, in order to clean out remaining compressible material residue from the lower assemblies 2012 after a portion of compressible material is discharged from each lower assembly 2012 based on gas supplied thereto by the discharge assembly 1040.

Figure 31C:
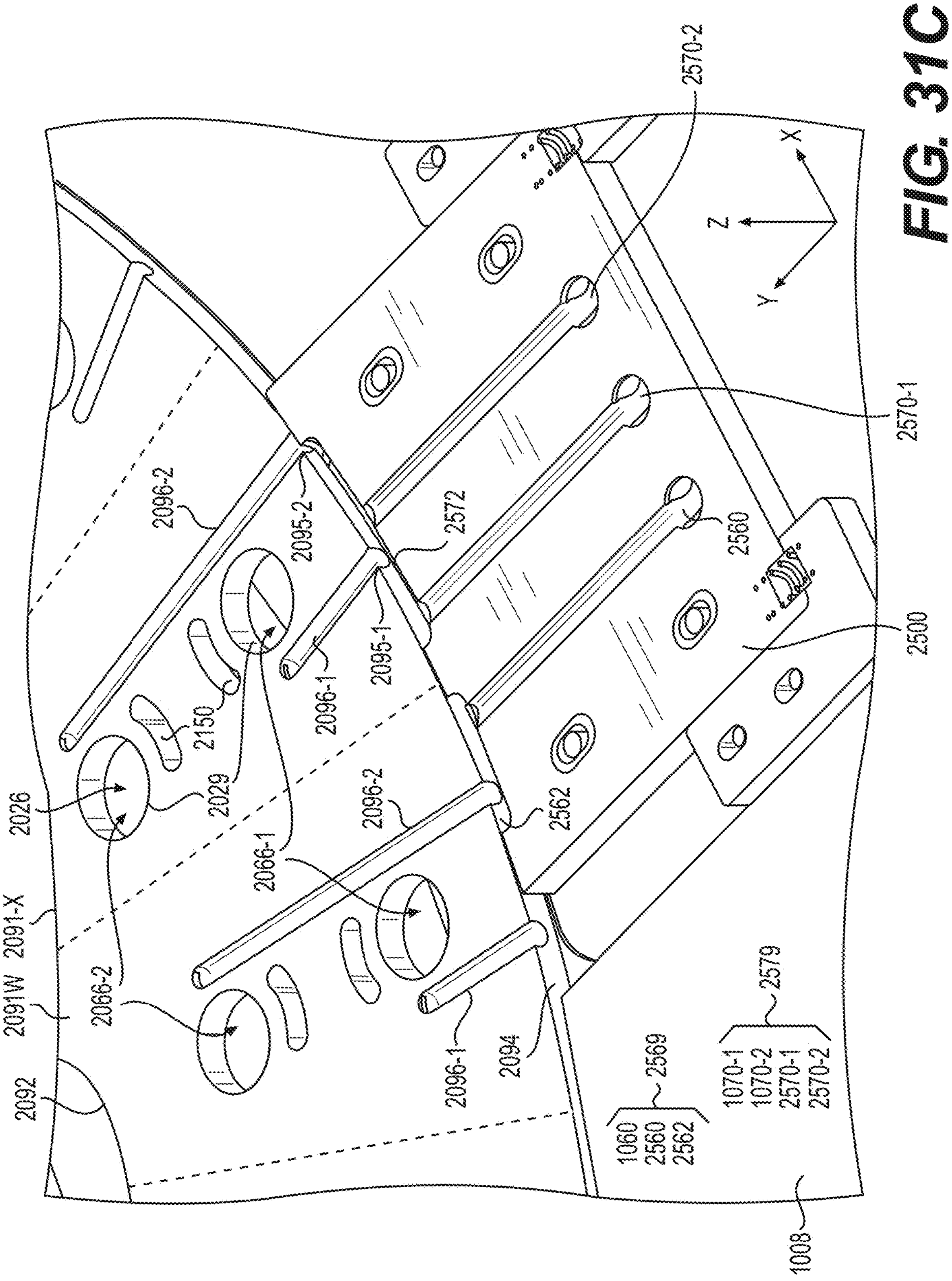
FIG. 31C is an expanded view of region Y of FIG. 31A, according to some example embodiments.

As shown in at least FIGS. 17, 31A, 31C, and 32A, the cleanout assembly 2500 includes conduits 2560 and 2570-1 and 2570-2, where conduit 2560 is coupled to fluid supply port 1060 and the conduits 2570-1 and 2570-2 are coupled to separate, respective fluid supply ports 1070-1 and 1070-2. Fluid supply port 1060 may be configured to supply a first fluid, which may be a liquid such as water but could alternatively be a gas, to the conduit 2560. The first fluid may be supplied through the conduit 2560 to an outlet 2562 and further to a lower assembly 2012 via a conduit 2096 and port 2095 that are at least partially radially aligned with the outlet 2562 and thus brought into fluid communication with the outlet 2562 as the portioning disc 2090 is rotated around the longitudinal axis 702. For example, as shown in FIG. 31C, a port 2095-2 of an inner lower assembly 2012-2 of radial disc portion 2091-W is at least partially radially aligned with the outlet 2562 of the cleanout assembly 2500, such that the cleanout assembly 2500 may supply the first fluid into the outer annular conduit assembly 2128 and lower channel 2029 of the inner lower assembly 2012-2 via the conduit 2096-2 and port 2095-2 thereof that are at least partially radially aligned with outlet 2562.

In some example embodiments, the apparatus 1000 may be configured to supply a continuous stream of the first fluid to the conduit 2560 and outlet 2562 via the fluid supply port 1060. In some example embodiments, the apparatus 1000 may be configured to supply separate pulses of the first fluid to the outlet 2562 via the conduit 2560 and fluid supply port 1060. Each separate pulse of the first fluid may be timed to arrive at the outlet 2562 concurrently with the rotatable section 1010 rotating to at least partially radially align a corresponding port 1095-1 or 1095-2 with the outlet 2562.

Fluid supply ports 1070-1 and 1070-2 may be configured to supply a second fluid, which may be different from the first fluid and may be a pressurized gas such as air but could alternatively be a liquid, to the conduits 2570-1 and 2570-2, where the second fluid may be supplied through the conduits 2570-1 and 2570-2 to a common outlet 2572 and further to one or more lower assemblies 2012 that are brought into fluid communication with the outlet 2572 via respective conduits 2096 and ports 2095 thereof that are at least partially aligned with the outlet 2572, as shown in at least FIG. 31C, as the portioning disc 2090 is rotated in direction R around the longitudinal axis 702. For example, as shown in FIG. 31C, both the inner and outer lower assemblies 2012-1 and 2012-2 of radial disc portion 2091-X are in fluid communication with the conduits 2570-1 and 2570-2 of the cleanout assembly 2500, based on the conduits 2096-1 and 2096-2 and ports 2095-1 and 2095-2 thereof being at least partially radially aligned with the outlet 2572. As a result, the cleanout assembly 2500 may supply the second fluid into the outer annular conduit assembly 2128 and lower channel 2029 of both the inner and outer lower assemblies 2012-2 and 2012-2 defined in the radial disc portion 2091-X via the conduits 2096-2 and 2096-1 thereof that are at least partially radially aligned with outlet 2572.

In some example embodiments, the apparatus 1000 may be configured to supply a continuous stream of the second fluid to the conduits 2570-1 and 2570-2 and the common outlet 2572 via the separate supply ports 1070-1 and 1070-2. In some example embodiments, the apparatus 1000 may be configured to supply separate, independent streams of the second fluid to the separate conduits 2570-1 and 2570-2 via the separate supply ports 1070-1 and 1070-2. But, example embodiments are not limited thereto, and the apparatus 1000 may supply the second fluid to each of the supply ports 1070-1 and 1070-2 from a common supply conduit. In some example embodiments, the apparatus 1000 may be configured to supply separate pulses of the second fluid to each separate conduit 2570-1 and 2570-2 via the separate supply ports 1070-1 and 1070-2. Rach separate pulse of the second fluid may be timed to arrive at the common outlet 2572 concurrently with the rotatable section 1010 rotating to at least partially radially align one or more ports 1095-1 and 1095-2 with the common outlet 2572.

As shown in at least FIG. 31C, the supply port 1060, conduit 2560, and outlet 2562 of the cleanout assembly 2500 may define a first conduit assembly 2569 of the cleanout assembly 2500. As further shown in at least FIG. 31C, the supply ports 1070-1 and 1070-2, the conduits 2570-1 and 2570-2, and the outlet 2572 may define a second conduit assembly 2579 of the cleanout assembly 2500. Additionally, it will be understood that when a port 2095 of a conduit assembly 2190 of a channel assembly 2010 is at least partially radially aligned with the outlet 2562 of the cleanout assembly 2500, the conduit assembly 2190 of the channel assembly 2010 is at least partially radially aligned with the first conduit assembly 2569 of the cleanout assembly 2500 such that the first fluid may be supplied by the cleanout assembly 2500 to the lower assembly 2012 of the channel assembly 2010 via the at least partially radially aligned conduit assemblies 2569 and 2190 thereof. Furthermore, it will be understood that when a port 2095 of a conduit assembly 2190 of a channel assembly 2010 is at least partially radially aligned with the outlet 2572 of the cleanout assembly 2500, the conduit assembly 2190 of the channel assembly 2010 is at least partially radially aligned with the second conduit assembly 2579 of the cleanout assembly 2500 such that the second fluid may be supplied by the cleanout assembly 2500 to the lower assembly 2012 of the channel assembly 2010 via the at least partially radially aligned conduit assemblies 2579 and 2190 thereof.

Figure 32A:
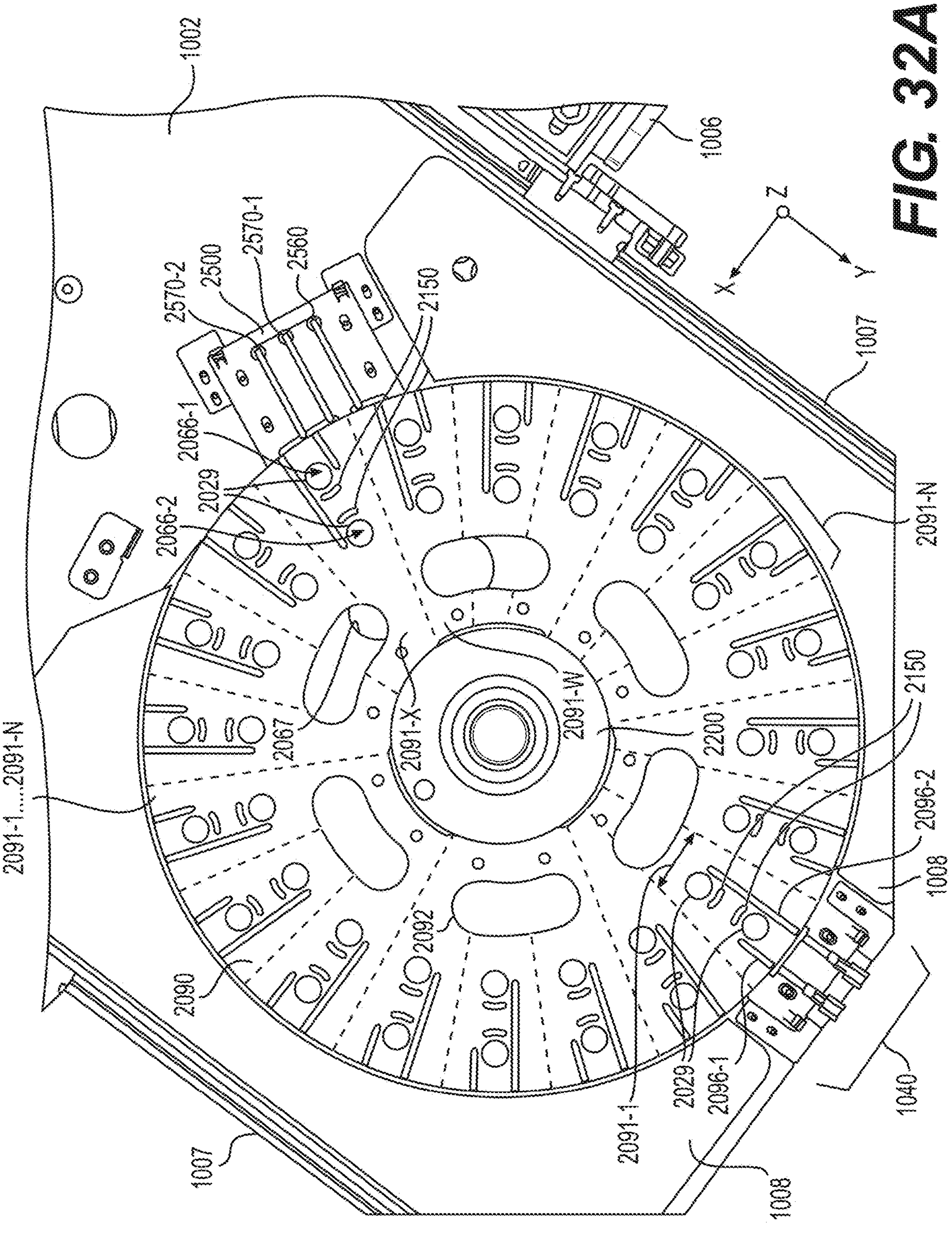
FIG. 32A is a plan cross-sectional view, along view line XXXIA-XXXIA', of the apparatus shown in FIG. 29A, according to some example embodiments.

Accordingly, as shown in at least FIGS. 31A, 31C, and 32A, it will be understood that the cleanout assembly 2500 is configured to supply at least one fluid into a lower channel 2012 of a channel assembly 2010 via a conduit assembly 2190 of the channel assembly 2010 and a conduit assembly 2569 and/or 2579 of the cleanout assembly 2500, based on rotation of the rotatable section 1010 to at least partially radially mis-align the conduit assembly 2190 of the channel assembly 2010 with the conduit assembly 1149 of the discharge assembly and to at least partially radially align the conduit assembly 2190 of the channel assembly 2010 with the conduit assembly 2569 and/or 2579 of the cleanout assembly 2500.

In some example embodiments, the cleanout assembly 2500 may include only a single conduit assembly of the conduit assemblies 2569 and 2579, instead of the two conduit assemblies 2569 and 2579 as shown in at least FIG. 31C.

As shown in at least FIGS. 31A and 31C, the portioning disc 2090 may be rotated such that a given conduit assembly 2190 of a given lower assembly 2012 of a given radial disc portion 2091 of the portioning disc 2090 may be first rotated to be radially mis-aligned with the discharge assembly 1040 and subsequently rotated to be at least partially radially aligned with the first conduit assembly 2569 of the cleanout assembly 2500, so that the lower assembly 2012 is in fluid communication with outlet 2562. The portioning disc 2090 may be subsequently rotated to radially mis-align the conduit assembly 2190 of the channel assembly 2010 with the first conduit assembly 2569 and to at least partially radially align the conduit assembly 2190 of the channel assembly 2010 with the second conduit assembly 2579. As a result, the lower assembly 2012 may be in fluid communication with outlet 2572 of the cleanout assembly 2500, so that the first fluid is initially supplied into the given lower assembly 2012 and then the second fluid is subsequently supplied into the given lower channel assembly 2012 as the portioning disc 2090 rotates around the longitudinal axis 702. The rotation of the portioning disc 2090 between radial alignment with a conduit assembly 1149 of the discharge assembly 1040, radial alignment with a first conduit assembly 2569 of the cleanout assembly 2500, and radial alignment with a second conduit assembly 2579 of the cleanout assembly 2500 may be a continuous rotation of the portioning disc 2090 such that the rate of rotation of the portioning disc 2090 is not altered and/or stopped.

In some example embodiments, one or more of the conduits 2560 and 2570-1 and 2570-2 may be omitted such that the cleanout assembly 2500 is configured to supply only a single fluid, of the first fluid or the second fluid, to the lower assemblies 2012 of one or more radial disc portions 2091 of the portioning disc 2090, based on the portioning disc 2090 being rotated around the longitudinal axis 702 to at least partially align one or more conduit assemblies 2190 of one or more channel assemblies 2010 with one or more conduit assemblies 2569 and/or 2579 of the cleanout assembly 2500.

As shown in at least FIG. 31C, the outlet 2562 is configured to radially align with a single port of the ports 2095-1 and 2095-2 of a given radial disc portion 2091, as the length of the outlet 2562 may be less than the distance between adjacent ports 2095-1 and 2095-2, but example embodiments are not limited thereto and the outlet 2562 may be configured, in some example embodiments, to be at least partially radially aligned with multiple ports of the ports 2095-1 and 2095-2 of the portioning disc 2090 simultaneously as the rotatable section 1010 rotates around the longitudinal axis 702. As further shown in at least FIG. 31C, the outlet 2572 is configured to simultaneously at least partially radially align with multiple ports 2095-1 and 2095-2 of one or more radial disc portions 2091, as the length of the outlet 2572 may be greater than the distance between adjacent ports 2095-1 and 2095-2. For example, as shown in at least FIG. 31C, the cleanout assembly 2500 may be configured to supply a fluid, of the first and/or second fluid, to a plurality of channel assemblies 2010 simultaneously, based on simultaneous radial alignment of the conduit assemblies 2190 of the channel assemblies 2010 with a conduit assembly 2569 and/or 2579 of the cleanout assembly 2500. It will be understood that the outlet 2572 may be configured, in some example embodiments, to be at least partially radially aligned with a single port of the ports 2095-1 and 2095-2 of the portioning disc 2090 as the rotatable section 1010 rotates around the longitudinal axis 702. In some example embodiments, port 1070-2 and conduit 2570-2 may be omitted from the cleanout assembly 2500.

Figure 32B:
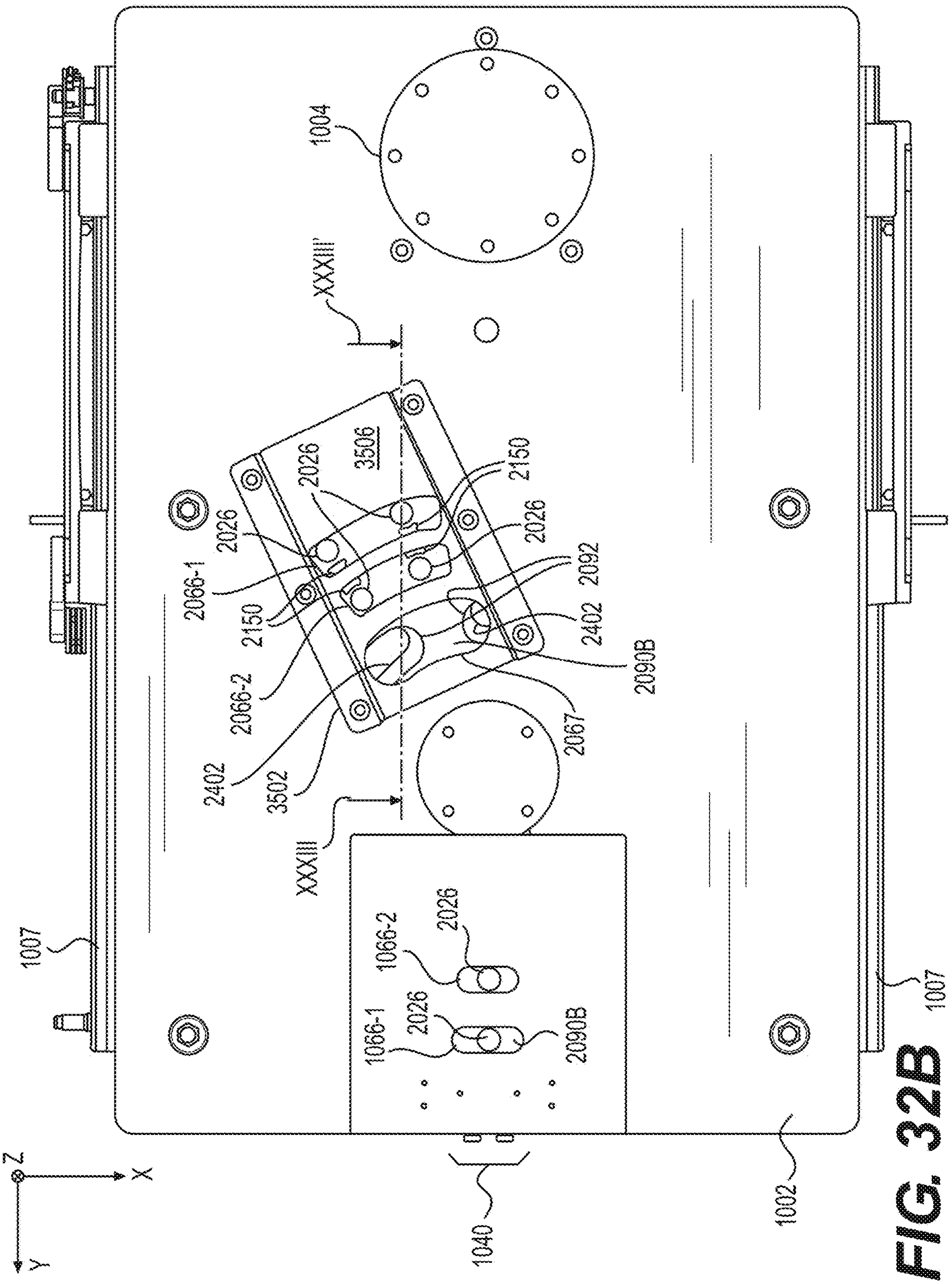
FIG. 32B is a plan cross-sectional view, along view line XXXIIB-XXXIIB', of the apparatus shown in FIG. 18A, according to some example embodiments.
Figure 33:
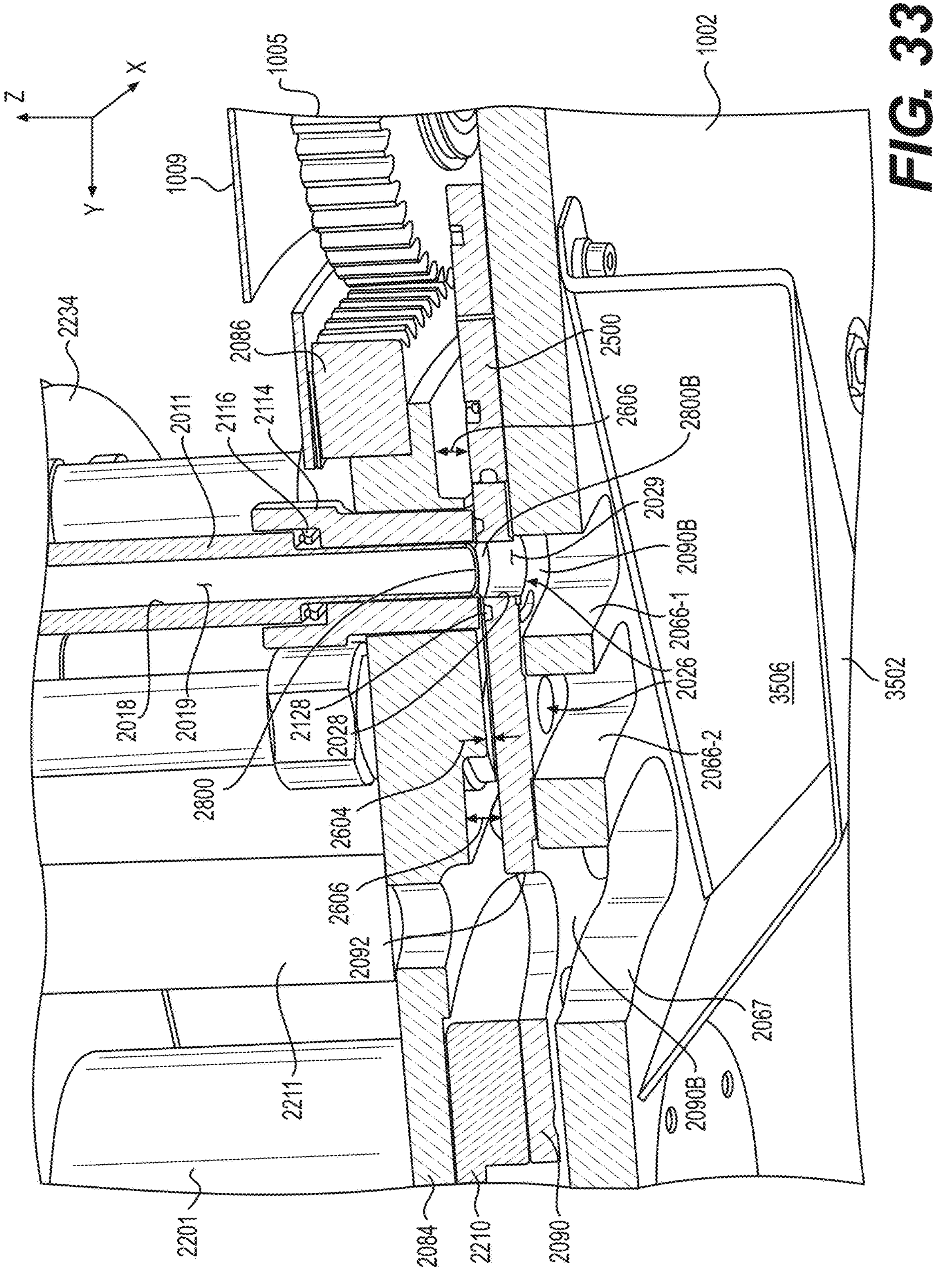
FIG. 33 is a three-dimensional cross-sectional view, along view line XXXIII-XXXIII', of the apparatus shown in FIG. 32B, according to some example embodiments.

As shown in at least FIGS. 32A and 32B, the plate 1002 may include cleanout conduits 2066-1 and 2066-2 that extend through the plate 1002 to be open to an enclosure 3506 of a vacuum housing 3502 that further includes a vacuum conduit 3504 that is configured to be coupled with a vacuum pump (not shown). The cleanout conduits 2066-1 and 2066-2 are positioned to be at least partially vertically aligned with separate lower assemblies 2012-1 and 2012-2 of a given radially aligned set 3091 of channel assemblies 2010. The separate lower assemblies 2012-1 and 2012-2 may be included in a common radial disc portion 2091 of the portioning disc 2090 that is at least partially radially aligned with the cleanout assembly 2500. As a result, the bottom openings 2026 of the lower channels 2029 of the given radial disc portion 2091 may be exposed to the vacuum housing enclosure 3506 via the cleanout conduits 2066-1 and 2066-2. The first and second fluids that are supplied into the lower assemblies 2012-1 an 2012-2 of the radial disc portion 2091 that is at least partially radially aligned with the cleanout assembly 2500 may be drawn out of the lower assemblies 2012-1 and 2012-2 via the exposed bottom openings 2026 thereof and through respective cleanout conduits 2066-1 and 2066-2 and into the enclosure 3506, to be further drawn towards a vacuum pump via the vacuum conduit 2504 that is open to the enclosure 3506.

As shown, the cleanout conduits 2066-1 and 2066-2 are configured to expose both the bottom openings 2026 of the lower channels 2029 of a given radially aligned set 3091 of channel assemblies 2010 that are at least partially radially aligned with the cleanout assembly 2500, such that the radial disc portion 2091 that includes the lower assemblies 2012 of the radially aligned set 3091 is at least partially aligned with the cleanout assembly 2500. As further shown, the cleanout conduits 2066-1 and 2066-2 are each further configured to expose the respective cleanout ports 2150 of the lower assemblies 2012-1 and 2012-2 included in the radial disc portion 2091 that is at least partially radially aligned with the cleanout assembly 2500. As a result, the first and second fluids supplied into at least the outer annular conduit assemblies 2128 of the lower assemblies 2012-1 and 2012-2 may be drawn out of the respective outer annular conduit assembly 2128 and into the vacuum housing enclosure 3506 via the respective exposed cleanout ports 2150 which provide an alternative pathway for the first and second fluids to pass through to be drawn into the vacuum housing enclosure 3506 via the cleanout conduits 2066-1 and 2066-2.

Accordingly, it will be understood the apparatus 1000 may include a cleanout conduit 2066-1 and/or 2066-2 that is configured to expose both the bottom opening 2026 and the cleanout port 2150 of a channel assembly based on the rotatable section 1010 rotating to at least partially align the conduit assembly 2190 of the channel assembly 2010 with at least one conduit assembly 2569 and/or 2579 of the cleanout assembly 2500.

It will be understood that the first and second fluids that are supplied into the lower assemblies 2012-1 and 2012-2 included in the radial disc portion 2091 that is at least partially radially aligned with the cleanout assembly 2500 may be drawn out of the lower assemblies 2012-1 and 2012-2 via exposed bottom openings 2026 and cleanout ports 2150 thereof based on a vacuum pump coupled to the vacuum conduit 3504 causing the pressure within at least the enclosure 3506 to be reduced relative to the ambient atmospheric pressure, thereby establishing a pressure gradient that induces the first and second fluids to be drawn out of the lower assemblies 2012 and 2012-2 and into the enclosure 3506 via the exposed bottom openings 2026 and cleanout ports 2150 thereof.

As further shown in at least FIGS. 32A-32B, the plate 1002 may include a cleanout conduit 2067 that extends through the plate 1002 to be exposed to the vacuum housing enclosure 3506. Additionally, the cutting assembly 2800 edge 2804 defines a window 2820 that is configured to be vertically aligned with the cleanout conduit 2067. As further shown in FIGS. 17-35, the portioning disc 2090 includes cleanout ports 2092 that are spaced around the longitudinal axis 702 such that the portioning disc 2090 is configured to expose one or more ports 2092 to the vacuum housing enclosure 3506 via at least partial vertical alignment of the cleanout conduit 2067 with one or more cleanout ports 2092 as the portioning disc 2090 rotates around the longitudinal axis 702. For example, as shown in FIGS. 32A and 32B, two separate cleanout ports 2092 of the portioning disc 2090 are partially vertically aligned with the cleanout conduit 2067 based on rotation of the portioning disc 2090 around the longitudinal axis 702, such that residue and/or one or more fluids may be drawn through the two separate cleanout ports 2092 and into the enclosure 3506 via the cleanout conduit 2067.

As further shown in FIGS. 17-35, the lower disc 2084 may include cleanout ports 2402 that are spaced around the longitudinal axis 702, where the cleanout ports 2402 of the lower disc 2084 are vertically aligned with the cleanout ports 2092 of the portioning disc 2090. Accordingly, the lower disc 2084 is configured to expose one or more ports 2402 to the vacuum housing enclosure 3506 via at least partial vertical alignment of the cleanout conduit 2067 with one or more cleanout ports 2402 and vertically-aligned cleanout ports 2092 as the rotatable section 1010 rotates around the longitudinal axis 702. For example, as shown at least FIG. 32B, two separate cleanout ports 2402 of the lower disc 2084 are partially vertically aligned with the cleanout conduit 2067 based on rotation of the rotatable section 1010 around the longitudinal axis 702, such that residue and/or one or more fluids may be drawn through the two separate cleanout ports 2402 and into the enclosure 3506 via the cleanout conduit 2067 and the radially aligned cleanout ports 2092.

Figure 34:
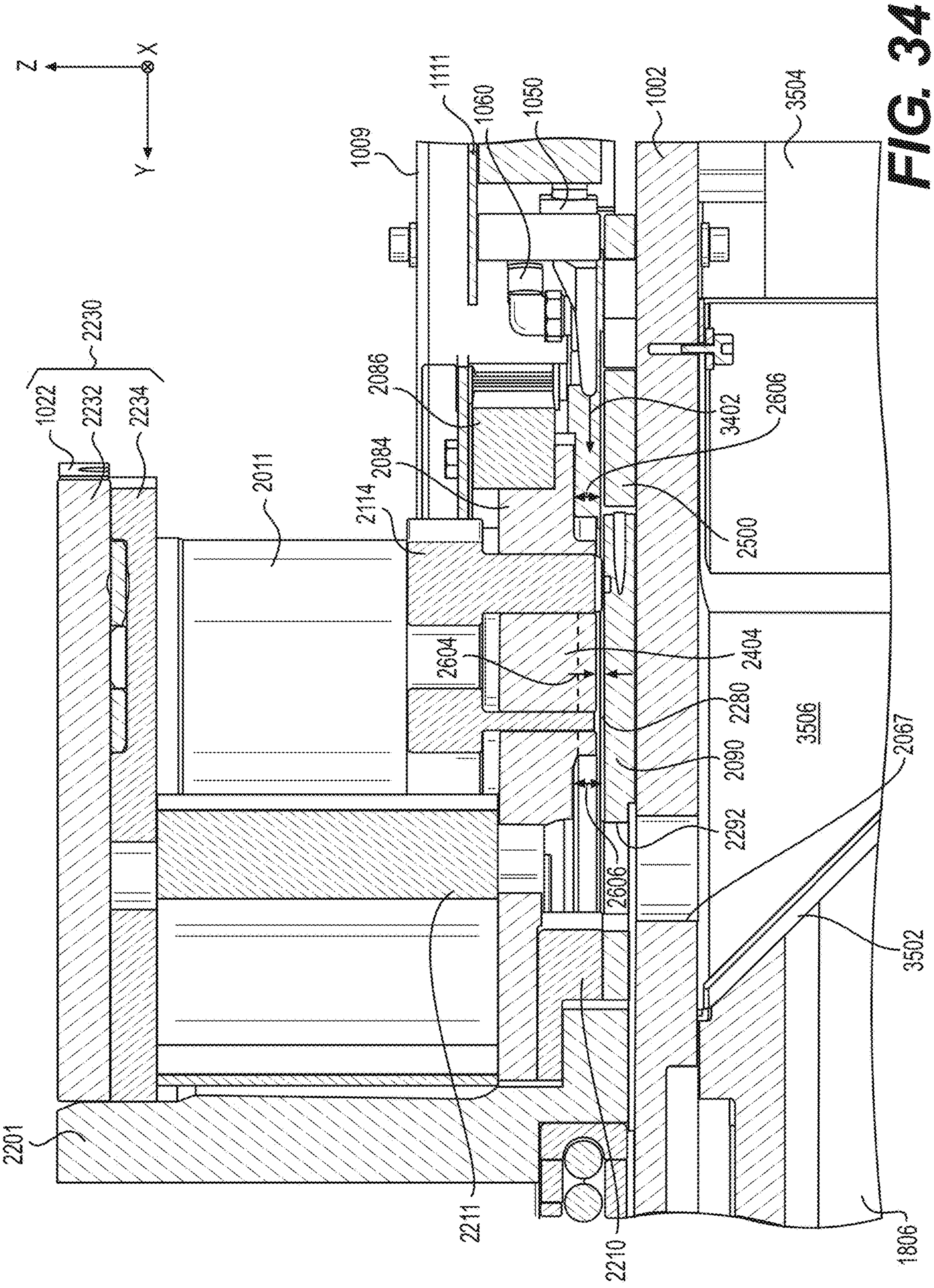
FIG. 34 is a three-dimensional cross-sectional view, along view line XXXIV-XXXIV', of the apparatus shown in FIG. 25, according to some example embodiments.
Figure 35:
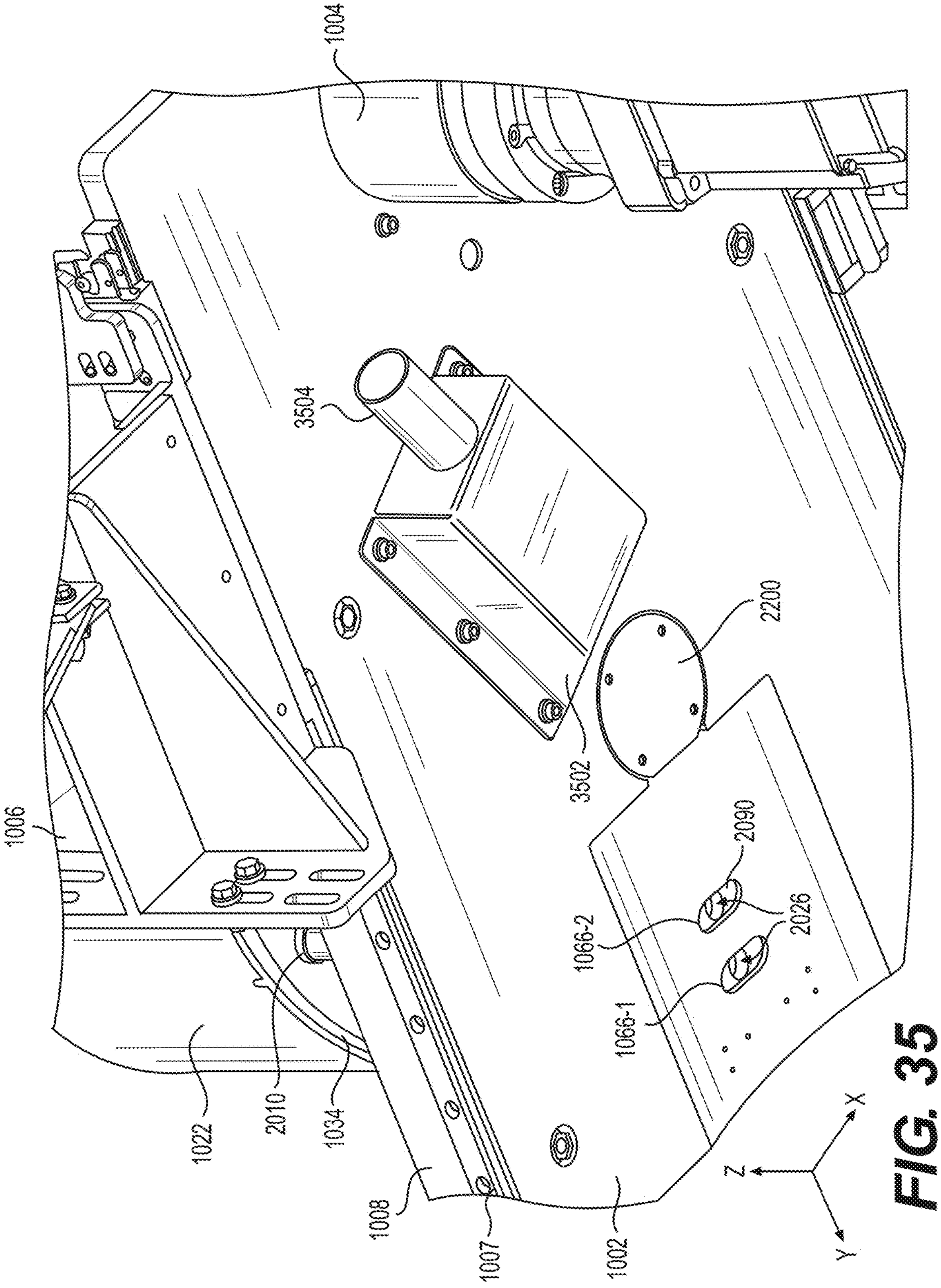
FIG. 35 is a perspective view of the apparatus of FIG. 17, according to some example embodiments.

Referring now to at least FIGS. 25 and 34, the apparatus 1000 may include an air knife assembly 1050, structurally supported on apparatus 1000 by at least bracket assembly 1111, where the air knife assembly 1050 is configured to emit a stream of air 3402, within a particular field of view 3404 of the air knife assembly 1050. As shown in at least FIGS. 25 and 34, the air knife assembly 1050 is fixed in place in relation to the rotatable section 1010 and is oriented towards the rotatable section 1010. Accordingly the air knife assembly 1050 is configured to emit a stream of air that passes in flow communication with one or more surfaces of the rotatable section 1010 that move through the field of view 3404 of the fixed air knife assembly 1050 as the rotatable section 1010 is rotated around the longitudinal axis 702.

As shown, the cleanout conduit 2067 is radially aligned with the air knife assembly 1050 with respect to the longitudinal axis 702, such that the cleanout conduit 2067 is between the air knife assembly 1050 and the longitudinal axis 702, and the air knife assembly 1050 is oriented towards the cleanout conduit 2067 such that the field of view 3404 of the air knife assembly 1050 at least partially encompasses the cleanout conduit 2067 and thus the air knife assembly 1050 is configured to emit a stream of air 3402 radially towards the cleanout conduit 2067.

Accordingly, as shown, the air knife assembly 1050 is configured to emit a stream of air 3402 radially towards the cleanout conduit 2067 to entrain and remove residue from a portion of the rotatable section 1010 that is between the air knife assembly 1050 and the cleanout conduit 2067 in the field of view 3404 of the air knife assembly 1050. Additionally, at least the cleanout conduit 1067, alone or in combination with window 2802, one or more cleanout ports 2092, one or more cleanout ports 2402, a sub-combination thereof, or a combination thereof, is configured to further direct the residue entrained in the air stream 3402 out of the apparatus 1000, for example based on a vacuum pump drawing air out of the enclosure 3506 via the vacuum conduit 3504 and thus drawing air through the cleanout conduit 2067 and into the enclosure 3506.

The air knife assembly 1050 may thus emit the air stream 3402 to entrain and remove residue that may accumulate on one or more surfaces of the apparatus 1000 that pass into the field of view 3404 as the rotatable section 1010 rotates around the longitudinal axis 702 to bring various portions thereof into the field of view 3404. As shown, the air knife assembly 1050 may be positioned so that the field of view 3404 of the air knife assembly 1050 may be radially aligned with the window 2820 defined by the cutting assembly 2800. The window 2820 may be further aligned with the cleanout conduit 2067 extending through the plate 1002 to the vacuum housing enclosure 3506. Various cleanout ports 2402 and 2092 may be at least partially vertically aligned with the cleanout conduit 2067 and window 2820 as the rotatable section 1010 rotates around the longitudinal axis 702, thereby enabling residue entrained in the stream of air 3402 that is emitted by the air knife assembly 1050 within the field of view 3404 to be drawn into the enclosure 2506 based on the stream of air 3402 passing into the enclosure 3506 via cleanout conduit 2067, window 2820, and one or more ports 2092 and 2402 that are at least partially vertically aligned with the cleanout conduit 2067 and window 2820.

As shown in at least FIGS. 25 and 34, and further referring to at least FIGS. 22-23, the lower disc 2084 may include downwards-protruding structures 2404 that each at least partially encompass the sheaths 2114 of a radially aligned set 3091 of channel assemblies 2010, such that each separate protruding structure 2404 of the lower disc 2084 vertically overlaps a separate radial disc portion 2091 of the portioning disc 2090 that includes the lower assemblies 2012 of the radially aligned set 3091 of channel assemblies 2010. As shown in at least FIGS. 22-23, 25, and 34, the lower disc 2084, the cutting assembly 2800, and the portioning disc 2090 may define a space between a bottom surface of the lower disc 2084 and one or more of the cutting assembly 2800 and the portioning disc 2090. The air stream 3402 emitted by the air knife assembly 1050 may pass through the space to entrain residue and carry the residue radially towards the longitudinal axis 702 and thus towards one or more of the cleanout ports 2092 that are within the field of view 3404 of the air knife assembly 1050. As a result, the residue may be drawn through the one or more cleanout ports 2092 and into the vacuum housing enclosure 3506 via the window 2820 and the cleanout conduit 2067 that is at least partially vertically aligned with the one or more cleanout ports 2092.

As shown in at least FIGS. 22-23, 25, and 34, the space defined by the lower disc 2084 and the cutting assembly 2800 and portioning disc 2090 may include gap spaces 2602 defined between radially adjacent protruding structures 2404 of the lower disc 2084. The air knife assembly 1050 may emit the air stream 3402 such that the air stream 3402 passes towards window 2820 and between radially adjacent protruding structures 2404 that are within the field of view 3404, in order to entrain and remove residue accumulated between the protruding structures 2404 to the window 2820 and thus to the enclosure 3506 via the cleanout conduit 2067 and one or more cleanout ports 2092 at least partially aligned with the cleanout conduit 2067.

As further shown, the space defined by the lower disc 2084 and the cutting assembly 2800 and portioning disc 2090 may extend underneath each protruding portion 2404 through a gap 2604 between the bottom surface of the protruding structure 2404 and an upper surface of either the cutting assembly 2800 or the portioning disc 2090. The air stream 3402 may pass through the gap 2604 between the protruding structure 2404 and the cutting assembly 2800, in order to entrain and remove residue accumulated between the protruding structure 2404 and the cutting assembly 2800 to the window 2820 and thus to the enclosure 3506 via the cleanout conduit 2067 and one or more cleanout ports 2092 at least partially aligned with the cleanout conduit 2067.

In some example embodiments, one or more elements of the apparatus 1000 may be omitted. For example, the cleanout assembly 2500 may be omitted from apparatus 1000. In another example, in some example embodiments one or more of the enclosure structures 1860 and 1870 may be omitted from apparatus 1000. In another example, the cutting assembly 2800 may be omitted from apparatus 1000. In another example, one or more conduit assemblies of the cleanout assembly 2500 may be omitted. In another example, the inner or outer pattern 3010 or 3020 of channel assemblies 2010 may be omitted from the apparatus 1000, and at least one conduit assembly 1149 of the discharge assembly 1040 may be omitted.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

We claim:

1. An apparatus configured to provide a portioned instance of a compressible material, the apparatus comprising:

a rotatable section configured to rotate around a central longitudinal axis, the rotatable section including a plurality of channel assemblies, the plurality of channel assemblies are spaced apart around a circumference of the rotatable section, each channel assembly of the plurality of channel assemblies including an upper assembly defining an upper channel and a lower assembly defining a lower channel, the upper assembly defining a top opening and the lower assembly defining a bottom opening, each channel assembly configured to hold a bulk instance of the compressible material extending continuously through both the upper channel and the lower channel; and a cutting assembly configured to be fixed in place in relation to the rotatable section, the cutting assembly defining a window including at least a first cutting edge and a second cutting edge, the cutting assembly being between the upper assembly and the lower assembly of at least one channel assembly of the plurality of channel assemblies based on rotation of the rotatable section to at least partially align the at least one channel assembly with the window, wherein the plurality of channel assemblies includes a radially-aligned set of channel assemblies that are aligned on a same radial line extending radially from the central longitudinal axis, the radially-aligned set of channel assemblies configured to be rotated around the central longitudinal axis at a same angular rate based on rotation of the rotatable section around the central longitudinal axis, and the first cutting edge and the second cutting edge are each configured to progressively extend in opposite radial directions between a first angular position and a second angular position, such that the first cutting edge moves transversely in a first radial direction through a first gap space of a first channel assembly within the radially-aligned set of channel assemblies and the second cutting edge moves transversely in a second radial direction through a second gap space of a second channel assembly within the radially-aligned set of channel assemblies, the first radial direction and the second radial direction being the opposite radial directions, based on the rotatable section rotating the radially-aligned set of channel assemblies around the central longitudinal axis between the first angular position and the second angular position.

2. The apparatus of claim 1, wherein the first cutting edge extends in a first arc and the second cutting edge extends in a second arc opposite the first cutting edge.

3. The apparatus of claim 1, wherein the first cutting edge is configured to move transversely through the first gap space of the first channel assembly of the radially-aligned set of channel assemblies, the second cutting edge is configured to move transversely through the second gap space of the second channel assembly of the radially-aligned set of channel assemblies at a same rate as the first cutting edge based on the rotatable section rotating the radially-aligned set of channel assemblies around the central longitudinal axis between the first angular position and the second angular position.

4. The apparatus of claim 1, wherein an angular displacement between the first cutting edge and the second cutting edge is 108 degrees.

5. The apparatus of claim 1, further comprising:

a first enclosure structure and a second enclosure structure each fixed in place on opposite sides of the rotatable section, the first enclosure structure and the second enclosure structure each defining separate, respective enclosures, the first enclosure structure and the second enclosure structure configured to be open to separate, respective portions of the plurality of channel assemblies that are at least partially vertically aligned with the first enclosure structure and the second enclosure structure, wherein the apparatus is configured to rotate the rotatable section to cause the at least one channel assembly to be sequentially vertically aligned with at least one enclosure of each enclosure structure of the first enclosure structure and the second enclosure structure, such that gas is supplied through a top opening of the at least one channel assembly via the at least one enclosure of each enclosure structure.

6. The apparatus of claim 5, wherein:

a lower portion of the bulk instance of the compressible material in the at least one channel assembly is configured to be severed from an upper portion of the bulk instance of the compressible material in the at least one channel assembly by one or more of the first cutting edge and the second cutting edge to produce the portioned instance;

the cutting assembly isolates the lower channel of the at least one channel assembly from the upper channel of the at least one channel assembly;

the cutting assembly is configured to isolate the lower channel of the at least one channel assembly from the upper channel of the at least one channel assembly based on the rotatable section rotating the at least one channel assembly to be at least partially vertically aligned with the first enclosure structure, such that the apparatus is configured to push compressible material into a bottom of the upper channel that is isolated from the lower channel of the at least one channel assembly based on supplying gas through the top opening of the at least one channel assembly via at least one enclosure of the first enclosure structure; and the cutting assembly is configured to expose the lower channel of the at least one channel assembly to the upper channel of the at least one channel assembly based on the rotatable section rotating the at least one channel assembly to be at least partially vertically aligned with the second enclosure structure, such that the apparatus is configured to push the compressible material into a bottom of the lower channel that is exposed to the upper channel of the at least one channel assembly based on supplying gas through the top opening of the at least one channel assembly via at least one enclosure of the second enclosure structure.

7. An apparatus configured to provide a portioned instance of a compressible material, the apparatus comprising:

a rotatable section configured to rotate around a central longitudinal axis, the rotatable section including a plurality of channel assemblies, the plurality of channel assemblies are spaced apart around a circumference of the rotatable section, each channel assembly of the plurality of channel assemblies including an upper assembly defining an upper channel and a lower assembly defining a lower channel, the upper assembly defining a top opening and the lower assembly defining a bottom opening, each channel assembly configured to hold a bulk instance of the compressible material extending continuously through both the upper channel and the lower channel; and a cutting assembly configured to be fixed in place in relation to the rotatable section, the cutting assembly defining a window including at least a first cutting edge and a second cutting edge, the cutting assembly between the upper assembly and the lower assembly of at least one channel assembly of the plurality of channel assemblies based on rotation of the rotatable section to at least partially align the at least one channel assembly with the window;

a first enclosure structure and a second enclosure structure each fixed in place on opposite sides of the rotatable section, the first enclosure structure and the second enclosure structure each defining separate, respective enclosures, the first enclosure structure and the second enclosure structure configured to be open to separate, respective portions of the plurality of channel assemblies that are at least partially vertically aligned with the first enclosure structure and the second enclosure structure, wherein the apparatus is configured to rotate the rotatable section to cause the at least one channel assembly to be sequentially vertically aligned with at least one enclosure of each enclosure structure of the first enclosure structure and the second enclosure structure, such that gas is supplied through a top opening of the at least one channel assembly via the at least one enclosure of each enclosure structure, the apparatus is configured to supply a first gas to an enclosure of the separate, respective enclosures of the first enclosure structure to pressurize the enclosure of the first enclosure structure to a first pressure, the apparatus is further configured to supply a second gas to an enclosure of the separate, respective enclosures of the second enclosure structure to pressurize the enclosure of the second enclosure structure to a second pressure, and the second pressure is greater than the first pressure.

8. An apparatus configured to provide a portioned instance of a compressible material, the apparatus comprising:

a rotatable section configured to rotate around a central longitudinal axis, the rotatable section including a plurality of channel assemblies, the plurality of channel assemblies are spaced apart around a circumference of the rotatable section, each channel assembly of the plurality of channel assemblies including an upper assembly defining an upper channel and a lower assembly defining a lower channel, the upper assembly defining a top opening and the lower assembly defining a bottom opening, each channel assembly configured to hold a bulk instance of the compressible material extending continuously through both the upper channel and the lower channel; and a cutting assembly configured to be fixed in place in relation to the rotatable section, the cutting assembly defining a window including at least a first cutting edge and a second cutting edge, the cutting assembly between the upper assembly and the lower assembly of at least one channel assembly of the plurality of channel assemblies based on rotation of the rotatable section to at least partially align the at least one channel assembly with the window;

a discharge assembly fixed in relation to the rotatable section, the discharge assembly configured to supply a gas into the lower channel of the at least one channel assembly via a conduit assembly of the at least one channel assembly to discharge the portioned instance of the compressible material through the bottom opening of the at least one channel assembly, based on rotation of the rotatable section to at least partially radially align the conduit assembly of the at least one channel assembly with a conduit assembly of the discharge assembly; and a cleanout assembly fixed in relation to the rotatable section, the cleanout assembly configured to supply at least one fluid through the conduit assembly of the at least one channel assembly via a conduit assembly of the cleanout assembly, based on rotation of the rotatable section to radially mis-align the conduit assembly of the at least one channel assembly with the conduit assembly of the discharge assembly, and at least partially radially align the conduit assembly of the at least one channel assembly with the conduit assembly of the cleanout assembly.

9. The apparatus of claim 8, wherein the cleanout assembly includes a first conduit assembly configured to supply a first fluid through the conduit assembly of at the at least one channel assembly of the plurality of channel assemblies, based on the rotatable section rotating to at least partially radially align the conduit assembly of the at least one channel assembly with the first conduit assembly, and a second conduit assembly configured to supply a second fluid through the conduit assembly of the at least one channel assembly, based on the rotatable section rotating to radially mis-align the conduit assembly of the at least one channel assembly with the first conduit assembly and to at least partially radially align the conduit assembly of the at least one channel assembly with the second conduit assembly, and the first fluid and the second fluid are different fluids.

10. The apparatus of claim 9, wherein the first fluid is a liquid and the second fluid is a particular gas.

11. The apparatus of claim 8, wherein the conduit assembly of the at least one channel assembly includes an annular conduit assembly defining an annular conduit surrounding the lower channel of the at least one channel assembly, the conduit assembly of the at least one channel assembly configured to direct the gas from the discharge assembly into the annular conduit, and one or more bridging conduit assemblies defining one or more bridging conduits extending between the annular conduit assembly and a top end of the lower channel of the at least one channel assembly, the one or more bridging conduit assemblies configured to direct the gas from the annular conduit to the top end of the lower channel of the at least one channel assembly.

12. The apparatus of claim 11, wherein the one or more bridging conduit assemblies includes a plurality of bridging conduit assemblies between the annular conduit assembly and the top end of the lower channel of the at least one channel assembly, and the plurality of bridging conduit assemblies are spaced apart equidistantly around a circumference of the lower assembly of the at least one channel assembly.

13. The apparatus of claim 11, wherein the at least one channel assembly includes a cleanout port extending from the annular conduit assembly of the lower assembly of the at least one channel assembly to an exterior of the rotatable section, the apparatus further includes an outlet conduit that is configured to expose only the bottom opening of the at least one channel assembly, such that the cleanout port of the at least one channel assembly remains isolated from an exterior of the apparatus, based on the rotatable section rotating to at least partially align the conduit assembly of the at least one channel assembly with the conduit assembly of the discharge assembly, and the apparatus further includes a cleanout conduit that is configured to expose both the bottom opening and the cleanout port of the at least one channel assembly based on the rotatable section rotating to at least partially align the conduit assembly of the at least one channel assembly with the cleanout assembly.

14. The apparatus of claim 8, wherein the cleanout assembly is configured to supply the at least one fluid to a plurality of lower assemblies simultaneously, based on simultaneous radial alignment of at least one conduit assembly of the plurality of lower assemblies with the conduit assembly of the cleanout assembly.

15. The apparatus of claim 8, further comprising:

an air knife assembly that is fixed in relation to the rotatable section and oriented towards the rotatable section, the air knife assembly configured to emit a stream of air in a field of view; and a cleanout conduit that is radially aligned with the air knife assembly and is between the air knife assembly and the central longitudinal axis of the rotatable section, such that the air knife assembly is configured to emit a stream of air radially towards the cleanout conduit to entrain and remove residue from a portion of the rotatable section that is between the air knife assembly and the cleanout conduit in the field of view of the air knife assembly, and the cleanout conduit is configured to further direct the residue entrained in the stream of air out of the apparatus.

16. The apparatus of claim 8, wherein the discharge assembly is configured to supply the gas into the lower channel to discharge the portioned instance through the bottom opening based on directing the gas through the conduit assembly of the at least one channel assembly to impinge on a lower face of the cutting assembly in the lower channel.

17. The apparatus of claim 1, wherein each first gap space and the second gap space are each defined between the upper assembly and the lower assembly and spaced apart from each other in a radial direction.

18. The apparatus of claim 1, wherein each channel assembly includes a sheath and a spring assembly between the upper assembly and the lower assembly, and the spring assembly configured to bias the sheath towards the lower assembly in a first biased direction.

19. The apparatus of claim 18, wherein the first gap space and the second gap space are defined by the sheath and the lower assembly.

20. The apparatus of claim 19, wherein the cutting assembly is configured to bias the sheath in a second biased direction opposite the first biased direction such that the sheath is at least partially separated from the upper assembly to form the first gap space and the second gap space.

* * * * *